United States Patent
Tanaka et al.

(10) Patent No.: US 6,611,523 B2
(45) Date of Patent: *Aug. 26, 2003

(54) ATM CELL MULTIPLEXER

(75) Inventors: Yasuo Tanaka, Osaka (JP); Hiroyuki Kogata, Osaka (JP)

(73) Assignee: Fujitsu Limited, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/226,351

(22) Filed: Jan. 6, 1999

(65) Prior Publication Data

US 2002/0172204 A1 Nov. 21, 2002

(30) Foreign Application Priority Data

Jul. 31, 1998 (JP) ............................. 10-218129

(51) Int. Cl.7 ............................... H04L 12/56
(52) U.S. Cl. .................... 370/395.5; 370/395.6
(58) Field of Search .................. 370/232, 395, 370/412, 428, 429, 462, 474, 535, 536, 537, 538, 540, 542, 543, 544, 230, 231, 235, 359, 395.4, 395.42, 395.43, 395.6, 395.62, 395.65

(56) References Cited

U.S. PATENT DOCUMENTS

| | | | | |
|---|---|---|---|---|
| 5,408,469 A | * | 4/1995 | Opher et al. ................. 370/399 |
| 5,539,738 A | * | 7/1996 | Tibi et al. .................... 370/412 |
| 5,724,358 A | * | 3/1998 | Headrick et al. ............ 370/418 |
| 5,737,312 A | * | 4/1998 | Sasagawa .................... 370/232 |
| 5,946,309 A | * | 8/1999 | Westberg et al. ......... 370/395.3 |
| 5,982,777 A | * | 11/1999 | Song .......................... 370/415 |
| 6,021,135 A | * | 2/2000 | Ishihara et al. ............. 370/356 |
| 6,226,264 B1 | * | 5/2001 | Shibata et al. .............. 370/232 |

\* cited by examiner

*Primary Examiner*—Alm Patel
*Assistant Examiner*—William Schultz
(74) *Attorney, Agent, or Firm*—Katten Muchin Zavis Rosenman

(57) ABSTRACT

An ATM cell multiplexer is arranged so that in the up direction from the terminal equipment to the ATM switchboard cells from a cell terminal portion in CLAD units are held in a cell holding portion through a Utopia Level 2 interface under the control of a communication controller in the CLAD units, and an ATM bus scheduler makes the cell holding portion transmit the cells to an ATM bus by assigning a transmission right for every cell holding portion of the CLAD units in accordance with a preset schedule table based on at least one of predetermined service categories and a traffic control corresponding to a traffic quantity, while in the down direction from the ATM switchboard to the terminal equipment the cells are broadcast from the ATM bus to the cell holding portion of each CLAD unit for a cell transfer and the communication controller makes the cell holding portion transfer the cells to the cell terminal portion through the Utopia Level 2 interface to decide whether or not the cells are addressed to itself.

16 Claims, 49 Drawing Sheets

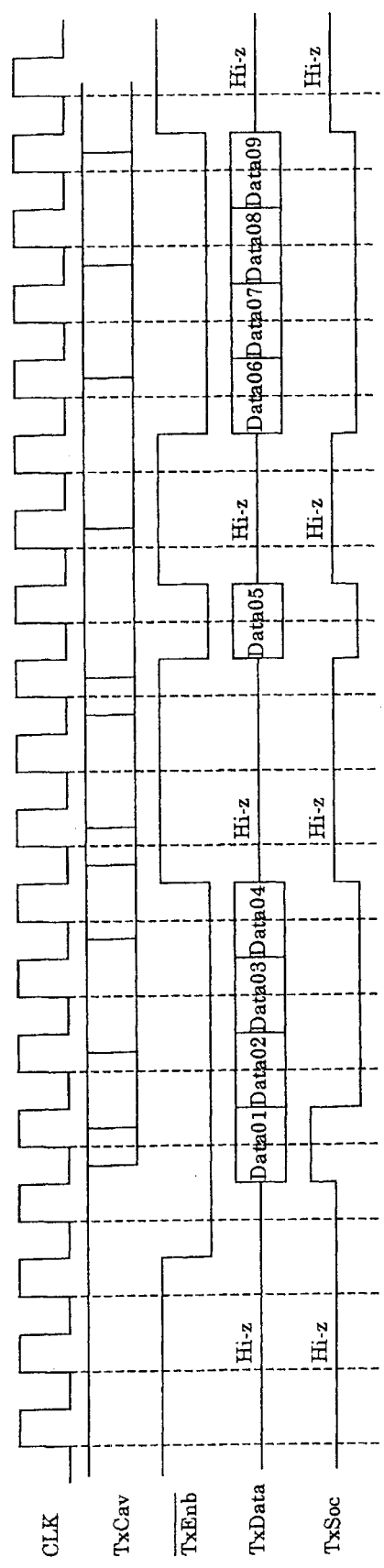
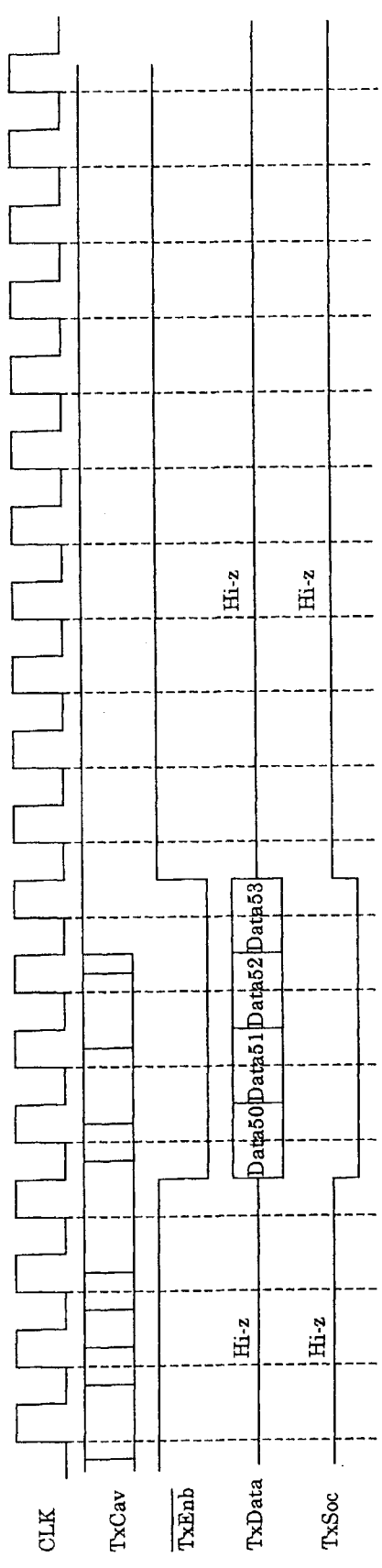

PHY→ATM BUS

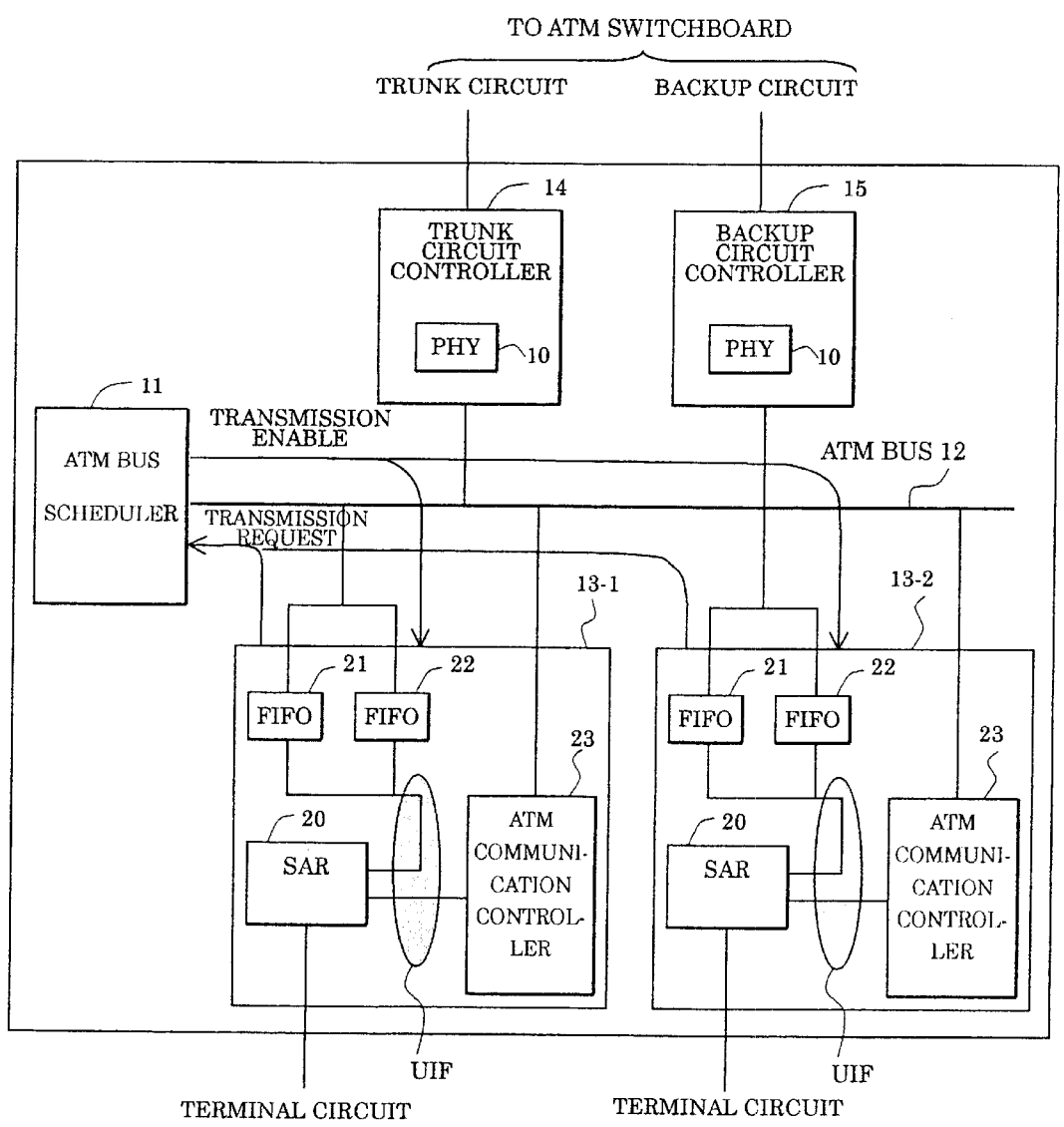

FIG.7 PHY→SAR

SAR→PHY

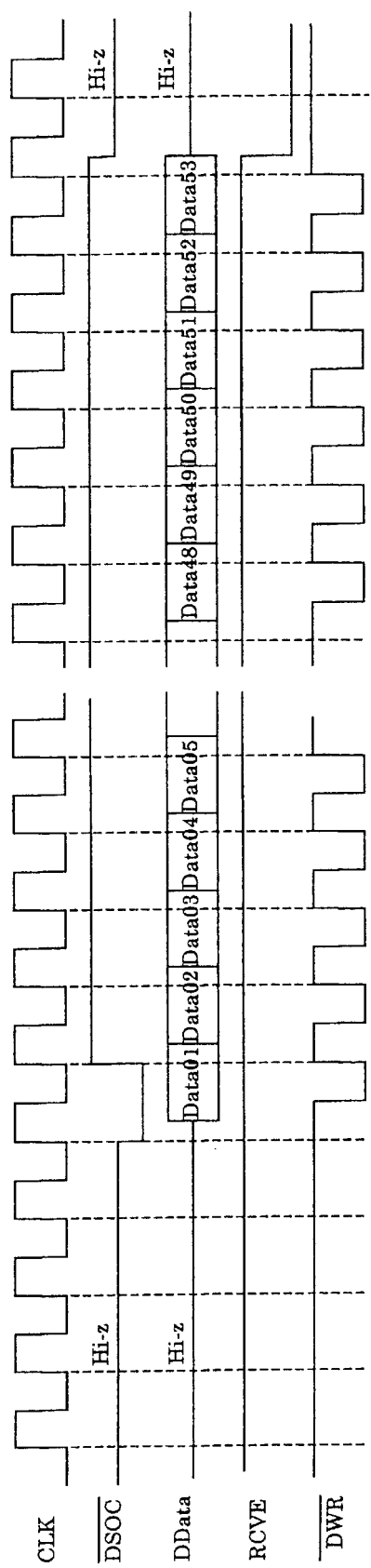
FIG.17 PHY→SAR

DOWN CELL TRANSFER

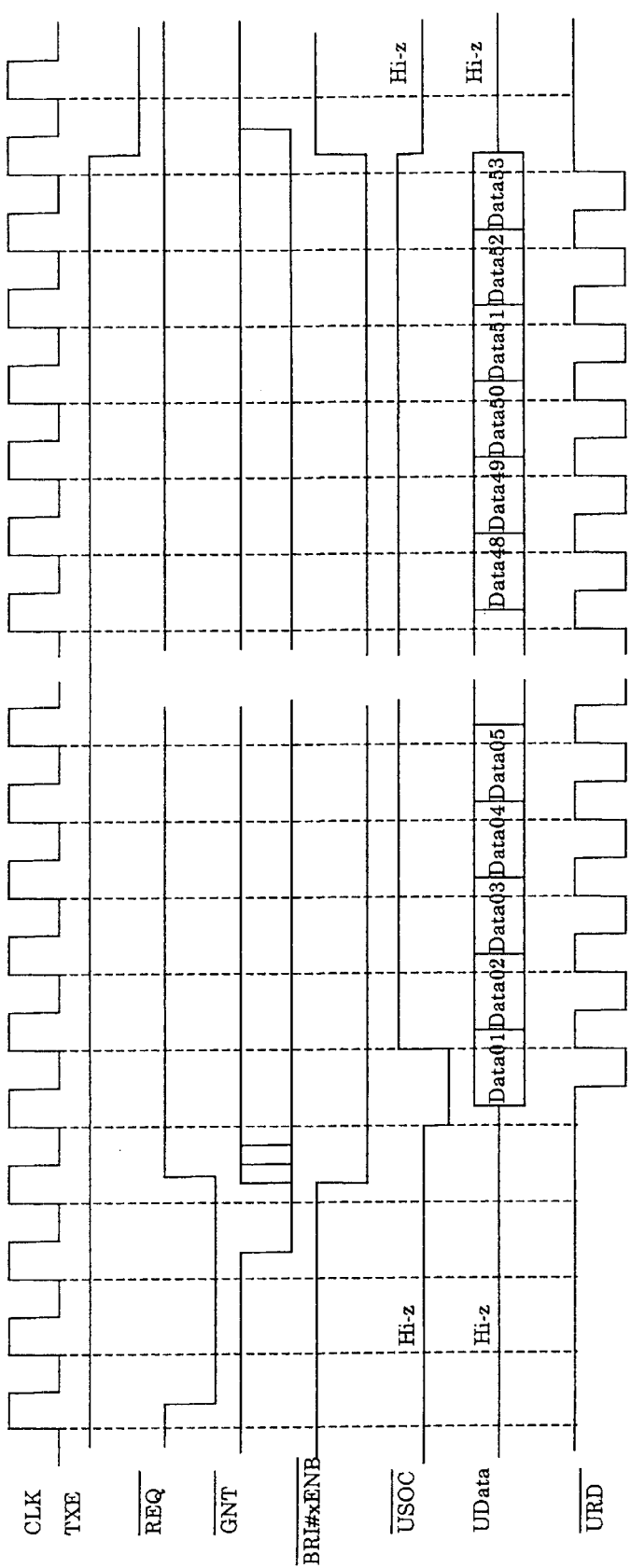
FIG.19 SAR→PHY

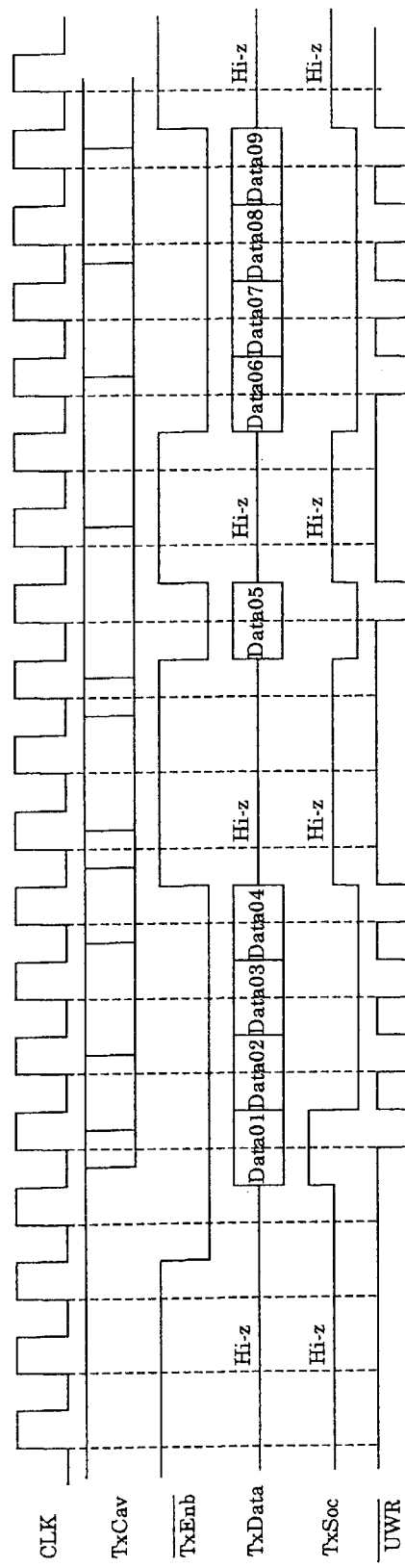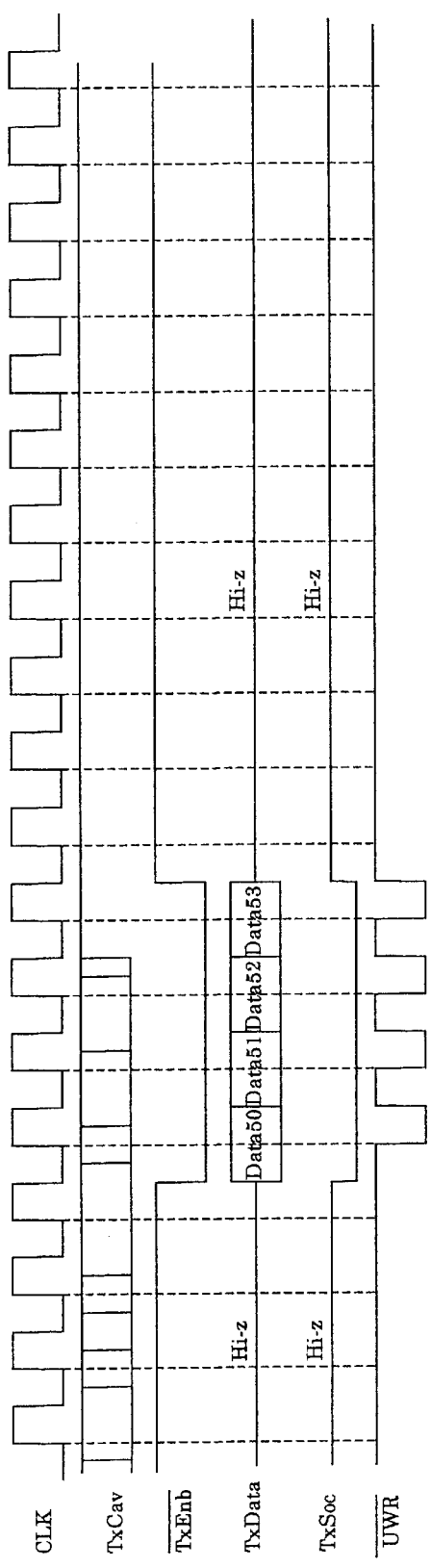
UP CELL TRANSFER
FIG.20A
FIG.20B

CBR MEHOD rt-VBR METHOD

FIG. 36

| SIGNAL NAME | CONTENTS OF SIGNAL | INPUT OR OUTPUT | DESTINATION |
|---|---|---|---|
| C8M | 8 MHz CLOCK INPUT | INPUT | CLOCK |
| xRCA_CLAD9:0 | TRANSMISSION REQUEST SIGNAL FROM CLAD | INPUT | CLAD |
| xTCA_PHY1,0 | RECEPTION ENABLE SIGNAL OF TRUNK CARD | INPUT | TRUNK CARD |
| xPHYADR1,0 | SELECTING SIGNAL OF TRUNK CARD IN UP COMMUNICATION | INPUT | CLAD |
| xREN_CLAD9:0 | TRANSMISSION ENABLE SIGNAL FOR CLAD | OUTPUT | CLAD |
| xRCA_PHY1,0 | TRANSMISSION DEMAND SIGNAL FROM TRUNK CARD | INPUT | TRUNK CARD |
| xREN_PHY1,0 | TRANSMISSION ENABLE SIGNAL FOR TRUNK CARD | OUTPUT | TRUNK CARD |
| xTCA_CLAD | RECEPTION ENABLE SIGNAL OF CLAD | INPUT | CLAD |
| xCELLENB9:0 | CELL TRANSFER ENABLE SIGNAL ON VBR COMMUNICATION | INPUT | SCHEDULE MEMORY CONTROLLER |
| xCMDACK(TS2) | ACKNOWLEDGE SIGNAL FROM COMMAND RECEIVER | INPUT | SCHEDULE MEMORY CONTROLLER |
| xCMD3(TS3) | COMMAND INSTRUCTION SIGNAL | OUTPUT | SCHEDULE MEMORY CONTROLLER |
| xMTCNTUP | | | |
| xS1TCNTUP | | | |
| xS2TCNTUP | | | |
| xCMDEN(TS0) | COMMAND VALID SIGNAL | OUTPUT | SCHEDULE MEMORY CONTROLLER |
| CMDRxW | COMMAND READ/WRITE DESIGNATING SIGNAL | OUTPUT | SCHEDULE MEMORY CONTROLLER |
| MCLADID3:0 | CLAD ID SIGNAL OF MAIN TABLE T1 | INPUT | SCHEDULE MEMORY CONTROLLER |
| MBR2:0 | TRAFFIC TYPE SIGNAL OF MAIN TABLE T1 | INPUT | SCHEDULE MEMORY CONTROLLER |
| S1CLADID3:0 | CLAD ID SIGNAL OF SUB TABLE T2 | INPUT | SCHEDULE MEMORY CONTROLLER |
| S2CLADID3:0 | CLAD ID SIGNAL OF SUB TABLE T3 | INPUT | SCHEDULE MEMORY CONTROLLER |
| xCELLDET | CLAD SIDE CELL ABANDONMENT SIGNAL ON DOWN COMMUNICATION FROM BASIC TRUNK CARD | OUTPUT | SCHEDULE MEMORY CONTROLLER |
| xCELLDET1(TS4) | CLAD SIDE CELL ABANDONMENT SIGNAL ON DOWN COMMUNICATION FROM BACKUP TRUNK CARD | OUTPUT | SCHEDULE MEMORY CONTROLLER |

(x:NEGATIVE LOGIC)

FIG. 37

| SIGNAL NAME | CONTENTS OF SIGNAL | INPUT OR OUTPUT | DESTINATION |
|---|---|---|---|
| C8M | 8 MHz CLOCK INPUT | INPUT | CLOCK |
| xCELLENB9:0 | CELL TRANSFER ENABLE SIGNAL ON VBR COMMUNICATION | OUTPUT | SCHEDULING PORTION |
| xCMDACK(TS2) | ACKNOWLEDGE SIGNAL FROM COMMAND RECEIVER | OUTPUT | SCHEDULING PORTION |
| xCMD3(TS3) | COMMAND INSTRUCTION SIGNAL | INPUT | SCHEDULING PORTION |
| xMTCNTUP | | | |
| xS1TCNTUP | | | |
| xS2TCNTUP | | | |
| xCMDEN(TS0) | COMMAND VALID SIGNAL | INPUT | SCHEDULING PORTION |
| CMDRxW | COMMAND READ/WRITE DESIGNATING SIGNAL | INPUT | SCHEDULING PORTION |
| MCLADID3:0 | CLAD ID SIGNAL OF MAIN TABLE T1 | OUTPUT | SCHEDULING PORTION |
| MBR2:0 | TRAFFIC TYPE SIGNAL OF MAIN TABLE T1 | OUTPUT | SCHEDULING PORTION |
| S1CLADID3:0 | CLAD ID SIGNAL OF SUB TABLE T2 | OUTPUT | SCHEDULING PORTION |
| S2CLADID3:0 | CLAD ID SIGNAL OF SUB TALBE T3 | OUTPUT | SCHEDULING PORTION |
| xCELLDET | CLAD SIDE CELL ABANDONMENT SIGNAL ON DOWN COMMUNICATION FROM BASIC TRUNK CARD | INPUT | SCHEDULING PORTION |
| xCELLDET1(TS4) | CLAD SIDE CELL ABANDONMENT SIGNAL ON DOWN COMMUNICATION FROM BACKUP TRUNK CARD | INPUT | SCHEDULING PORTION |
| SCMCH | SWITCHOVER CONTROL SIGNAL OF SCHEDULE MEMORY | INPUT | PROCESSOR |
| SCHA11:0 | ADDRESS SIGNAL OF DPRAM | OUTPUT | DPRAM |
| SCHD7:0 | DETA SIGNAL OF DPRAM | INPUT OUTPUT | DPRAM |
| SCHPRTY | DATA PARITY SIGNAL OF DPRAM | INPUT OUTPUT | DPRAM |
| xDPMCS | CHIP SELECT SIGNAL OF DPRAM | OUTPUT | DPRAM |
| xDPMOE | READ ENABLE SIGNAL OF DPRAM | OUTPUT | DPRAM |
| xDPMWE | WRITE ENABLE SIGNAL OF DPRAM | OUTPUT | DPRAM |

(x:NEGATIVE LOGIC)

DOWN SCHEDULER TRANSITION

FIG.39

| TRANSITION | STATUS PRESENT STATUS | NEXT STATUS | TRANSITION CONDITION OF DOWN SCHEDULER ||||||
|---|---|---|---|---|---|---|---|---|---|
| | | | xPKG RST | SCM EN | TS10 | TIMER $\mu s$ | xRCA-PHY0 | xRCA-PHY1 | WAIT COUNTER |
| 1 | ST_0 | ST_0 | L | * | * | * | * | * | * |
| | | | * | * | H | * | * | * | * |
| | | | * | L | * | * | * | * | * |
| 2 | | ST_1 | H | H | L | * | * | * | * |
| 3 | ST_1 | ST_0 | L | * | * | * | * | * | * |
| 4 | | ST_1 | H | * | L | * | * | * | * |
| | | | H | * | H | <264 | H | H | * |
| 5 | | ST_2 | H | * | H | * | L | * | * |
| | | | H | * | H | * | L | H | * |
| 6 | | ST_5 | H | * | H | * | * | L | * |
| | | | H | * | H | * | H | L | * |
| 7 | | ST_8 | H | * | H | >=264 | H | H | * |
| 8 | ST_2 | ST_0 | L | * | * | * | * | * | * |
| 9 | | ST_1 | H | * | L | * | * | * | * |
| 10 | | ST_2 | H | * | H | * | * | * | <53 |
| 11 | | ST_3 | H | * | H | * | * | * | >=53 |
| 12 | ST_3 | ST_0 | L | * | * | * | * | * | * |
| 13 | | ST_1 | H | * | L | * | * | * | * |
| 14 | | ST_3 | H | * | H | <264 | * | H | * |
| 15 | | ST_4 | H | * | H | * | * | L | * |
| 16 | | ST_8 | H | * | H | >=264 | * | H | * |
| 17 | ST_4 | ST_0 | L | * | H | * | * | * | * |
| 18 | | ST_1 | H | * | L | * | * | * | * |
| 19 | | ST_4 | H | * | H | * | * | * | <53 |
| 20 | | ST_8 | H | * | H | * | * | * | >=53 |
| 21 | ST_5 | ST_0 | L | * | * | * | * | * | * |
| 22 | | ST_1 | H | * | L | * | * | * | * |
| 23 | | ST_5 | H | * | H | * | * | * | <53 |
| 24 | | ST_6 | H | * | H | * | * | * | >=53 |
| 25 | ST_6 | ST_0 | L | * | * | * | * | * | * |
| 26 | | ST_1 | H | * | L | * | * | * | * |
| 27 | | ST_6 | H | * | H | <264 | H | * | * |
| 28 | | ST_7 | H | * | H | * | L | * | * |
| 29 | | ST_8 | H | * | H | >=264 | H | * | * |
| 30 | ST_7 | ST_0 | L | * | * | * | * | * | * |
| 31 | | ST_1 | H | * | L | * | * | * | * |
| 32 | | ST_7 | H | * | H | * | * | * | <53 |
| 33 | | ST_8 | H | * | H | * | * | * | >=53 |
| 34 | ST_8 | ST_0 | L | * | * | * | * | * | * |
| | | | * | L | * | * | * | * | * |
| 35 | | ST_1 | H | H | L | * | * | * | * |
| 36 | | ST_8 | H | H | H | * | * | * | * |

UP SCHEDULER TRANSITION

TRANSITION CONDITION (5) OF UP SCHEDULER

COMMAND RECEIVER TRANSITION

FIG.47

| TRANSITION | STATUS | | TRANSITION CONDITION (1) OF SCHEDULER COMMAND RECEIVER | | | | | | | | | | | | | | | | |
|---|---|---|---|---|---|---|---|---|---|---|---|---|---|---|---|---|---|---|---|
| | PRESENT STATUS | NEXT STATUS | xPKGRST | SCENB | TS10 | PHCHNG | CMDRxW | xCMDEN | xCMD3 | xS2TCNTUP | xS1TCNTUP | xMTCNTUP | BYTE COUNT NUMBER | xCELDET1 | xCELDET | CARRY | STATRIW | MEMACK | SCMST | SCMCH | MBR2:0 |
| 1 | ST_0 | ST_0 | L | * | * | * | * | * | * | * | * | * | * | * | * | * | * | * | * | * | * |
| | | | * | L | * | * | * | * | * | * | * | * | * | * | * | * | * | * | * | * | * |
| 2 | | ST_1 | H | H | L | * | * | * | * | * | * | * | * | * | * | * | * | * | * | * | * |
| 3 | ST_1 | ST_0 | L | * | * | * | * | * | * | * | * | * | * | * | * | * | * | * | * | * | * |
| 4 | | ST_2 | H | * | * | * | * | * | * | * | * | * | * | * | * | * | * | * | * | * | * |
| 5 | ST_2 | ST_0 | L | * | * | * | * | * | * | * | * | * | * | * | * | * | * | * | * | * | * |
| 6 | | ST_1 | H | * | * | * | * | * | * | * | * | * | <40 | * | * | * | * | H | * | * | * |
| 7 | | ST_2 | H | * | * | * | * | * | * | * | * | * | * | * | * | * | * | L | * | * | * |
| 8 | | ST_3 | H | * | * | * | * | * | * | * | * | * | >=40 | * | * | * | * | H | * | * | * |
| 9 | ST_3 | ST_0 | L | * | * | * | * | * | * | * | * | * | * | * | * | * | * | * | * | * | * |
| 10 | | ST_1 | H | * | L | H | * | * | * | * | * | * | * | * | * | * | * | * | * | * | * |
| 11 | | ST_3 | H | * | L | L | * | * | * | * | * | * | * | * | * | * | * | * | * | * | * |
| | | | H | * | H | * | * | H | * | * | * | * | * | * | * | * | * | * | * | * | * |
| | | | H | * | H | * | L | L | H | H | L | H | * | * | * | * | * | * | * | * | * |
| | | | H | * | H | * | L | L | H | H | H | L | * | * | * | * | * | * | * | * | * |
| | | | H | * | H | * | L | L | H | H | H | H | * | * | * | * | * | * | * | * | * |
| | | | H | * | H | * | H | L | L | L | L | L | * | * | * | * | * | * | * | * | * |
| | | | H | * | H | * | H | L | L | L | L | H | * | * | * | * | * | * | * | * | * |
| | | | H | * | H | * | H | L | L | L | H | L | * | * | * | * | * | * | * | * | * |
| | | | H | * | H | * | H | L | L | L | H | H | * | * | * | * | * | * | * | * | * |
| | | | H | * | H | * | H | L | L | H | L | L | * | * | * | * | * | * | * | * | * |
| | | | H | * | H | * | H | L | L | H | L | H | * | * | * | * | * | * | * | * | * |
| | | | H | * | H | * | H | L | L | H | H | L | * | * | * | * | * | * | * | * | * |
| | | | H | * | H | * | H | L | H | L | L | L | * | * | * | * | * | * | * | * | * |
| | | | H | * | H | * | H | L | H | L | L | H | * | * | * | * | * | * | * | * | * |
| | | | H | * | H | * | H | L | H | H | L | L | * | * | * | * | * | * | * | * | * |
| | | | H | * | H | * | H | H | L | L | L | L | * | * | * | * | * | * | * | * | * |
| | | | H | * | H | * | H | H | L | L | L | H | * | * | * | * | * | * | * | * | * |
| | | | H | * | H | * | H | H | L | H | H | L | * | * | * | * | * | * | * | * | * |
| | | | H | * | H | * | H | H | H | H | H | L | * | * | * | * | * | * | * | * | * |
| | | | H | * | H | * | H | H | H | H | L | H | * | * | * | * | * | * | * | * | * |
| | | | H | * | H | * | H | H | H | H | H | H | * | * | * | * | * | * | * | * | * |
| 12 | | ST_4 | H | * | H | * | H | L | H | H | L | L | * | * | * | * | * | * | * | * | * |
| 13 | | ST_5 | H | * | H | * | H | L | H | H | H | H | * | * | * | * | * | * | * | * | * |
| 14 | | ST_6 | H | * | H | * | H | L | H | H | H | H | * | * | * | * | * | * | * | * | * |
| 15 | | ST_8 | H | * | H | * | L | L | L | L | L | L | * | * | * | * | * | * | * | * | * |
| | | | H | * | H | * | L | L | L | L | L | H | * | * | * | * | * | * | * | * | * |
| | | | H | * | H | * | L | L | L | L | H | H | * | * | * | * | * | * | * | * | * |
| | | | H | * | H | * | L | L | L | H | L | L | * | * | * | * | * | * | * | * | * |
| | | | H | * | H | * | L | L | L | H | L | H | * | * | * | * | * | * | * | * | * |
| | | | H | * | H | * | L | L | H | H | L | L | * | * | * | * | * | * | * | * | * |
| | | | H | * | H | * | L | L | H | H | H | H | * | * | * | * | * | * | * | * | * |
| | | | H | * | H | * | L | H | L | L | L | L | * | * | * | * | * | * | * | * | * |
| | | | H | * | H | * | L | H | L | L | L | H | * | * | * | * | * | * | * | * | * |
| | | | H | * | H | * | L | H | L | H | L | L | * | * | * | * | * | * | * | * | * |
| | | | H | * | H | * | L | H | L | H | H | H | * | * | * | * | * | * | * | * | * |
| | | | H | * | H | * | L | L | H | H | L | L | * | * | * | * | * | * | * | * | * |

FIG.48

| TRANSITION | STATUS | | TRANSITION CONDITION (2) OF SCHEDULER COMMAND RECEIVER | | | | | | | | | | | | | | | | |
|---|---|---|---|---|---|---|---|---|---|---|---|---|---|---|---|---|---|---|---|
| | PRESENT-STATUS | NEXT STATUS | xPKGRST | SCENB | TS10 | PICHING | xCMDRxW | xCMDEN | xCMD3 | xS2TCNTUP | xS1TCNTUP | xMTCNTUP | BYTE COUNT NUMBER | xCELDET1 | xCELDET | CARRY | STATRIW | MEMACK | SCMST | SCMCH | MBR2:0 |
| 16 | ST_4 | ST_0 | L | * | * | * | * | * | * | * | * | * | * | * | * | * | * | * | * | * | * |
| 17 | | ST_1 | H | | * | * | * | * | * | * | * | * | * | * | * | * | * | * | L | H | 7 |
| | | | H | | | * | * | * | * | * | * | * | * | * | * | * | * | * | H | L | 7 |
| 18 | | ST_3 | H | * | L | * | * | * | * | * | * | * | * | * | * | * | * | * | * | * | 0 |
| | | | H | * | L | * | * | * | * | * | * | * | * | * | * | * | * | * | * | * | 1 |
| | | | H | * | L | * | * | * | * | * | * | * | * | * | * | * | * | * | * | * | 2 |
| | | | H | * | L | * | * | * | * | * | * | * | * | * | * | * | * | * | * | * | 3 |
| | | | H | * | L | * | * | * | * | * | * | * | * | * | * | * | * | * | * | * | 4 |
| | | | H | * | L | * | * | * | * | * | * | * | * | * | * | * | * | * | * | * | 5 |
| | | | H | * | L | * | * | * | * | * | * | * | * | * | * | * | * | * | * | * | 6 |
| | | | H | * | L | H | * | * | * | * | * | * | * | * | * | * | * | * | L | L | 7 |
| | | | H | * | L | L | * | * | * | * | * | * | * | * | * | * | * | * | H | H | 7 |
| 19 | | ST_7 | L | * | H | * | * | * | * | * | * | * | * | * | * | * | * | * | * | * | * |
| 20 | ST_5 | ST_0 | H | * | * | * | * | * | * | * | * | * | * | * | * | * | * | * | * | * | * |
| 21 | | ST_3 | H | * | L | * | * | * | * | * | * | * | * | * | * | * | * | * | * | * | * |
| 22 | | ST_7 | L | * | H | * | * | * | * | * | * | * | * | * | * | * | * | * | * | * | * |
| 23 | ST_6 | ST_0 | H | * | * | * | * | * | * | * | * | * | * | * | * | * | * | * | * | * | * |
| 24 | | ST_3 | H | * | L | * | * | * | * | * | * | * | * | * | * | * | * | * | * | * | * |
| 25 | | ST_7 | L | * | H | * | * | * | * | * | * | * | * | * | * | * | * | * | * | * | * |
| 26 | ST_7 | ST_0 | H | * | * | * | * | * | * | * | * | * | * | * | * | * | * | * | * | * | * |
| 27 | | ST_1 | H | * | L | H | * | * | * | * | * | * | * | * | * | * | * | * | * | * | * |
| 28 | | ST_3 | H | * | L | L | * | * | * | * | * | * | * | * | * | * | * | * | * | * | * |
| | | | H | * | H | * | * | H | * | * | * | * | * | * | * | * | * | * | * | * | * |
| 29 | | ST_7 | H | * | H | * | * | L | * | * | * | * | * | * | * | * | * | * | * | * | * |
| 30 | ST_8 | ST_0 | L | * | * | * | * | * | * | * | * | * | * | * | * | * | * | * | * | * | * |
| 31 | | ST_1 | H | * | L | H | * | * | * | * | * | * | * | * | * | * | * | * | * | * | * |
| 32 | | ST_3 | H | * | L | L | * | * | * | * | * | * | * | * | * | * | * | * | * | * | * |
| | | | H | * | H | * | * | * | * | * | * | * | 5 | * | * | * | * | * | * | * | * |
| | | | H | * | H | * | * | * | * | * | * | * | 6 | * | * | * | * | * | * | * | * |
| | | | H | * | H | * | * | * | * | * | * | * | 7 | * | * | * | * | * | * | * | * |
| 33 | | ST_8 | H | * | H | * | * | * | * | * | * | * | * | * | * | * | * | * | * | * | * |
| | | | H | * | H | * | H | L | H | H | H | H | * | * | * | * | * | * | * | * | * |
| | | | H | * | H | * | H | L | H | H | L | L | * | * | * | * | * | * | * | * | * |
| | | | H | * | H | * | H | L | H | H | H | H | * | * | * | * | * | * | * | * | * |
| | | | H | * | H | * | H | L | H | H | H | H | * | * | * | * | * | * | * | * | * |
| | | | H | * | H | * | L | L | L | L | L | L | * | * | * | * | * | * | * | * | * |
| | | | H | * | H | * | L | L | L | L | L | H | * | * | * | * | * | * | * | * | * |
| | | | H | * | H | * | L | L | L | L | H | L | * | * | * | * | * | * | * | * | * |
| | | | H | * | H | * | L | L | L | L | H | H | * | * | * | * | * | * | * | * | * |
| | | | H | * | H | * | L | L | L | H | L | H | * | * | * | * | * | * | * | * | * |
| | | | H | * | H | * | L | L | L | H | H | L | * | * | * | * | * | * | * | * | * |
| | | | H | * | H | * | L | L | L | H | H | H | * | * | * | * | * | * | * | * | * |
| | | | H | * | H | * | L | L | H | L | L | L | * | * | * | * | * | * | * | * | * |
| | | | H | * | H | * | L | L | H | L | L | H | * | * | * | * | * | * | * | * | * |
| | | | H | * | H | * | L | L | H | L | H | L | * | * | * | * | * | * | * | * | * |
| | | | H | * | H | * | L | L | H | L | H | H | * | * | * | * | * | * | * | * | * |
| | | | H | * | H | * | L | L | H | H | L | L | * | * | * | * | * | * | * | * | * |

FIG.49

| STATUS | | | TRANSITION CONDITION (3) OF SCHEDULER COMMAND RECEIVER | | | | | | | | | | | | | | | |
|---|---|---|---|---|---|---|---|---|---|---|---|---|---|---|---|---|---|---|
| TRANSI- TION | PRESENT STATUS | NEXT STATUS | x P K G R S T | S C E N B | T S 1 0 | P I C H N G | C M D R x W | x C M D E N | x C M D 3 | x S 2 T C N T U P | x S 1 T C N T U P | x M T C N T U P | BYTE COUNT NUMBER | x C E L D E T 1 | x C E L D E T | C A R R Y | S T A T R I W | M E M A C K | S C M S T | S C M C H | M B R 2 : 0 |
| 33 | | ST_8 | H | * | H | * | * | * | * | * | * | * | 1 | * | * | * | * | * | * | * | * |
| | | | H | * | H | * | * | * | H | L | H | L | 2 | * | * | * | * | * | * | * | * |
| | | | H | * | H | * | * | * | H | L | H | H | 2 | * | * | * | * | * | * | * | * |
| | | | H | * | H | * | * | * | H | H | L | L | 2 | * | * | * | * | * | * | * | * |
| | | | H | * | H | * | * | * | H | H | L | H | 2 | * | * | * | * | * | * | * | * |
| | | | H | * | H | * | * | * | H | H | H | L | 2 | * | * | * | * | * | * | * | * |
| | | | H | * | H | * | * | * | H | H | H | H | 2 | * | * | * | * | * | * | * | * |
| | | | H | * | H | * | * | * | * | * | * | * | 3 | * | * | L | * | * | * | * | * |
| | | | H | * | H | * | * | * | H | L | H | L | 3 | * | * | H | * | * | * | * | * |
| | | | H | * | H | * | * | * | H | L | H | H | 3 | * | * | H | * | * | * | * | * |
| | | | H | * | H | * | * | * | H | H | L | L | 3 | * | * | H | * | * | * | * | * |
| | | | H | * | H | * | * | * | H | H | L | H | 3 | * | * | H | * | * | * | * | * |
| | | | H | * | H | * | * | * | H | H | H | L | 3 | * | * | H | * | * | * | * | * |
| | | | H | * | H | * | * | * | H | H | H | H | 3 | * | * | H | * | * | * | * | * |
| | | | H | * | H | * | * | * | L | L | L | L | 4 | * | * | * | * | * | * | * | * |
| | | | H | * | H | * | * | * | L | L | L | H | 4 | * | * | * | * | * | * | * | * |
| | | | H | * | H | * | * | * | L | L | H | L | 4 | * | * | * | * | * | * | * | * |
| | | | H | * | H | * | * | * | L | L | H | H | 4 | * | * | * | * | * | * | * | * |
| | | | H | * | H | * | * | * | L | H | L | L | 4 | * | * | * | * | * | * | * | * |
| | | | H | * | H | * | * | * | L | H | L | H | 4 | * | * | * | * | * | * | * | * |
| | | | H | * | H | * | * | * | L | H | H | L | 4 | * | * | * | * | * | * | * | * |
| | | | H | * | H | * | * | * | L | H | H | H | 4 | * | * | * | * | * | * | * | * |
| | | | H | * | H | * | * | * | H | L | L | L | 4 | * | * | * | * | * | * | * | * |
| | | | H | * | H | * | * | * | H | L | L | H | 4 | * | * | * | * | * | * | * | * |
| | | | H | * | H | * | * | * | H | L | H | L | 4 | * | * | * | * | * | * | * | * |
| | | | H | * | H | * | * | * | H | H | L | L | 4 | * | * | * | * | * | * | * | * |
| | | | H | * | H | * | * | * | H | H | L | H | 4 | * | * | * | * | * | * | * | * |
| | | | H | * | H | * | * | * | H | H | H | L | 4 | * | * | * | * | * | * | * | * |
| | | | H | * | H | * | * | * | L | L | L | L | 5 | * | * | * | * | * | * | * | * |
| | | | H | * | H | * | * | * | L | L | L | H | 5 | * | * | * | * | * | * | * | * |
| | | | H | * | H | * | * | * | L | L | H | L | 5 | * | * | * | * | * | * | * | * |
| | | | H | * | H | * | * | * | L | L | H | H | 5 | * | * | * | * | * | * | * | * |
| | | | H | * | H | * | * | * | L | H | L | L | 5 | * | * | * | * | * | * | * | * |
| | | | H | * | H | * | * | * | L | H | L | H | 5 | * | * | * | * | * | * | * | * |
| | | | H | * | H | * | * | * | L | H | H | L | 5 | * | * | * | * | * | * | * | * |
| | | | H | * | H | * | * | * | L | H | H | H | 5 | * | * | * | * | * | * | * | * |
| | | | H | * | H | * | * | * | H | L | L | L | 5 | * | * | * | * | * | * | * | * |
| | | | H | * | H | * | * | * | H | L | L | H | 5 | * | * | * | * | * | * | * | * |
| | | | H | * | H | * | * | * | H | L | H | L | 5 | * | * | * | * | * | * | * | * |
| | | | H | * | H | * | * | * | H | L | H | H | 5 | * | * | * | * | * | * | * | * |

FIG.50

| | STATUS | | \multicolumn{15}{c|}{TRANSITION CONDITION (4) OF SCHEDULER COMMAND RECEIVER} |
|---|---|---|---|---|---|---|---|---|---|---|---|---|---|---|---|---|---|---|---|
| TRANSI-TION | PRESENT STATUS | NEXT STATUS | xPKGRST | SCENB | TS10 | PHCHNG | xCMDRxW | xCMDEN | xCMD3 | xS2TCNTUP | xS1TCNTUP | xMTCNTUP | BYTE COUNT NUMBER | xCELDET1 | xCELDET | CARRY | STATRIW | MEMACK | SCMST | SCMCH | MBR2:0 |
| 34 | | ST_A | H | * | H | * | * | * | * | * | * | * | 0 | * | * | * | * | * | * | * | * |
| | | | H | * | H | * | * | * | * | * | * | * | 1 | * | * | H | * | * | * | * | * |
| | | | H | * | H | * | * | * | L | L | L | L | 2 | * | * | * | * | * | * | * | * |
| | | | H | * | H | * | * | * | L | L | L | H | 2 | * | * | * | * | * | * | * | * |
| | | | H | * | H | * | * | * | L | L | H | L | 2 | * | * | * | * | * | * | * | * |
| | | | H | * | H | * | * | * | L | L | H | H | 2 | * | * | * | * | * | * | * | * |
| | | | H | * | H | * | * | * | L | H | L | L | 2 | * | * | * | * | * | * | * | * |
| | | | H | * | H | * | * | * | L | H | L | H | 2 | * | * | L | * | * | * | * | * |
| | | | H | * | H | * | * | * | L | H | H | L | 2 | * | * | * | * | * | * | * | * |
| | | | H | * | H | * | * | * | L | H | H | H | 2 | * | * | * | * | * | * | * | * |
| | | | H | * | H | * | * | * | H | L | L | L | 2 | * | * | * | * | * | * | * | * |
| | | | H | * | H | * | * | * | H | L | L | H | 2 | * | * | * | * | * | * | * | * |
| | | | H | * | H | * | * | * | L | L | L | L | 3 | * | * | H | * | * | * | * | * |
| | | | H | * | H | * | * | * | L | L | L | H | 3 | * | * | H | * | * | * | * | * |
| | | | H | * | H | * | * | * | L | L | H | L | 3 | * | * | H | * | * | * | * | * |
| | | | H | * | H | * | * | * | L | L | H | H | 3 | * | * | H | * | * | * | * | * |
| | | | H | * | H | * | * | * | L | H | L | L | 3 | * | * | H | * | * | * | * | * |
| | | | H | * | H | * | * | * | L | H | L | H | 3 | * | * | H | * | * | * | * | * |
| | | | H | * | H | * | * | * | L | H | H | L | 3 | * | * | H | * | * | * | * | * |
| | | | H | * | H | * | * | * | L | H | H | H | 3 | * | * | H | * | * | * | * | * |
| | | | H | * | H | * | * | * | H | L | L | L | 3 | * | * | H | * | * | * | * | * |
| | | | H | * | H | * | * | * | H | L | L | H | 3 | * | * | H | * | * | * | * | * |
| | | | H | * | H | * | * | * | H | L | H | L | 4 | * | * | * | * | * | * | * | * |
| | | | H | * | H | * | * | * | H | H | L | L | 4 | * | * | * | * | * | * | * | * |
| | | | H | * | H | * | * | * | * | * | * | * | >=5 | * | L | * | * | * | * | * | * |
| | | | H | * | H | * | * | * | * | * | * | * | >=5 | L | * | * | * | * | * | * | * |
| 35 | ST_9 | ST_0 | L | * | | * | * | * | * | * | * | * | * | * | * | * | * | * | * | * | * |
| 36 | | ST_1 | H | * | L | H | * | * | * | * | * | * | * | * | * | * | * | * | * | * | * |
| 37 | | ST_3 | H | * | L | L | * | * | * | * | * | * | * | * | * | * | * | * | * | * | * |
| 38 | | ST_A | H | * | H | * | * | * | * | * | * | * | * | * | * | * | * | * | * | * | * |
| 39 | ST_A | ST_0 | L | * | | * | * | * | * | * | * | * | * | * | * | * | * | * | * | * | * |
| 40 | | ST_1 | H | * | L | H | * | * | * | * | * | * | * | * | * | * | * | * | * | * | * |
| 41 | | ST_3 | H | * | L | L | * | * | * | * | * | * | * | * | * | * | * | * | * | * | * |
| | | | H | * | H | * | * | * | * | * | * | * | >=5 | * | * | * | L | H | * | * | * |
| 42 | | ST_8 | H | * | H | * | * | * | * | * | * | * | <5 | * | * | * | L | H | * | * | * |
| 43 | | ST_9 | H | * | H | * | * | * | * | * | * | * | * | * | * | * | H | H | * | * | * |
| 44 | | ST_A | H | H | H | * | * | * | * | * | * | * | * | * | * | * | * | L | * | * | * |
| 45 | ST_B | ST_0 | H | * | H | * | * | * | * | * | * | * | * | * | * | * | * | * | * | * | * |
| 46 | ST_C | ST_0 | H | * | H | * | * | * | * | * | * | * | * | * | * | * | * | * | * | * | * |
| 47 | ST_D | ST_0 | H | * | H | * | * | * | * | * | * | * | * | * | * | * | * | * | * | * | * |
| 48 | ST_E | ST_0 | * | * | * | * | * | * | * | * | * | * | * | * | * | * | * | * | * | * | * |
| 49 | ST_F | ST_0 | * | * | * | * | * | * | * | * | * | * | * | * | * | * | * | * | * | * | * |

FIG.51

SCHEDULER COMMAND TABLE

| CMDR /W | xCMD3 | xS2T CNTUP | xS1T CNTUP | xMT CNTUP | OPERATION |
|---|---|---|---|---|---|
| L | L | L | L | L | STATISTIC INFORMATION CLAD0 |
| L | L | L | L | H | STATISTIC INFORMATION CLAD1 |
| L | L | L | H | L | STATISTIC INFORMATION CLAD2 |
| L | L | L | H | H | STATISTIC INFORMATION CLAD3 |
| L | L | H | L | L | STATISTIC INFORMATION CLAD4 |
| L | L | H | L | H | STATISTIC INFORMATION CLAD5 |
| L | L | H | H | L | STATISTIC INFORMATION CLAD6 |
| L | L | H | H | H | STATISTIC INFORMATION CLAD7 |
| L | H | L | L | L | STATISTIC INFORMATION CLAD8 |
| L | H | L | L | H | STATISTIC INFORMATION CLAD9 |
| L | H | L | H | L | NON-TRANSFER OF STATISTIC INFORMATION |
| L | H | L | H | H | STATISTIC INFORMATION CELL ABANDONMENT TRUNK 1 |
| L | H | H | L | L | STATISTIC INFORMATION CELL ABANDONMENT TRUNK 2 |
| L | H | H | L | H | INVALID |
| L | H | H | H | L | INVALID |
| L | H | H | H | H | INVALID |
| H | L | L | L | L | INVALID |
| H | L | L | L | H | INVALID |
| H | L | L | H | L | INVALID |
| H | L | L | H | H | INVALID |
| H | L | H | L | L | INVALID |
| H | L | H | L | H | INVALID |
| H | L | H | H | L | INVALID |
| H | L | H | H | H | INVALID |
| H | H | L | L | L | INVALID |
| H | H | L | L | H | INVALID |
| H | H | L | H | L | INVALID |
| H | H | L | H | H | SUB TABLE T3 READ |
| H | H | H | L | L | INVALID |
| H | H | H | L | H | SUB TABLE T2 READ |
| H | H | H | H | L | MAIN TABLE T1 READ |
| H | H | H | H | H | INVALID |

ATM CELL MULTIPLEXER

BACKGROUND OF THE INVENTION

1. Field of the Invention

The present invention relates to an ATM cell multiplexer, and in particular to an ATM cell multiplexer connected between terminal equipments and an ATM switchboard.

"ATM (Asynchronous Transfer Mode)" technology is expected as a communication technology for realizing a multi-media society, and has been developed for fast data used in an inter-computer communication etc.

However, as seen from recent ATM forums, a network is demanded in the market where the communication protocols of prior art such as for voices, HDLC (High level Data Link) and FR (frame relay) can also be interworked with the ATM technology.

When such a network is constructed, it is useful to set up an ATM cell multiplexer as an apparatus in branch circuit or line system in order to construct an ATM switchboard (ATM switch) as a key network and to increase the accommodation efficiency of circuits with terminal equipments.

2. Description of the Related Art

FIG. 52 shows a general arrangement of such an ATM cell multiplexer. An ATM cell multiplexer generally designated by reference numeral 2 is adapted to assemble data received from a terminal equipment generally designated by reference numeral 1 in the form of an ATM cell, to send the data to an ATM switchboard generally designated by reference numeral 3 through a trunk circuit, and to disassemble the ATM cell (hereinafter simply referred to as the cell) which is received through the trunk circuit from the ATM switchboard 3 and transmitted to the terminal equipment 1.

In this ATM cell multiplexer, although strict traffic control (QOS control) proper to the ATM protocol is demanded, the prior art ATM switchboard and ATM cell multiplexer has installed an ATM switch (not shown) to perform the traffic control.

However, the ATM switch is disadvantageous in that the manufacturing cost is highly expensive and the control of the software/hardware is complicated, requiring a large-sized unit.

While an ATM cell multiplexer such as shown in the Japanese Patent Laid-open Publication No.5-91126 has been proposed, it requires the output capacity for the whole circuits because of adopting a method in which cells are simply multiplexed.

In addition, an ATM cell multiplexer such as shown in the Japanese Patent Laid-open Publication No.7-38569 uses a plurality of CLAD units which include both functions of cellulating data received from the terminal equipments and decellulating the cells received from the trunk circuits. However, when the cells through a plurality of connections mutually compete within the ATM cell multiplexer, some of the cells must be delayed or stood by to make the cells communicate without any collision in each of service categories such as CBR (Constant Bit Rate), VBR (Variable Bit Rate), or UBR (Unspecific Bit Rate).

This is not particularly allowed in a service category like CBR in which a time delay is strictly prohibited.

SUMMARY OF THE INVENTION

It is accordingly an object of the present invention to provide an ATM cell multiplexer which can simply and inexpensively assemble or disassemble cells without causing a time delay between terminal equipments and an ATM switchboard.

To achieve the above-mentioned object, an ATM cell multiplexer according to the present invention comprises a plurality of CLAD units, connected in parallel on an ATM bus so that ATM cells are assembled and disassembled between terminal equipments and the ATM switchboard, each including a cell holding portion, a communication controller, and a cell terminal portion which are all mutually connected with a Utopia Level 2 interface (hereinafter, occasionally referred to simply as "Utopia Level 2"), and an ATM bus scheduler for an ATM bus control connected to the CLAD units through the ATM bus; the cells from the cell terminal portion being held in the cell holding portion through the Utopia Level 2 under control of the communication controller for a cell transfer in the up direction from the terminal equipments to the ATM switchboard, and the ATM bus scheduler making the cell holding portion transmit the cells to the ATM bus by assigning a transmission right for every cell holding portion of the CLAD units in accordance with a preset schedule table based on at least one of predetermined service categories and a traffic control corresponding to a traffic quantity; and the cells being broadcast from the ATM bus to the cell holding portion of each CLAD unit for a cell transfer in the down direction from the ATM switchboard to the terminal equipments, and the communication controller making the cell holding portion transfer the cells to the cell terminal portion through the Utopia Level 2 to decide whether or not the cells are addressed to itself.

Namely, in order to efficiently and easily multiplex the ATM cell transmitted from a plurality of CLAD units, the ATM cell multiplexer according to the present invention, as schematically shown in FIG. 1, is provided therein with an ATM bus 12, to which CLAD units 13-1-13-$n$ (hereinafter occasionally referred to as "13") are connected in parallel to enable the cell to be transmitted to a trunk circuit or a backup circuit thereof from the CLAD units 13 through a trunk circuit controller 14 or a backup circuit controller 15, respectively.

Also, in order to provide an opportunity of transmitting the cells out of the CLAD units 13, an ATM bus scheduler 11 is connected to the ATM bus 12. This ATM bus scheduler 11 performs cell multiplexing operations and traffic controls without installing any ATM switch by controlling the transmission/reception of the cells on the ATM bus 12.

In this case, "schedule" means that the ATM bus scheduler 11 assigns a transmission right of cells to each of the CLAD units 13 so that the cells may be transmitted to the ATM switchboard (see FIG. 1) from the CLAD units 13 through the trunk circuit.

The CLAD units 13 accommodate terminal circuits connected to the terminal equipments (see FIG. 1), and assemble data received from the terminal equipments in the form of cell which is to be transmitted to the ATM bus 12. The cells received from the ATM switchboard through the trunk circuit are also transmitted to the ATM bus 12 and each of the CLAD units 13.

The role of the ATM bus 12 is an interface between an ATM layer (a network layer) in the CLAD units 13 and a physical layer by a physical layer terminal portion (PHY) 10 in the circuit controllers 14 and 15. For this function, the CLAD units 13 are provided with an ATM cell terminal portion 20 represented by an SAR (Segmentation And Reassembly) including a function of assembling and disassembling ATM cells.

Also, as the above-mentioned interface a Utopia Level 2 is adopted, which is a standard interface prescribed by the ATM forum and is known as what achieves data transfer with the physical layer terminal portion 10 individually connected to the ATM cell terminal portion 20, as shown in FIG. 2. Hereinafter, apart from the arrangement in FIG. 1, the Utopia Level 2 per se will be described referring to FIGS. 2–4.

Transmission of Cells from ATM Layer to Physical Layer Terminal Portion 10: see FIG. 3

A signal TxCav from the physical layer terminal portion 10 to the ATM cell terminal portion 20 of the CLAD units 13 is one for indicating that the physical layer terminal portion 10 can receive the cells.

When a transmitting cell exists inside the ATM cell terminal portion 20 and the signal TxCav indicates that the physical layer terminal portion 10 is in a reception enable state, based on a clock signal CLK, the ATM cell terminal portion 20 transmits cell data TxData composed of data Data01-Data53 with a signal TxEnb asserted or enabled (an inverted TxEnb deasserted or disabled).

A signal TxSoc is also asserted at the time of the head data01 in the cell data TxData. The cell data TxData is transmitted while the signal TxEnb is asserted.

Transmission of Cells from Physical Layer Terminal Portion 10 to ATM Layer: see FIG. 4

A signal RxCav from the physical layer terminal portion 10 to the ATM cell terminal portion 20 is one for indicating that there is a transmitting cell in the physical layer terminal portion 10. If the ATM cell terminal portion 20 itself can receive, or is a reception enable state of cell, it asserts a signal RxEnb or deasserts an inverted RxEnb to receive cell data RxData composed of Data01-Data53. The signal TxSoc is also asserted at the time of the head Data01 in the cell data RxData. The physical layer terminal portion 10 also asserts a signal RxSoc at the time of the head Data01 in the cell data RxData to be transmitted. Only while the signal RxEnb is being asserted, the physical layer terminal portion 10 transmits the cell data Data01-Data53.

Since various kinds of parts having an Utopia Level 2 which is a standard of the ATM forum are available on the market, it is of great advantage to use the Utopia Level 2 in aspect of both cost and function. However, in the arrangement in FIG. 1 it is quite difficult to use the Utopia Level 2 as it is between the physical layer terminal portion 10 and the ATM bus 12, and between the ATM bus 12 and the ATM cell terminal portion 20.

Namely, the Utopia Level 2 is one through which the ATM layer controls the physical layer terminal portion 10 and allows a single cell to be disassembled minutely in octet for the transmission thereof Therefore, if the Utopia Level 2 is connected to the ATM bus as shown in FIG. 2, following problems arise: ① The time when the cell transfer is completed is not guaranteed; ② Accordingly, there is no guarantee of realizing the same bus scheduling as the ATM bus scheduler 11 has supposed.

Therefore, in the present invention, some devices are made to the arrangement in FIG. 1 as noted below and schematically shown in FIG. 5 in order that a bus connection is executed without any trouble in the Utopia Level 2 of the arrangement shown in FIG. 1.

First of all, in each of the CLAD units 13, FIFO's 21 and 22 are provided which form a cell holding portion between the ATM cell terminal portion 20 and the ATM bus 12 in addition to the ATM cell terminal portion 20 having the Utopia Level 2 which is the standard of the ATM forum. The output data from the ATM cell terminal portion 20 are accumulated by at least a single cell in the FIFO 21, and the output data from the physical layer terminal portion 10 are accumulated by at least a single cell in the FIFO 22.

In addition, an ATM communication controller 23 is provided which has the Utopia Level 2 UIF for controlling the transfer of data between the FIFO's 21, 22 and the ATM cell terminal portion 20.

FIG. 6 shows an arrangement of a conversion between the Utopia Level 2 UIF which lies between the ATM communication controller 23 and the ATM cell terminal portion 20 and an interface PIF which is proper for the present invention and lies between the ATM communication controller 23 and the ATM bus 12.

It is to be noted that the ATM bus 12 is arranged in accordance with the Utopia Level 2 in consideration of the compatibility with the Utopia Level 2 UIF. Accordingly, the ATM bus 12, that is the ATM bus scheduler 11, and the physical layer terminal portion 10 are equivalent to each other.

FIGS. 7 and 8 respectively show a time chart between the ATM communication controller 23 and the ATM bus 12 (the ATM scheduler 11), and the schematic operation of the ATM bus 12 according to the present invention will be described referring to FIGS. 6–8.

Transmission of Cells from ATM Bus 12 to ATM Cell Terminal Portion 20: see FIG. 7

In this case, the ATM communication controller 23 monitors a DSOC signal on the ATM bus 12 which indicates that the heads of cells are transmitted to the ATM bus 12 from the trunk circuit, that is the physical layer terminal portion 10. When the DSOC signal is asserted through the interface PIF or when the inverted DSOC signal is deasserted as shown in the figure, the ATM communication controller 23 recognizes it as the heads of cells and takes the following 53-byte cell data DData (Data01-Data53) into the FIFO 22.

After having taken the cell data into the FIFO 22, the ATM communication controller 23 transfers the cell to the ATM cell terminal portion 20 according to the procedure of the above-mentioned Utopia Level 2 UIF shown in FIG. 2, and returns the signal indicating the completion of the transfer to the ATM bus 12 through the interface PIF.

Transmission of Cells from ATM Cell Terminal Portion 20 to ATM Bus 12: see FIG. 8

At least one of the cells from the ATM cell terminal portion 20 is written in the FIFO 21 through the Utopia Level 2 UIF under the control of the ATM communication controller 23. After the accumulation of a single cell in the FIFO 21, the ATM communication controller 23 outputs a transmission request signal (REQ) to the ATM bus 12 upon receiving a TXE signal from the ATM bus 12 which indicates that the trunk circuit can receive the cell.

When a GNT (transmission enable) signal is received from the ATM bus 12 through the interface PIF, a selecting signal BRI#xENB of the circuit is firstly asserted, or the inverted signal is deasserted as shown in the figure. Then, a USOC signal indicating the head of cell is asserted through the interface PIF, or the inverted signal is deasserted as shown in the figure while at the same time the cell data UData (Data01-Data53) are transmitted through the interface PIF.

Such an arrangement enables the following functions:

① Management of the transmission/reception of cell by the ATM scheduler 11 can be easily executed because a single cell in the data on the ATM bus 12 is continuously transmitted;

② Management for the ATM bus 12 can be executed only by the ATM bus scheduler 11 apart from the ATM cell terminal portion 20, for the simplification of control;

③ Supposed scheduling of the ATM bus scheduler 11 is made possible and the control of the transmission right to the CLAD units is made possible according to the service categories, which will be described later, prescribed by the ATM forum.

The ATM bus scheduler 11 controls the ATM bus 12 as follows:

(1) When the cells are transmitted to the ATM bus 12 from a plurality of the CLAD units 13, the ATM bus scheduler 11 avoids the competition of the cells on the ATM bus 12;

(2) In order to transmit the cells to the ATM switchboard through the trunk circuit from the CLAD units 13 according to the service categories (CBR, rt (real time)-VBR, nrt (non-real time)-VBR, UBR) prescribed by the ATM forum, the ATM bus scheduler 11 gives the transmission right to each of the CLAD units 13 based on the service categories. Only when being given a transmission right by the ATM bus scheduler 11, the CLAD units 13 transmit the cell to the ATM bus 12;

(3) The ATM bus scheduler 11 controls the cell transmission in agreement with the traffic quantity so that the transmission rate should not exceed a predetermined maximum cell rate (PCR) and average cell rate (SCR) when CLAD unit 13 transmit the cells.

It is to be noted that the above-mentioned ATM bus scheduler can control the transmission/reception of the cells by assigning the cells in the up and down directions equally on the ATM bus in case that a single trunk circuit is connected to the ATM switchboard.

Alternatively, the ATM bus scheduler can also control the reception of a plurality of cells within a single time slot in the down direction while a single cell in the up direction in case that a plurality of trunk circuits are connected to the ATM switchboard.

When there are a plurality of the above-mentioned trunk circuits and the physical speeds are mutually different, the ATM bus scheduler can select a detour or non-detour per each CLAD unit by thinning out a set interval in a memory table which determines the order of the transmission right given by the ATM bus.

It is possible that the ATM bus scheduler can extend the number of the trunk circuits by assigning the reception right per each CLAD unit in accordance with a preset schedule table by the traffic control which complies with a predetermined service category or the traffic quantity with respect to the cells not only in the up direction but also in the down direction.

It is also possible that an SVC call setting controller is provided besides the CLAD units to control the call set protocol, and to set in the CLAD units a connection ID determined on the trunk circuit, thereby connecting to the ATM switchboard.

The SVC call setting controller may set a virtual connection ID and have an SOFT-PVC function prescribed by the PNNI.

The above service categories may comprise CBR, rt-VBR, nrt-VBR, and UBR. The schedule table may be composed of a main table including all service categories except UBR and a sub table including service categories with a lower priority for the transmission right. The ATM bus scheduler may assign the transmission right on the basis of the sub table only when the CLAD units in the main table have abandoned the transmission rights.

The main table may be prepared so that the transmission rights for the CLAD units are equally allocated to every time slot in a frame in the order of CBR, rt-VBR and nrt-VBR and in the registration order of the CLAD units.

BRIEF DESCRIPTION OF THE DRAWINGS

FIGS. 3A and 3B are time charts of a Utopia Level 2 (an ATM bus→trunk circuit controller);

FIG. 5 is a block diagram showing a more specific arrangement of an ATM cell multiplexer according to the present invention;

FIG. 17 is a time chart of an ATM bus (a trunk circuit controller→CLAD units);

FIG. 19 is a time chart of an ATM bus (CLAD units→a trunk circuit controller);

FIGS. 20A and 20B are time charts of up cell transfer inside CLAD units;

FIG. 36 is a table chart showing an input/output signal of an ATM bus scheduling portion which forms an ATM bus scheduler in an ATM cell multiplexer according to the present invention;

FIG. 37 is a table chart showing an input/output signal of an ATM bus scheduling memory controller which forms an ATM bus scheduler in an ATM cell multiplexer according to the present invention;

FIG. 39 is a table chart showing a down scheduler transition of an ATM bus scheduler in an ATM cell multiplexer according to the present invention;

Figure 41:
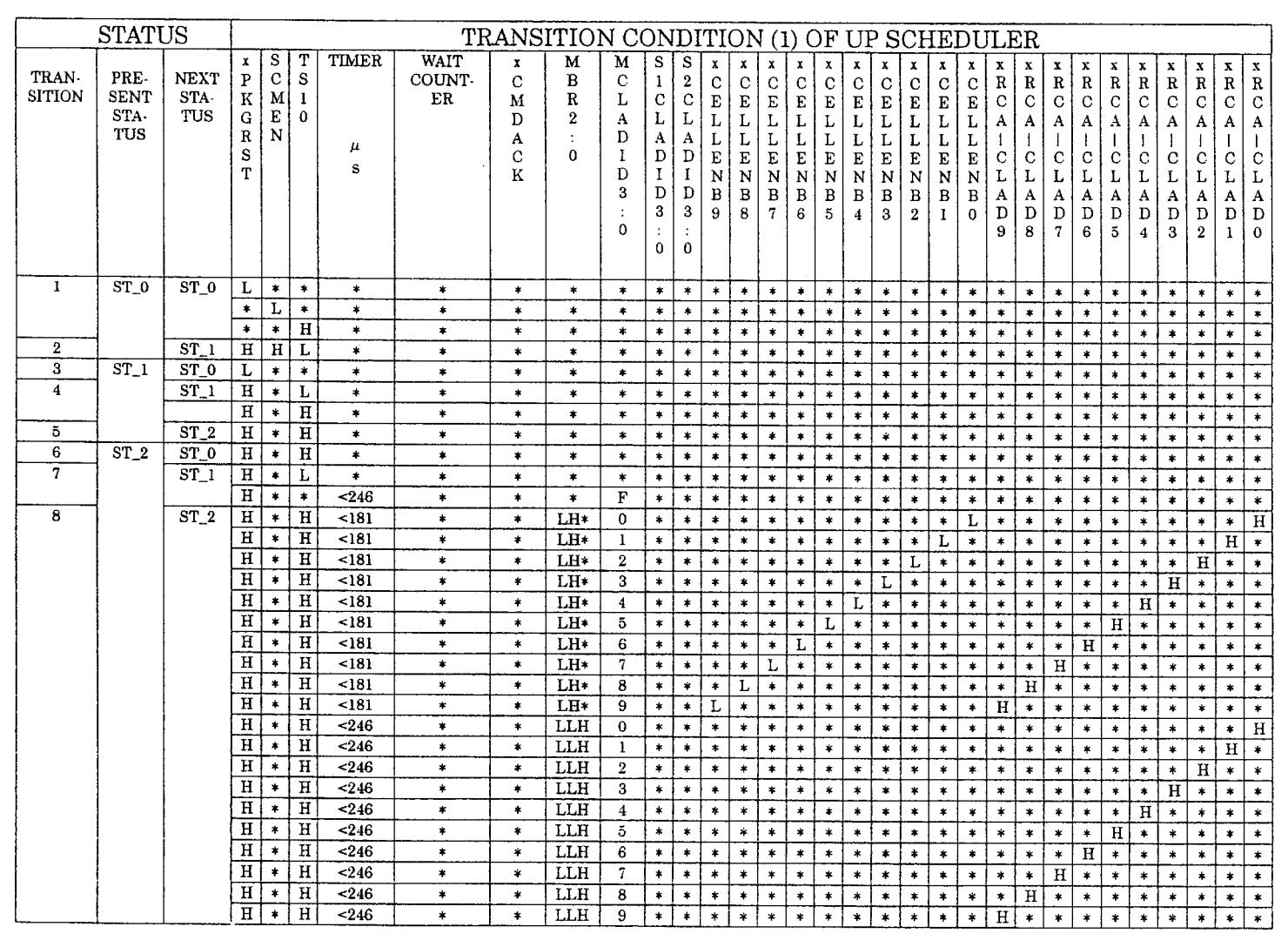

FIG. 41 is a table chart showing an up scheduler transition condition (1) of an ATM bus scheduler in an ATM cell multiplexer according to the present invention;

Figure 42:
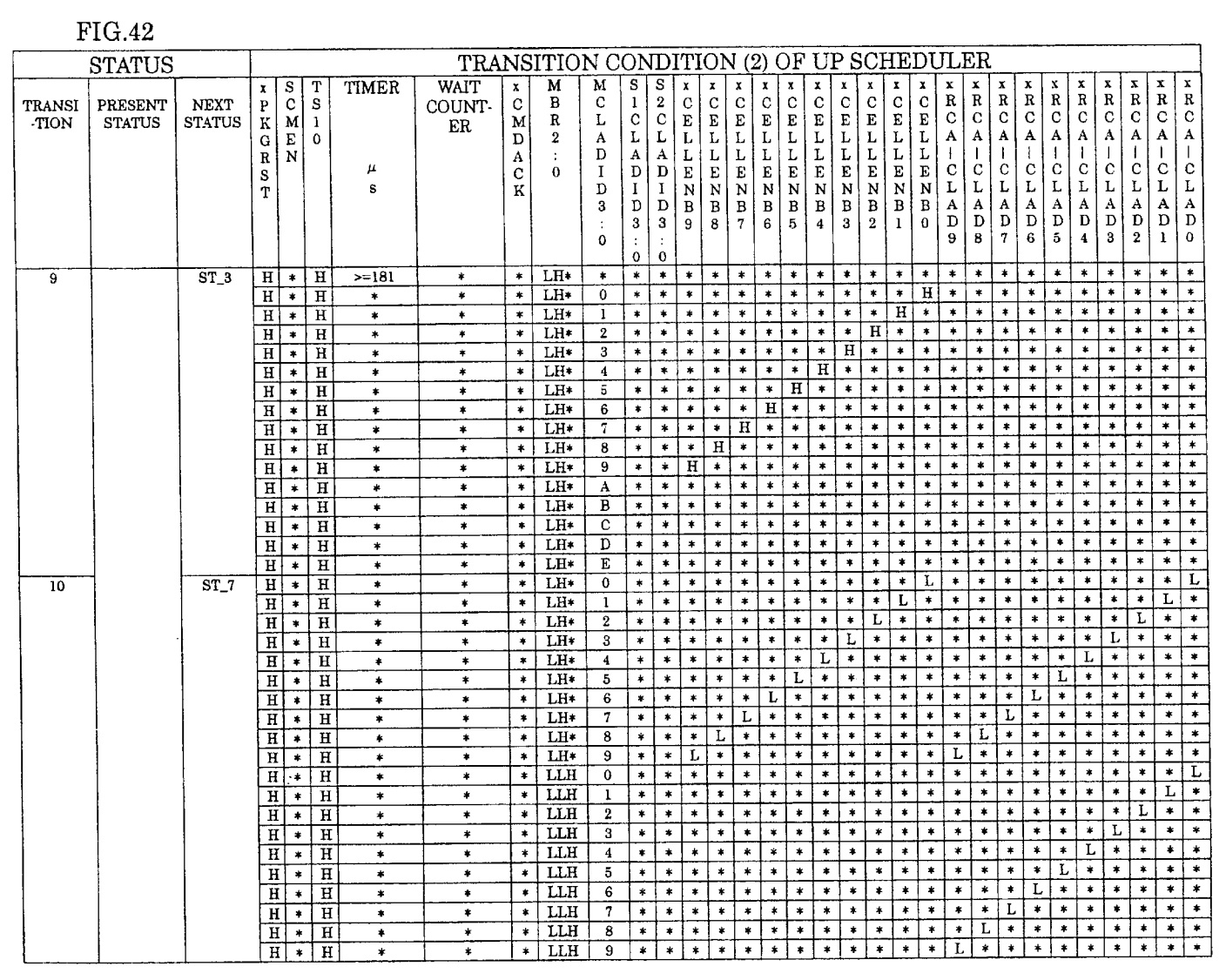

FIG. 42 is a table chart showing an up scheduler transition condition (2) of an ATM bus scheduler in an ATM cell multiplexer according to the present invention;

Figure 43:
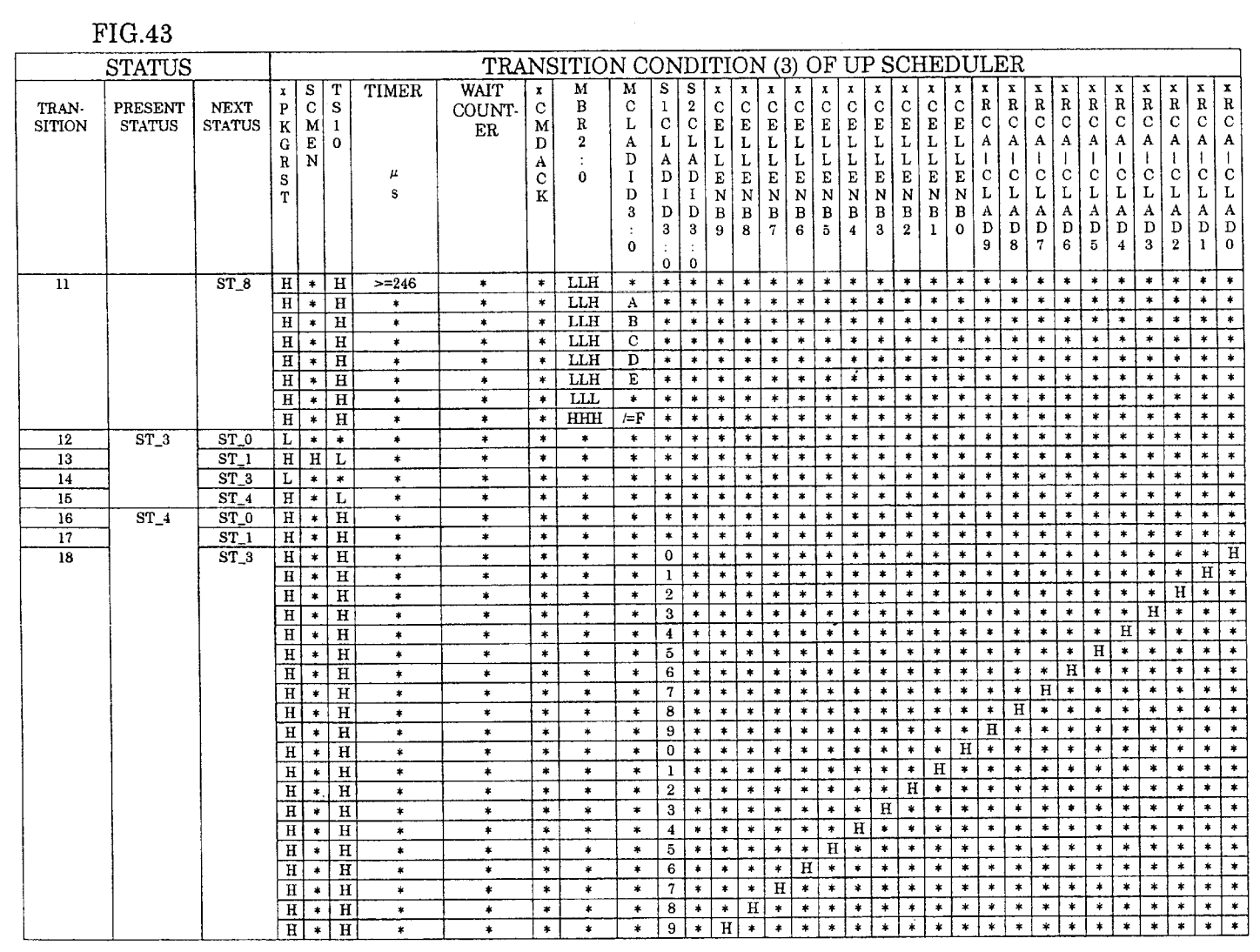

FIG. 43 is a table chart showing an up scheduler transition condition (3) of an ATM bus scheduler in an ATM cell multiplexer according to the present invention;

Figure 44:
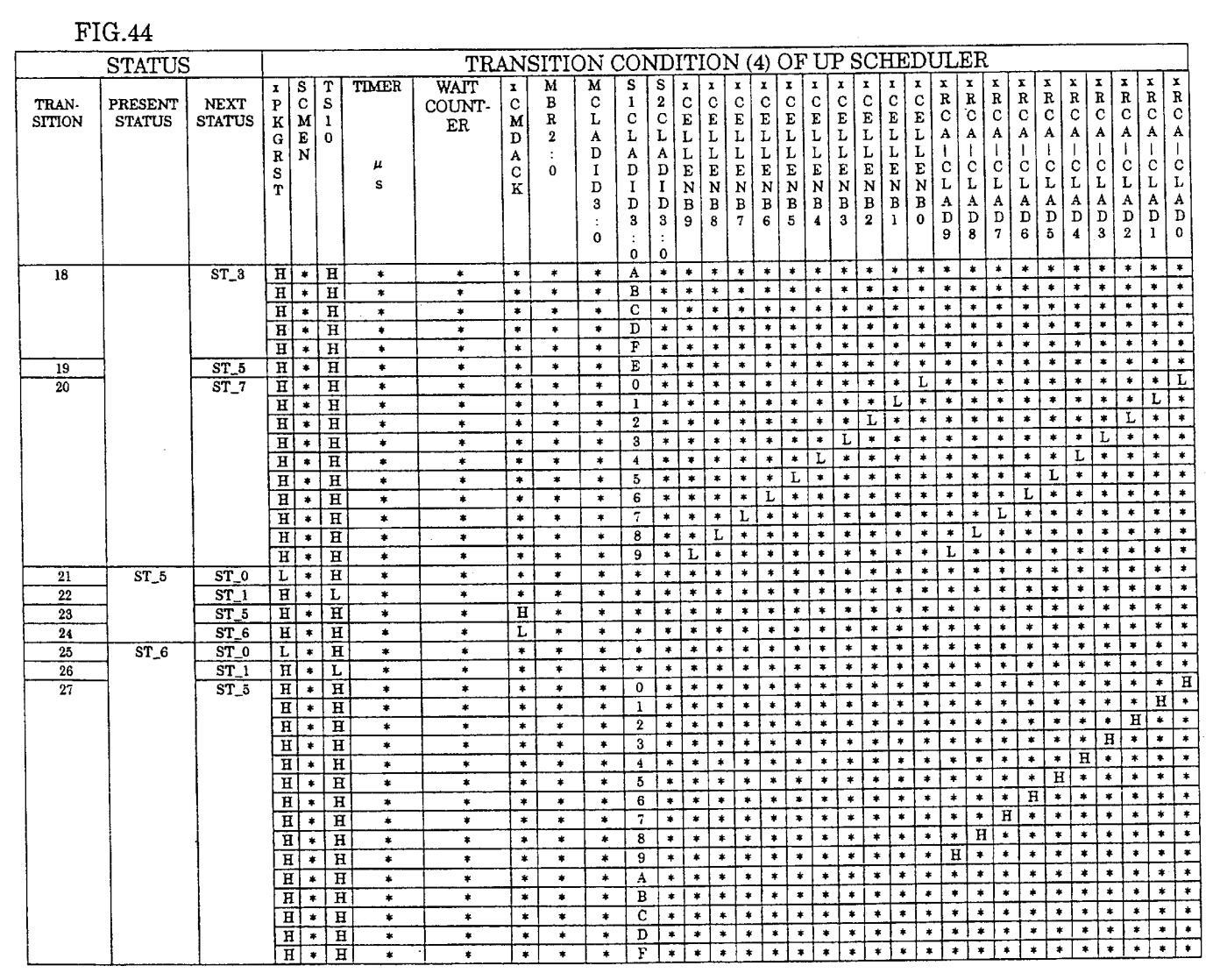

FIG. 44 is a table chart showing an up scheduler transition condition (4) of an ATM bus scheduler in an ATM cell multiplexer according to the present invention;

Figure 45:
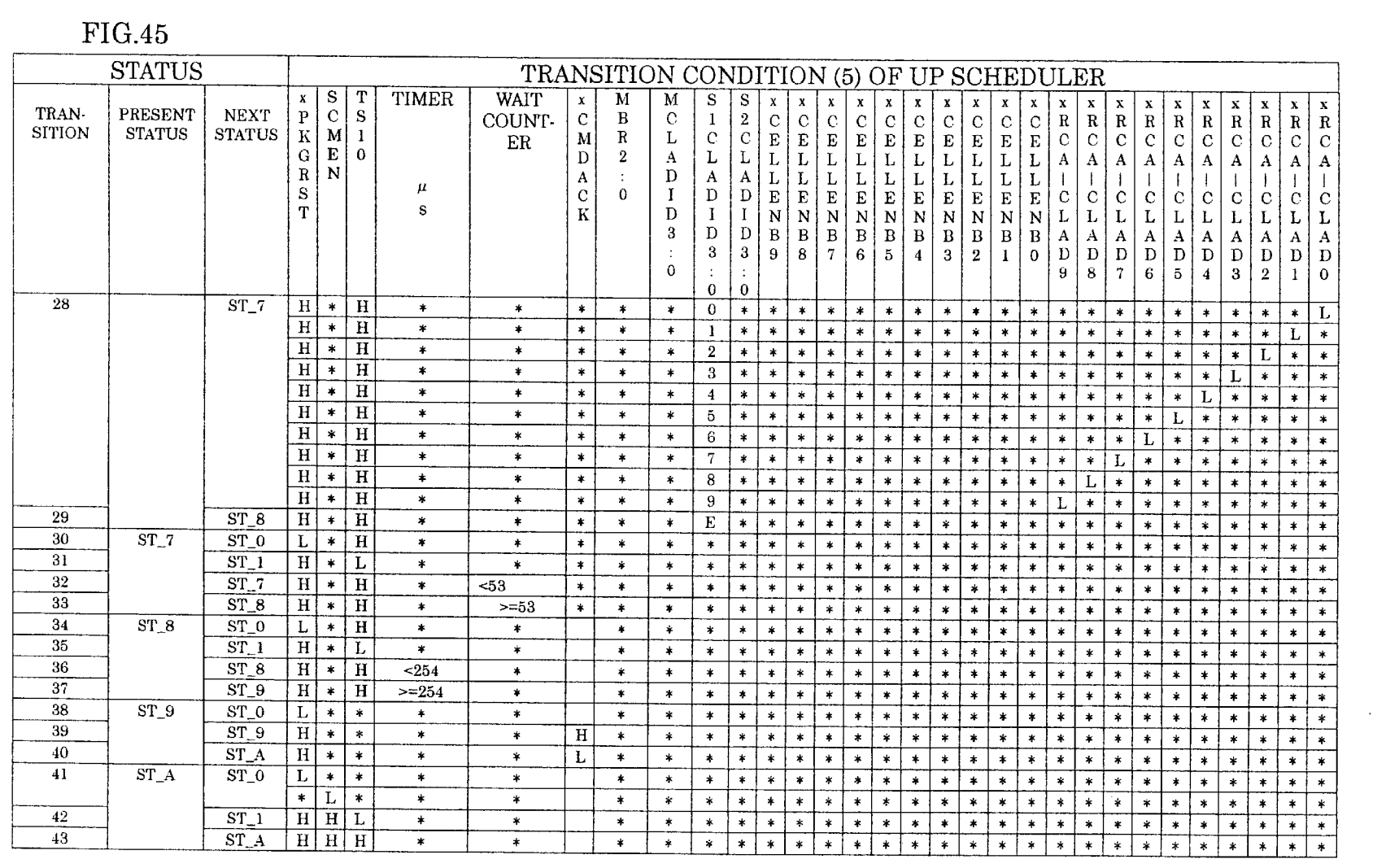

FIG. 45 is a table chart showing an up scheduler transition condition (5) of an ATM bus scheduler in an ATM cell multiplexer according to the present invention;

FIG. 47 is a table chart showing a transition condition (1) of a scheduler command receiver of an ATM bus scheduler in an ATM cell multiplexer according to the present invention;

FIG. 48 is a table chart showing a transition condition (2) of a scheduler command receiver of an ATM bus scheduler in an ATM cell multiplexer according to the present invention;

FIG. 49 is a table chart showing a transition condition (3) of a scheduler command receiver of an ATM bus scheduler in an ATM cell multiplexer according to the present invention;

FIG. 50 is a table chart showing a transition condition (4) of a scheduler command receiver of an ATM bus scheduler in an ATM cell multiplexer according to the present invention;

FIG. 51 is a table chart showing a scheduler command of an ATM bus scheduler in an ATM cell multiplexer according to the present invention.

Throughout the figures, like reference numerals indicate identical or corresponding portions.

DESCRIPTION OF THE EMBODIMENTS

Figure 9:
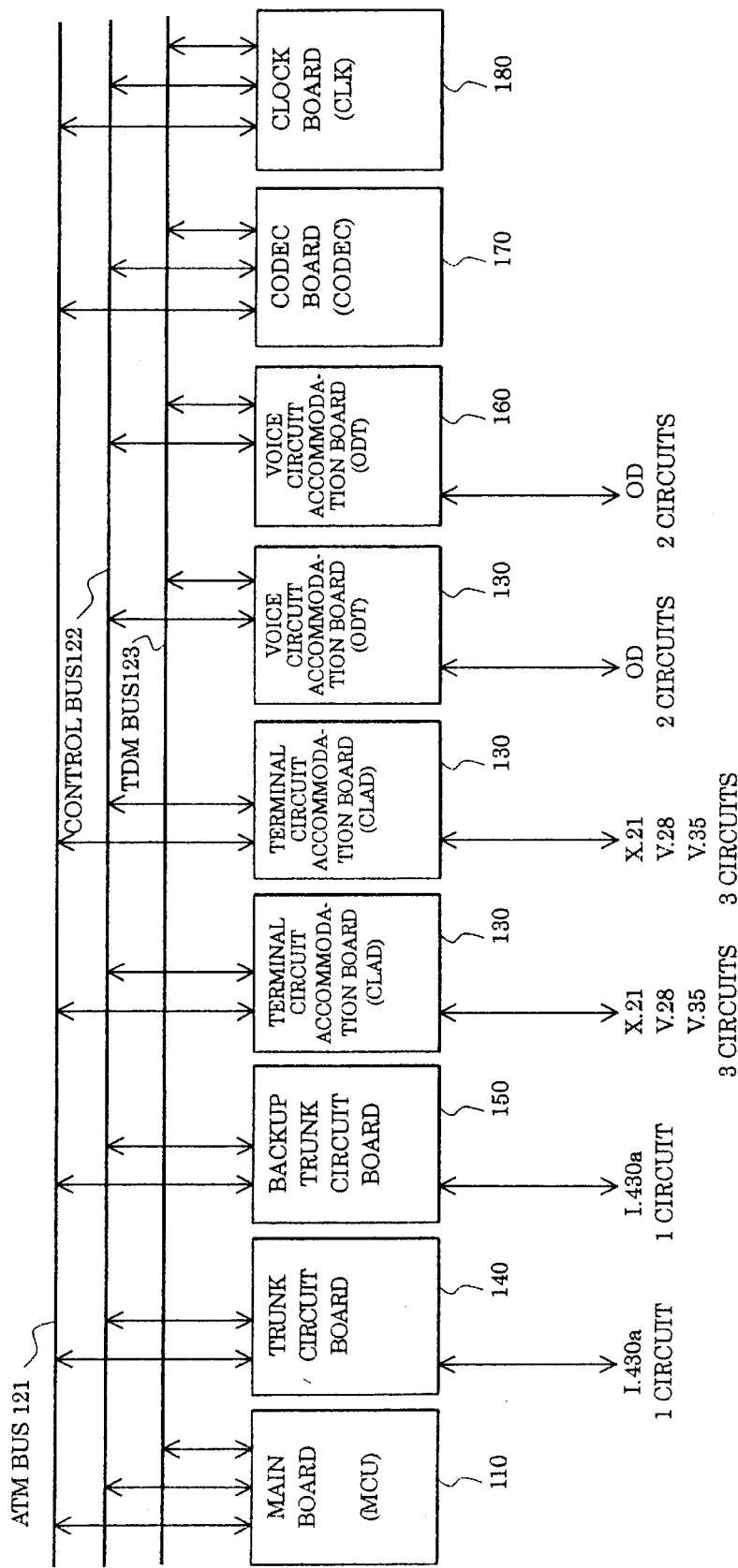
FIG. 9 is a block diagram showing a board arrangement of an ATM cell multiplexer according to the present invention.

FIG. 9 shows an embodiment of an ATM cell multiplexer according to the present invention. In the figure, a main board (MCU) 110 mounts thereon an ATM bus scheduler 11 for controlling the whole of the device. Also, a terminal circuit accommodation board 130 mounts thereon CLAD units 13, and accommodates terminal equipments having V/X interfaces. A trunk circuit board 140 mounts thereon a physical layer terminal portion 10, and accommodates trunk circuits. A backup trunk circuit 150 mounts thereon the physical layer terminal portion 10, and accommodates backup circuits.

In addition, a voice circuit accommodation board (ODT) 160 accommodates an OD circuit for voice, a CODEC board 170 mounts thereon a CODEC for compressing 64K-voice-PCM data into 8K- or 16K-voice-PCM data, and a clock board (CLK) 180 supplies a standard clock for an ATM bus 121 and a TDM (time division multiplexing) bus 123.

Inside this ATM cell multiplexer, three kinds of buses, i.e. the ATM bus 121, a control bus (CBUS) 122, and the TDM bus 123 are provided as the above-noted ATM bus 12.

The ATM bus 121 transmits an ATM cell between the trunk circuit boards 140, 150 and the terminal circuit accommodation board 130 and the CODEC board 170, and is an 8-bit bus which separates the cell flow into both up and down directions.

The control bus 122 lies between processors connecting a main CPU mounted in the main board 110 to sub CPU's mounted in the terminal circuit accommodation board 130 and the voice circuit accommodation board 160. Since the trunk circuit boards 140, 150, and the CODEC board 170 mount thereon no processor, the main CPU in the main board 110 directly controls the inside of the trunk circuit boards 140, 150 and the CODEC board 170 via the control bus 122.

For the terminal circuit accommodation board 130 and the voice circuit accommodation board 160 which mount thereon the sub CPU, the main CPU of the main board 110 executes the transfer of program information, the transfer of various kinds of communication control information, and the periodical confirmation of normality.

The TDM bus 123 is one exclusively for a PCM signal transfer for connecting the voice circuit accommodation board 160 to the CODEC board 170, and is composed of two serial buses for up/down direction each having 128 TS's (time slots).

The function of each board will now be described more specifically.

Main Board 110

The functions of the main CPU mounted in the main board 110 are as follows:
Transmission control and management/competition control for the whole of the ATM bus 121;
Control of the control bus 122 as a bus master;
Monitoring operation of normality for the TDM bus 123;
Transfer of the program information for the terminal circuit accommodation board 130 and the voice circuit accommodation board 160;
Activation/deactivation of each board;
Setting and control of the function inside the trunk circuit boards 140, 150 and the CODEC board 170;
Transfer of various kinds of communication control information for the sub CPU inside the terminal circuit accommodation circuit board 130 and the voice circuit accommodation board 160;
Exchange of network management information between a network management device (not shown) and the main board 110.

In this main board 110, when the network management information is exchanged with the network management device, a ATM cell terminal portion 20 achieves the function of an ATM cellulating/decellulating information.

Figure 10:
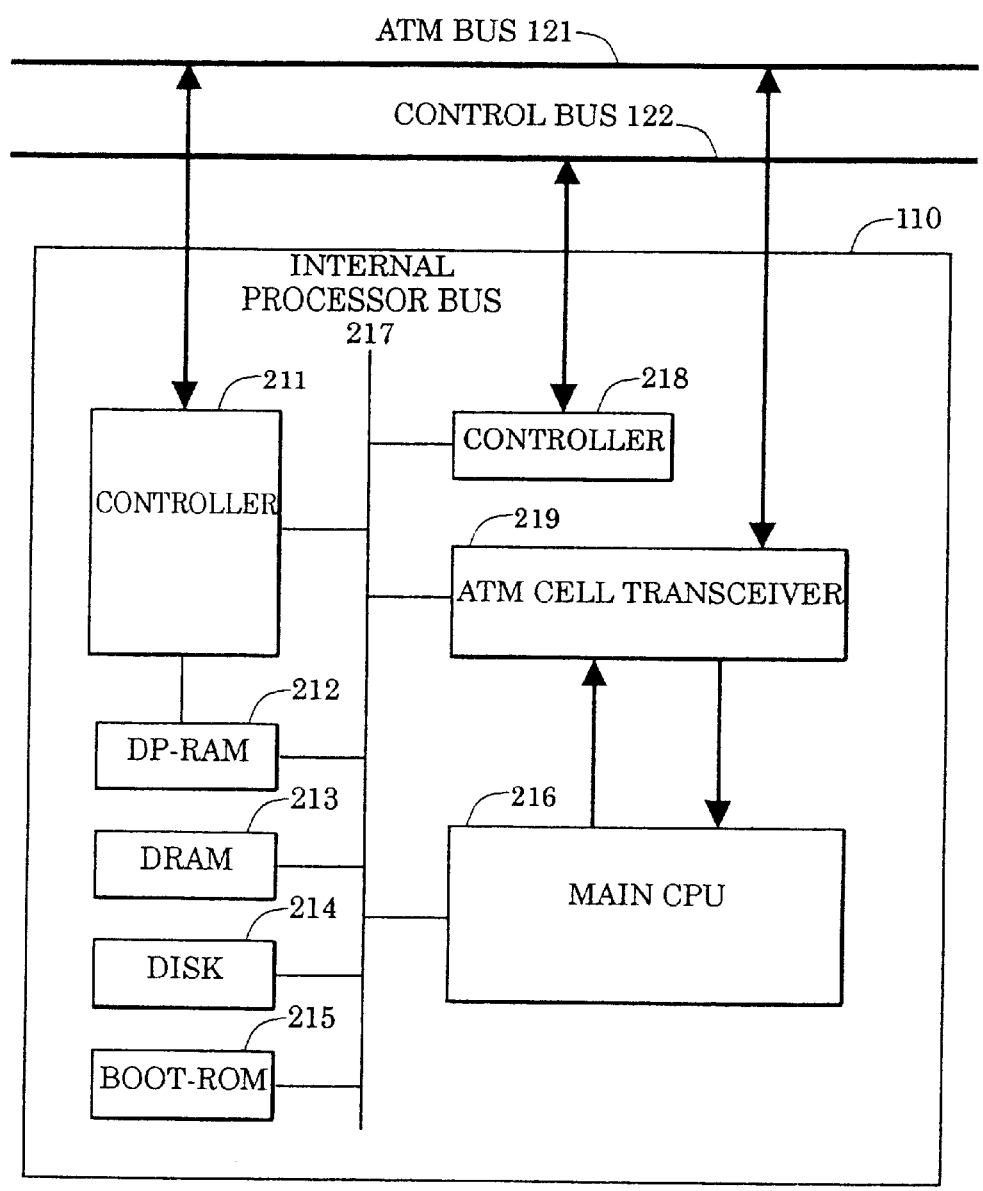
FIG. 10 is a block diagram showing a circuit arrangement of a main board used in an ATM cell multiplexer according to the present invention.

A circuit arrangement of this main board 110 is shown in FIG. 10, which is composed of a controller 211, a DP-RAM 212, a DRAM 213, a DISK 214, a BOOT-ROM 215, a main CPU 216, an internal processor-bus 217, a controller 218, and an ATM cell transceiver 219.

The elements are mutually connected through the internal bus 217, the controller 211 is connected to the ATM bus 121, the controller 218 is connected to the control bus, and the ATM cell transceiver 219 is connected to the ATM bus 121.

Terminal Circuit Accommodation Board 130

This board 130 accommodates a data terminal device including a V/X interface, and has the following functions:
Interwork between a frame relay and the ATM system;
Interwork between an HDLC system data and the ATM system, The HDLC system data is cellulated after capsuling the frame relay.

The ATM cell terminal portion 20 mounted in this board 130 supports "Utopia Level 2" which is a standard ATM interface prescribed by the ATM forum, and the "Utopia Level 2" has a good affirnity for achieving the function of the above-mentioned CLAD units 13.

Figure 11:
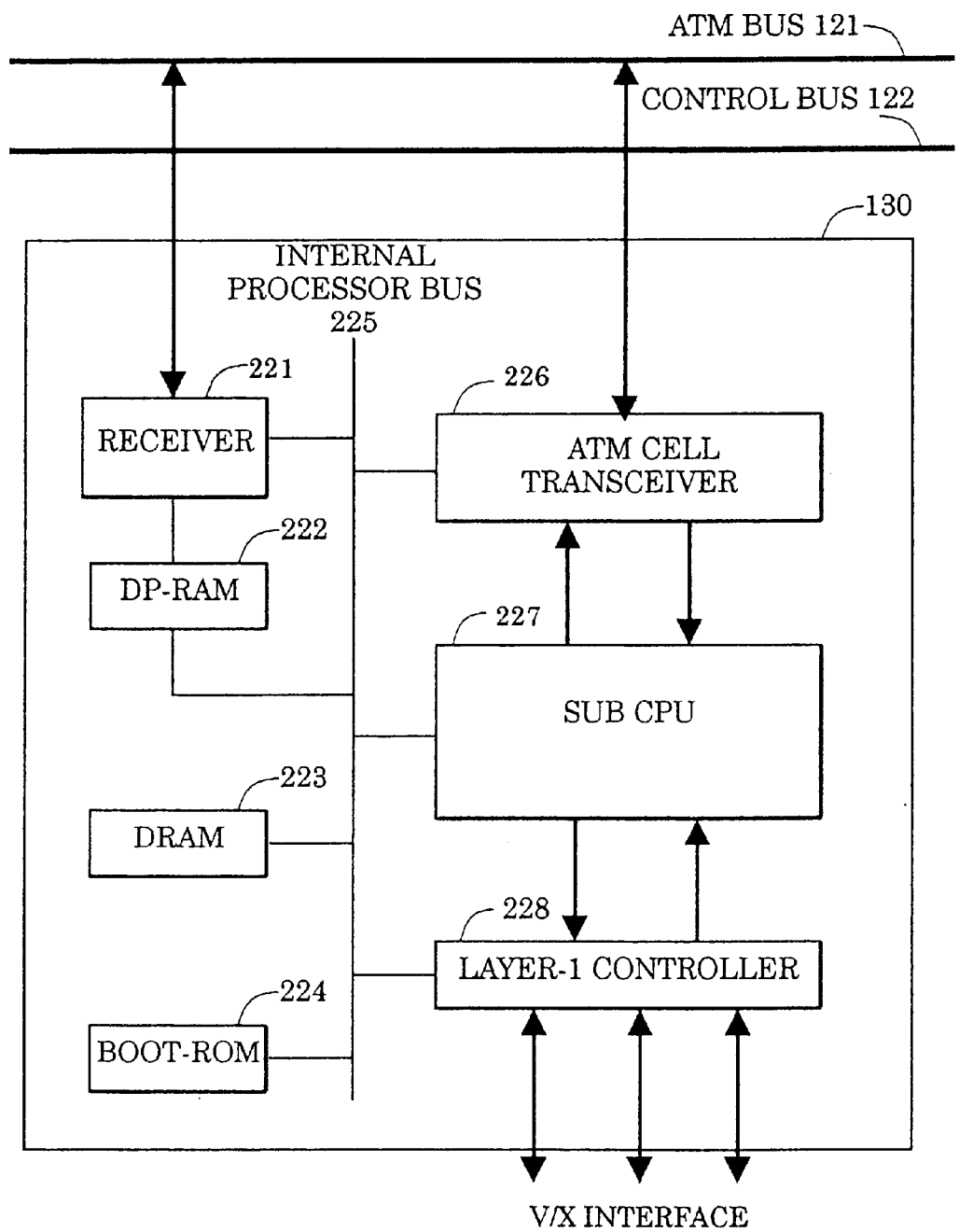
FIG. 11 is a block diagram showing a circuit arrangement of a terminal circuit accommodation board used in an ATM cell multiplexer according to the present invention.

FIG. 11 shows a circuit arrangement of this terminal circuit accommodation board 130, which is composed of a receiver 221, a DP-RAM 222, a DRAM 223, a BOOT-RAM 224, an internal processor bus 225, an ATM cell transceiver 226, a sub CPU 227, and a layer 1 controller 228.

The elements are mutually connected through the internal bus 225, and the receiver 221 is connected to the control bus 122, the ATM cell transceiver 226 is connected to the ATM bus 121, and the controller 228 is connected to the terminal circuit.

Trunk Circuit Boards 140, 150

These boards 140, 150 accommodate a high-speed (128 k) digital circuit, and its function is to convert serial data of the trunk circuit into 8-bit parallel data of the ATM bus 121.

Figure 12:
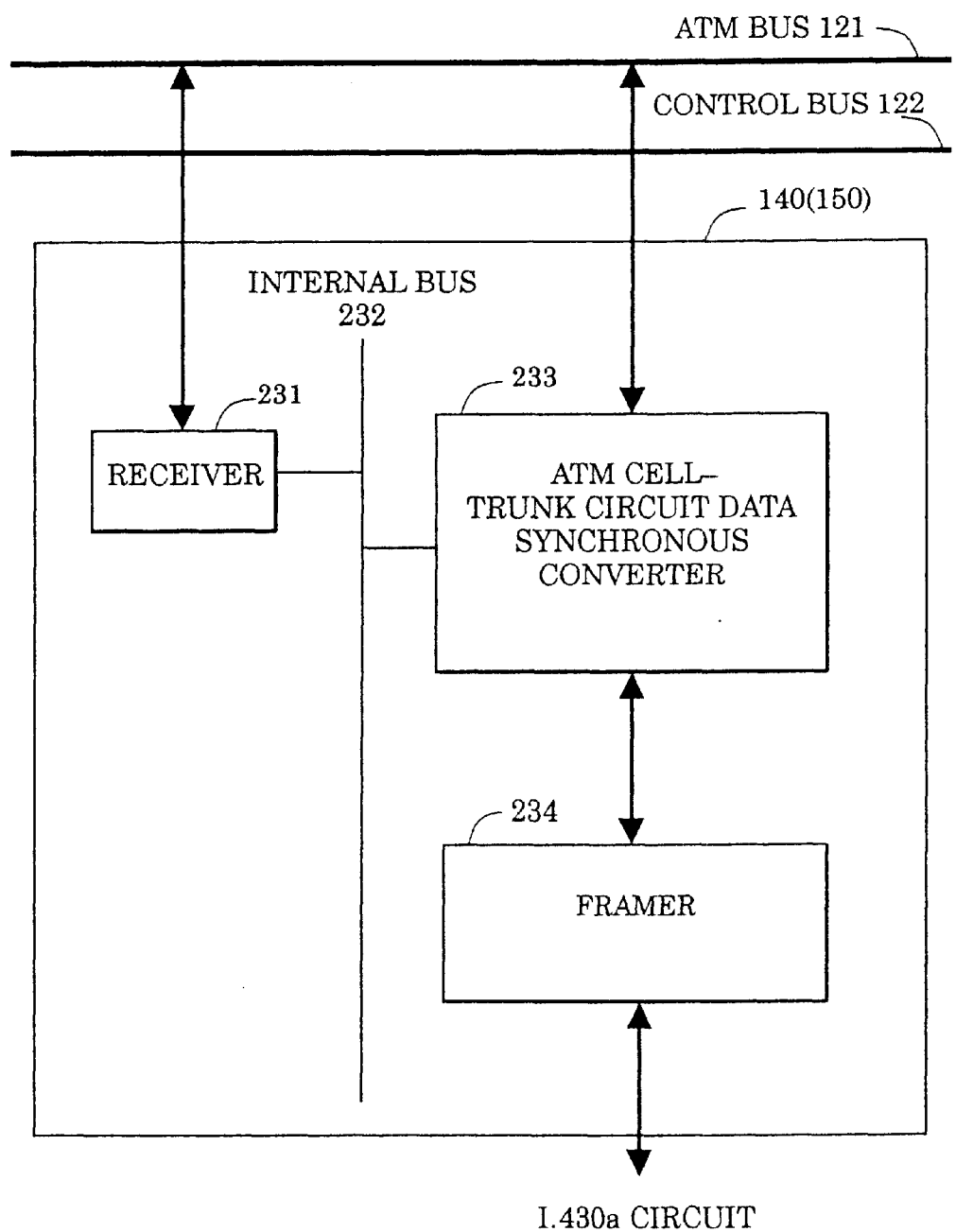
FIG. 12 is a block diagram showing a circuit arrangement of a trunk circuit board used in an ATM cell multiplexer according to the present invention.

FIG. 12 shows a circuit arrangement, which is composed of a receiver 231 connected to the control bus 122, an internal bus 232 which mutually connects the elements, an ATM cell-trunk circuit data synchronous converter 233 connected to the ATM bus 121, and a framer 234 connected to the circuit.

Voice Circuit Accommodation Board 160

This board 160 accommodates an OD interface circuit e.g. a PBX for enabling the accommodation of the voice information, and has the following functions:
Accommodation and termination of the OD interface;
Conversion analog voice information into a 64K-PCM signal.

Figure 13:
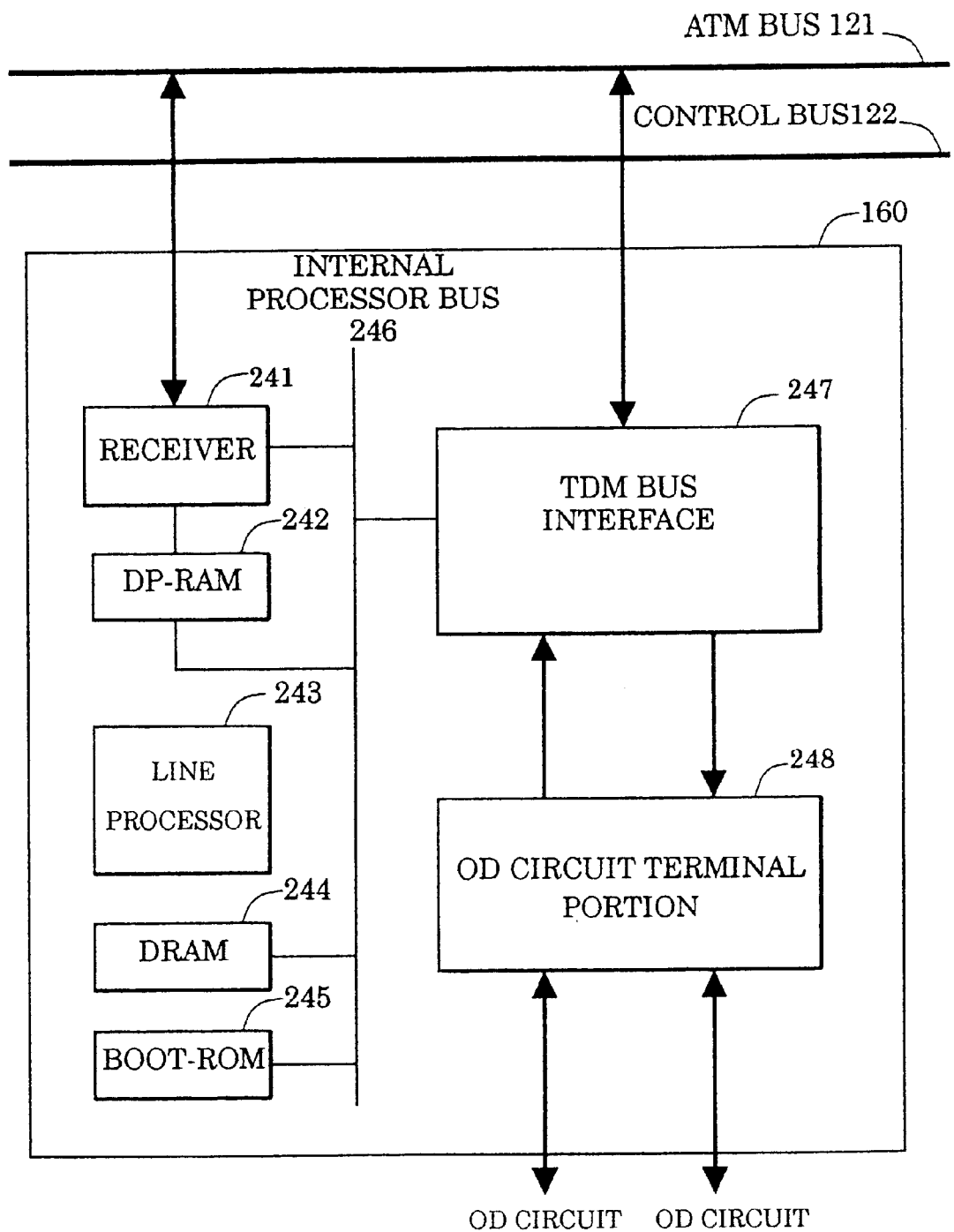
FIG. 13 is a block diagram showing a circuit arrangement of a voice circuit accommodation board used in an ATM cell multiplexer according to the present invention.

Its circuit arrangement is shown in FIG. 13, which is composed of a receiver 241, a DP-RAM 242, a line processor 243, a DRAM 244, a BOOT-RAM 245, an internal processor bus 246, a TDM bus interface 247, and an OD circuit terminal portion 248.

The elements are mutually connected through the internal bus 246, and the receiver 241 is connected to the control bus 122, the TDM bus interface 247 is connected to the TDM bus 123, and the OD circuit terminal portion 248 is connected to the OD circuit.

CODEC Board 170

This board 170 executes a data conversion between the board 160 and the ATM bus 121, and has the following functions: Conversion between the 64K-PCM signal and an 8K-CS ACELP signal/16K-LD•CELP signal;
ATM cellulation/decellulation of the 8K-CS-ACELP signal/16K-LD-CELP signal.

Figure 14:
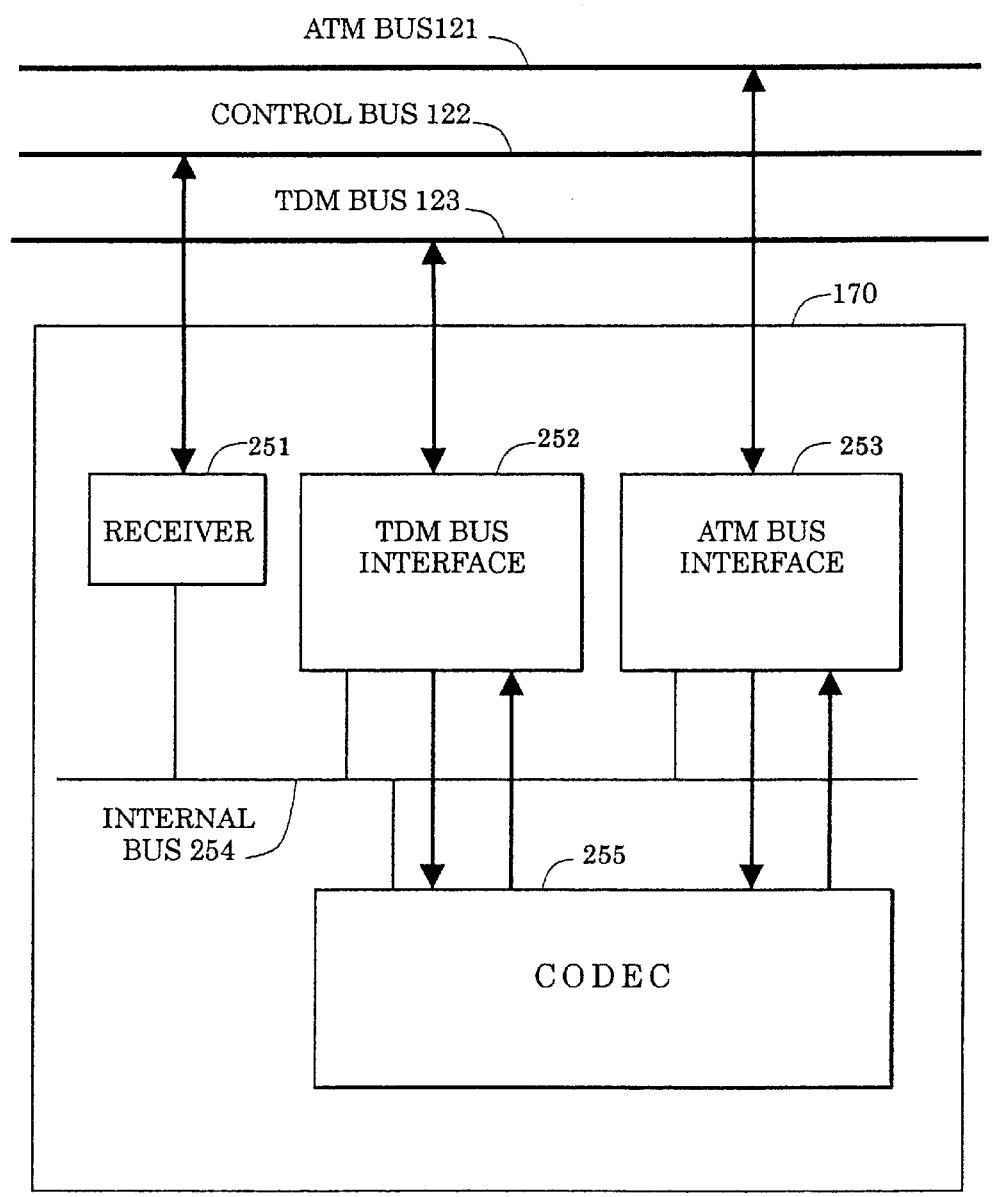
FIG. 14 is a block diagram showing a circuit arrangement of a CODEC board used in an ATM cell multiplexer according to the present invention.

Its circuit arrangement is shown in FIG. 14, which is composed of a receiver 251, a TDM bus interface 252, an ATM bus interface 253, an internal bus 254, and a CODEC 255. The elements are mutually connected through the internal bus 254, the receiver 251 is connected to the control bus 122, and the interfaces 252, 253 are connected to the TDM bus 123 and the ATM bus 121, respectively.

Clock Board 180

This board 180 supplies a standard clock for the elements of this ATM cell multiplexer, and has the following functions:
Generation of the standard clock and the supply of the standard clock via the ATM bus/TDM bus;
Terminations of the ATM bus, the TDM bus, and the CBUS bus;
Generation of a network synchronous clock.

Figure 15:
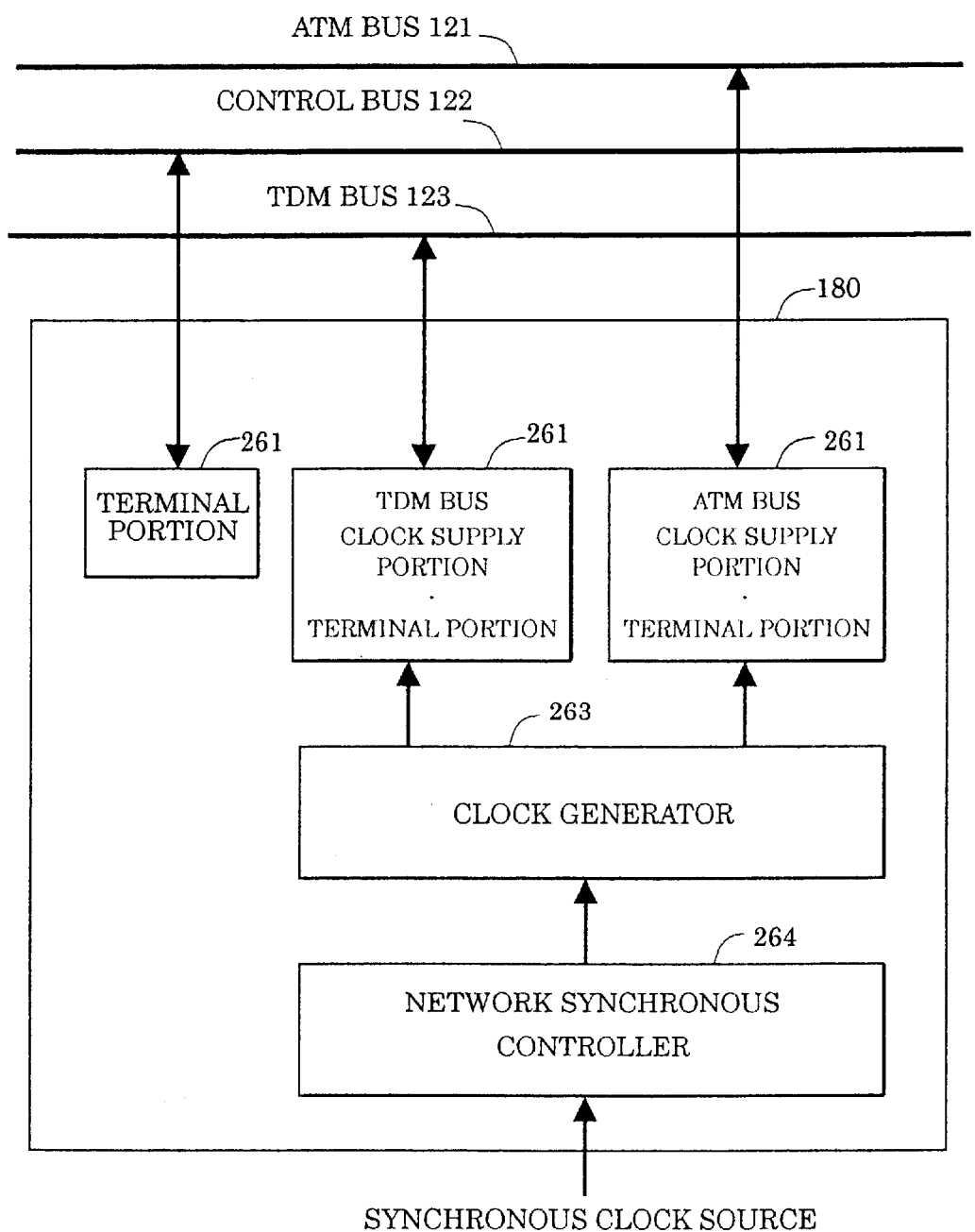
FIG. 15 is a block diagram showing a circuit arrangement of a clock board used in an ATM cell multiplexer according to the present invention.

Its circuit arrangement is shown in FIG. 15, which is composed of a terminal portion 261 connected to the control bus 122, a TDM bus clock supply portion/terminal portion 261 connected to the TDM bus 123, an ATM bus clock supply portion/terminal portion 262 connected to the ATM bus 121, a clock generator 263, and a network synchronous controller 264 connected to a synchronous clock source.

Hereinafter, the operation of the control bus 122 and the ATM bus 121 will be described as follows:

(1) Operation of the Control Bus 122

The main CPU 216 in the main board 110 controls the operation of the whole device (ATM cell multiplexer), and the main board 110 controls other devices via the control bus 122.

① Initial Operation of the Main Board 110

When power is supplied to the device, the main CPU 216 of the main board 110 in FIG. 10 reads a boot program from the BOOT-ROM 215. Then, according to the instruction of the boot program, the main CPU 216 transfers a main program stored in the DISK 214 to the DRAM 213 for starting the operation by the main program on the DRAM 213.

Inside the main board 110, the main CPU 216 sets the ATM bus scheduler 11 (the bus controller 211), the ATM cell transceiver 219, and the controller 218 to the enable state.

② Program Transfer of the Boards 130, 160

The main board 110 executes the transfer of the boot program for the CLAD units 13 mounted in the terminal circuit accommodation board 130 via the control bus 122. The boot program passes through the DRAM 213 as well as the controller 218 in the main board 110, the control bus 122 all in FIG. 10, and the receiver 221 in FIG. 11, and is stored in the BOOT-RAM 224.

The main board 110 executes the transfer of the boot program for the voice circuit accommodation board 160 via the control bus 122. The boot program passes through the DRAM 213 of the main board 110, the control bus 122 all in FIG. 10, and the receiver 241 in FIG. 13, and is stored in the BOOT-RAM 245.

When having completed the boot program transfer, the main board 110 instructs the boards 130 and 160 to start the operation.

The board 130 starts the operation by the boot program instruction of the BOOT-RAM 224 in FIG. 11. After having initially set the inside of the CPU by the boot program, the sub CPU 227 sends a main program transfer demand to the main board 110 via the DP-RAM 222 and the control bus 122.

The main board 110 transfers the main program for the CLAD units 13 in the DRAM 213 in FIG. 10 to the DRAM 223 in FIG. 11 via the control bus 122. Having completed the transfer, the board 130 operates by the main program inside the DRAM 223 and sets the ATM cell transceiver 226 and the layer-1 controller 228 in FIG. 11 to the enable state.

The board 160 starts the operation by the boot program instruction of the BOOT-RAM 245 in FIG. 13. After having initially set the inside of the processor by the boot program, the line processor 243 sends a main program transfer demand to the main board 110 via the DP-RAM 242 and the control bus 122.

The main board 110 transfers the main program for the voice circuit stored inside the DRAM 213 in FIG. 10 to the DRAM 244 in FIG. 13 via the control bus 122. Having completed the transfer, the board 160 operates by the main program in the DRAM 244 and sets the TDM bus interface 247 in FIG. 13 to the enable state.

③ Setting of the Boards 130 and 170

Since the trunk circuit board 130 and the CODEC board 170 have therein no processor, the main board 110 directly controls them. The synchronous converter 233 inside the trunk circuit board 140 (150) in FIG. 12 is set to the enable state by the main board 110 via the control bus 122.

The TDM bus interface 252, the ATM bus interface 253, and the codec 255 inside the CODEC board 170 in FIG. 14 are set to the enable state by the main board 110 via the control bus 122.

④ Operation of the Clock Board 180

For the portions of the clock board 180 in FIG. 15, setting by the main board 110 is not required. As soon as power is supplied, the clock board 180 starts the operation autonomously, and carries out the clock supply to the TDM bus 123 and the ATM bus 121, and also the termination of the control bus 122, the TDM bus 123, and the ATM bus 121.

The hardware status inside the clock board 180 is notified to the main board 110 through the control bus 122 for the detection and display of fault information and the like.

⑤ Communication between the CPU's

A reset release is instructed for the boards 130 and 160, and various kinds of communication between the main board 110 and the boards 130, 160 in operation are performed through the DP-RAM's 222, 242 which are included in the boards 130, 160, respectively.

The main board 110 writes necessary instruction information in the DP-RAM's 222, 242. Also, each of the CPUs writes the information from the boards 130, 160 in the DP-RAM's 222, 242.

(2) Operation of the ATM Bus 121

Figure 16:
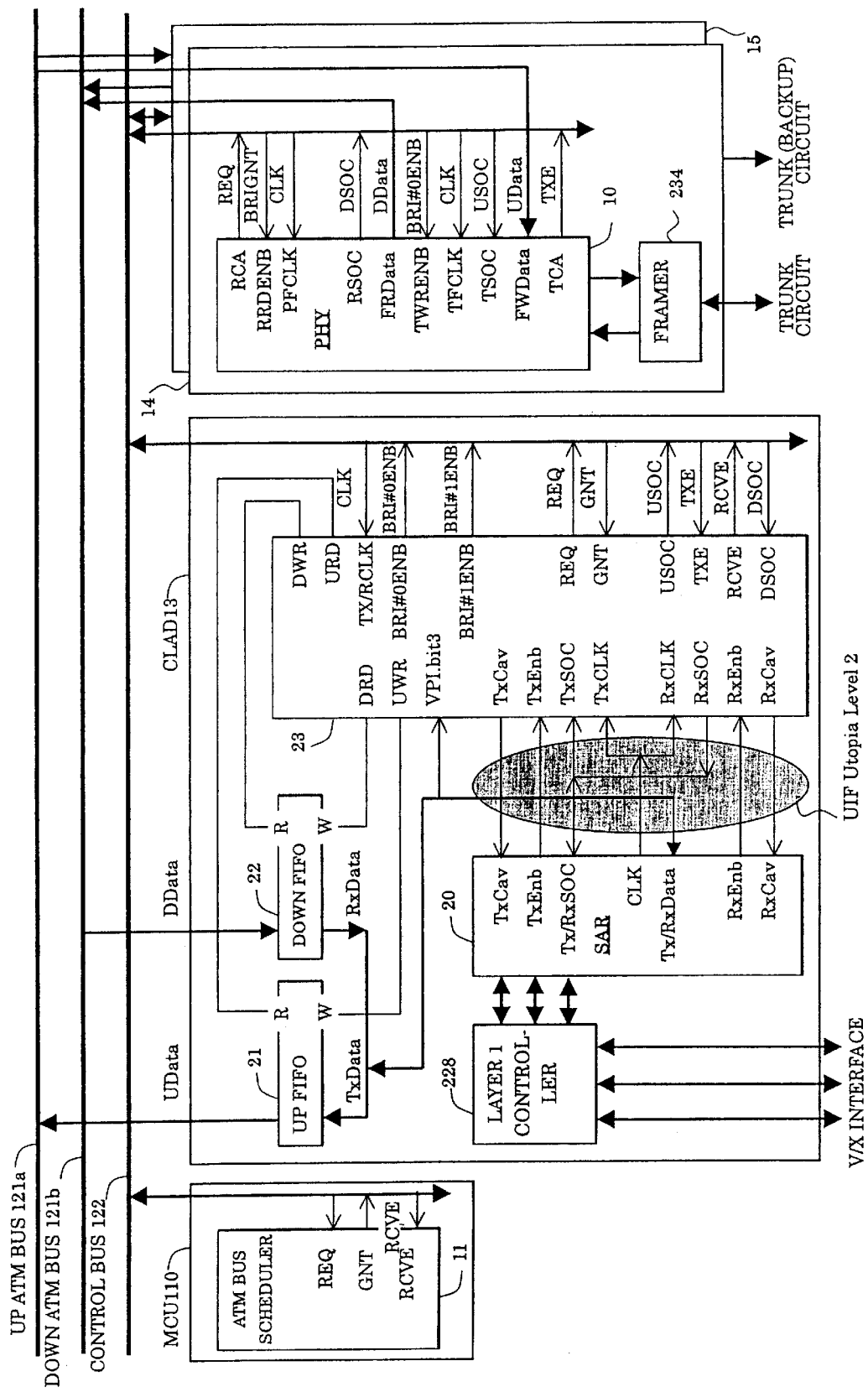
FIG. 16 is a block diagram showing an embodiment of an ATM cell multiplexer according to the present invention.

FIG. 16 is an embodiment specifically showing an arrangement an ATM cell multiplexer in FIG. 5 according to the present invention. This arrangement shows the operation of multiplexing the ATM cell by using an up ATM bus 121a and a down ATM bus 121b. Hereinafter, the operation will be described referring to time charts in FIGS. 17–20. For the explanation of the trunk circuit controllers 14 and 15, the trunk circuit controller 14 will be mainly described as an working example.

Figure 18A:
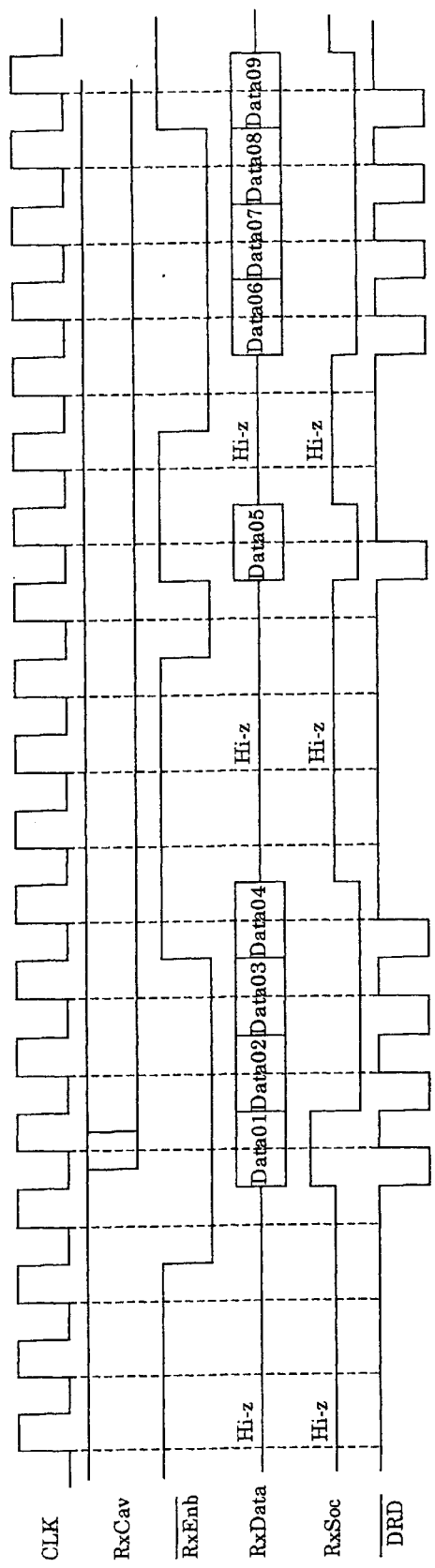
FIGS. 18A and 18B are time charts of down cell transfer inside CLAD units.
Figure 18B:
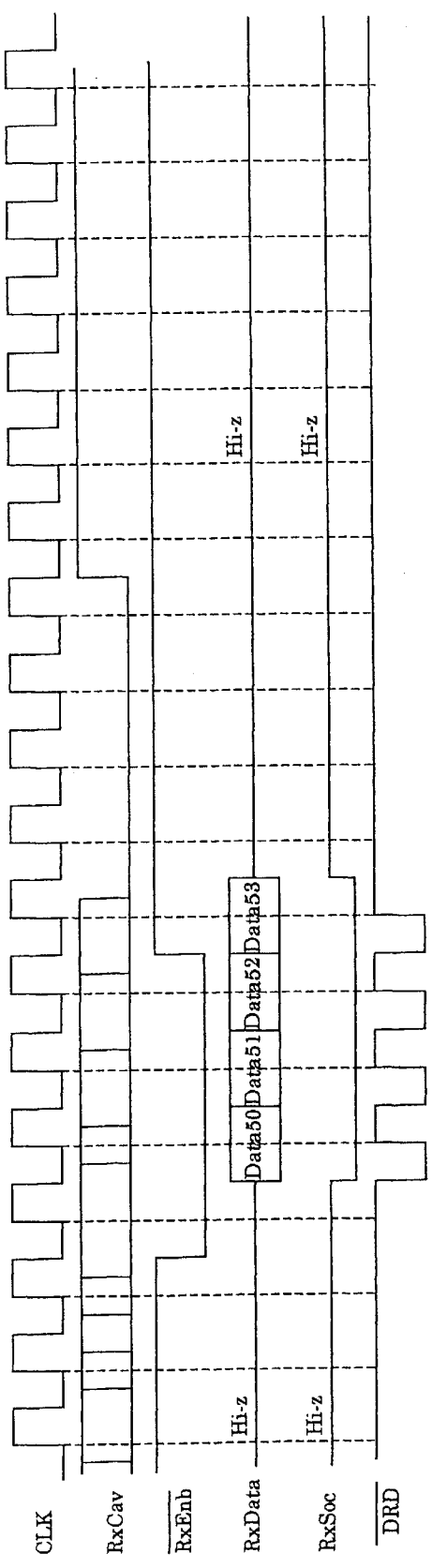

Down Direction (The Trunk Circuit Controller 14→the CLAD Units 13): see FIGS. 17, 18

The operation of transmitting the ATM cell which the trunk circuit controller 14 has received from the trunk circuit to the CLAD units 13 will be described as follows:

As the ATM bus 121, the down ATM bus 121b is used. As shown in FIG. 17, when receiving e.g. a single cell of the data from the trunk circuit, the physical layer terminal portion (PHY) 10 in the trunk circuit controller 14 sends an ATM cell transmission request signal RCA to the ATM bus scheduler 11.

The ATM bus scheduler 11 sends a transmission enable signal BRIGNT to the trunk circuit controller 14 according to a trunk circuit speed (64K or 128K). The operation of the ATM scheduler 11 will be described later.

When receiving the transmission enable signal, the trunk circuit controller 14 transmits the cell to the down ATM bus 121b.

On the other hand, the CLAD units 13 always monitor the down ATM bus 121b. When detecting that the above-mentioned DSOC signal, which indicates that the trunk circuit controller 14 has transmitted the head of cell to the down ATM, is asserted, the CLAD units 13 drive a DWR signal for a down FIFO 22 for receiving the data on the down ATM bus 121b. In this way, the received data of 53 bytes (=1 cell) is accumulated in the down FIFO 22.

A reception enable signal RCVE outputted from the CLAD units 13 is one indicating whether or not the CLAD units 13 can receive the signal on the down ATM bus 121b. When the trunk circuit controller 14 starts the transmission of data and also more than one unit among of the CLAD units 13 cannot receive the data, the fact is notified to the ATM bus scheduler 11 via the control bus 122.

After the information of a single cell has been accumulated in the down FIFO 22, the CLAD units 13 start transmitting the information to the ATM cell terminal portion 20 inside the CLAD units 13 (see FIG. 18).

The ATM communication controller 23 (the ATM cell transceiver 226) inside the CLAD units 13 asserts a signal RxCav through the Utopia Level 2 UIF, drives a DRD signal of the down FIFO 22 under the control of a signal RxEnb of the ATM cell terminal portion 20 for reading the data from the FIFO 22, and transmits the ATM cell to the ATM cell terminal portion 20.

The determination whether or not the ATM cell is addressed to a corresponding CLAD unit itself is not executed in the above-mentioned transfer procedure, and all of the CLAD units 13 receive the ATM cell from the trunk circuit controller 14. Instead, such a determination is executed after receiving the cell inside the ATM cell terminal portion 20.

Up Direction (the CLAD Units 13→the Trunk Circuit Controller 14): see FIGS. 19. 20

The procedure of transmitting information the CLAD units 13 have received to the trunk circuit controller 14 will now be described:

The information from the V/X interface accommodated in the CLAD units 13 is received. The receiving operation is executed by the ATM cell terminal portion 20 through the layer-1 controller 228. The ATM cell terminal portion 20 starts the transmission to the up FIFO 21 when a single cell of the received information is accumulated.

When the up FIFO 21 is in the reception enable state, the ATM communication controller 23 asserts a signal TxCav by the Utopia Level 2 UIF. Then, under the control of a signal TxEnb of the ATM cell terminal portion 20 the ATM communication controllr 23 drives a UWR signal of the up FIFO 21 and writes the cell data Data01-Data53 in the FIFO 21. At that time, the ATM communication controller 23 reads the bit "3" of VPI information which is in the head byte of cell data, and determines whether the cell data is addressed to a basic or working trunk circuit or the backup trunk circuit.

Figure 21:
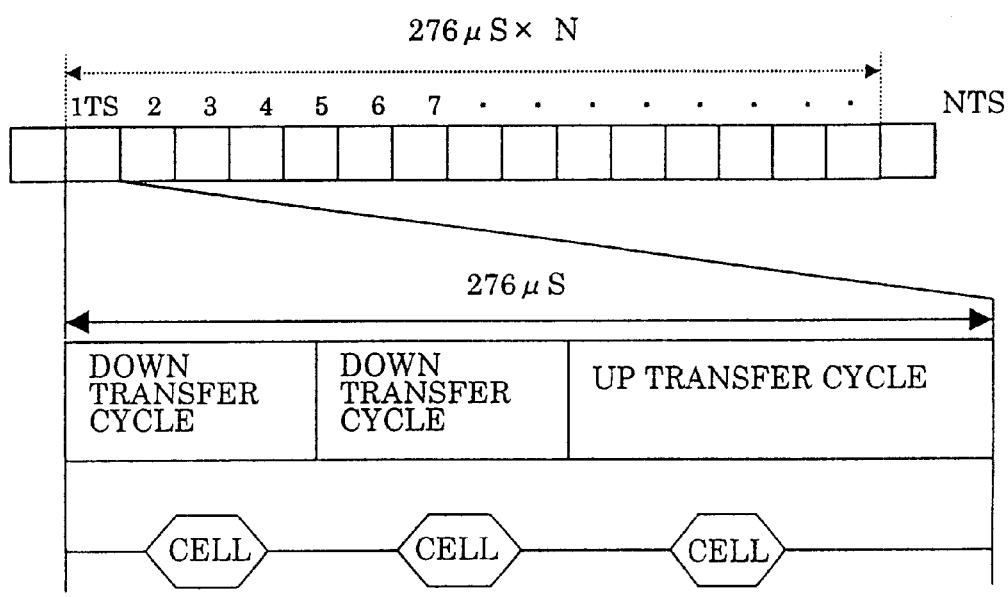
FIG. 21 is a diagram showing an embodiment of an ATM bus used in an ATM cell multiplexer according to the present invention.

FIG. 21 shows an information format for identifying the trunk circuit. In this example, if the bit "3" of the VPI information indicates "0", the basic trunk circuit is addressed, while if that indicates "1", the backup trunk circuit is addressed.

When a single cell is accumulated in the up FIFO 21, the ATM communication controller 23 starts the transmitting operation for the up ATM bus 121a (see FIG. 19).

The transmitting operation starts by sending an ATM cell transmission request signal REQ to the ATM bus scheduler 11. The CLAD units 13 monitor a signal TXE indicating that the trunk circuit controller 14 can receive the cell data. In the reception enable state, the trunk circuit controller 14 sends the transmission request signal to the ATM bus scheduler 11.

The ATM bus scheduler 11 sends the transmission enable signal GNT to the CLAD units 13 according to a value of a schedule management table which will be described later.

When receiving the transmission enable signal GNT, the CLAD units 13 output an identification signal which indicates whether the basic trunk circuit or the backup trunk circuit is addressed.

If the basic circuit is addressed, a signal BRI#0ENB is asserted and the trunk circuit controller 14 becomes the reception enable state. If the backup circuit is addressed and a BRI#1ENB is asserted, the backup circuit controller 15 becomes the reception enable state.

Then, as soon as the USOC signal indicating the head cell is asserted, a URD signal of the up FIFO 21 is driven to transmit the cell data inside the FIFO 21 to the ATM bus 121a.

On the other hand, in the trunk circuit controllers 14 and 15 either of the signal BRI#0ENB or BRI#1ENB is asserted. Therefore, when the signal addressed to a corresponding controller itself is asserted, the DSOC signal is detected for receiving the cell data.

The cell data are directly written in the physical layer terminal portion 10. When a single cell of the data has been written, it is transmitted to the trunk circuit (see FIG. 20).

Now, an embodiment of the above-mentioned ATM bus scheduler 11 will be described.

Figure 22:
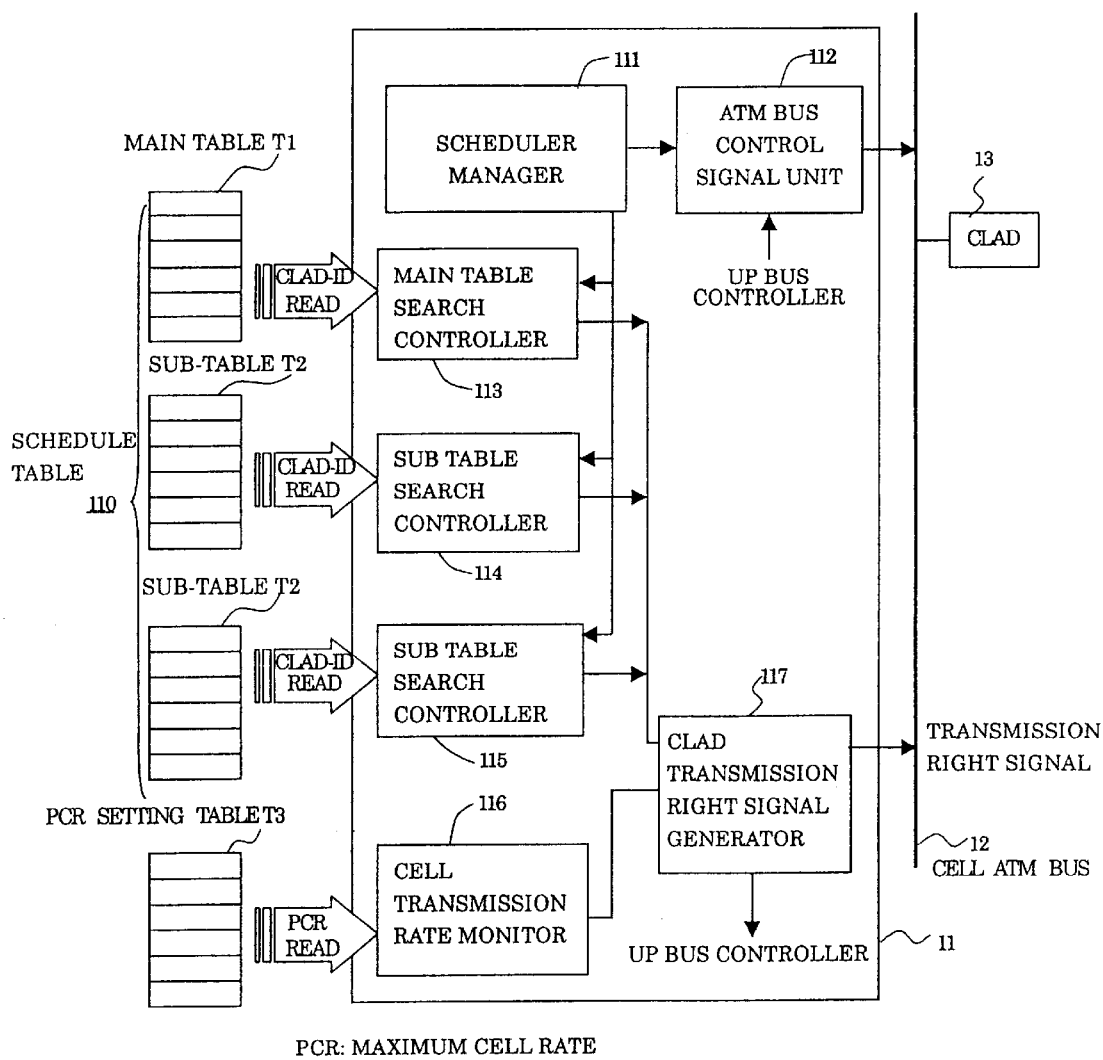
FIG. 22 is a block diagram showing an arrangement of an ATM bus scheduler used in an ATM cell multiplexer according to the present invention.

As shown in FIG. 22, the ATM bus scheduler 11 is composed of; a schedule table STB (comprising a main table T1 and sub tables T2, T3) for prescribing schedule timings; a scheduler manager 111; an ATM bus control signal portion 112 under the control of the scheduler manager 111 to give a transmission right to each of the CLAD units 13; search controllers 113–115 under the control of the scheduler manager 111 to perform a search control for the schedule table STB; a PCR setting table T4; a cell transmission rate monitor 116 for counting the number of transmitted cells per each CLAD unit; and a CLAD transmission right signal generator 117 for generating signals regarding the transmission right to each CLAD unit 13 from the output signals of the search controllers 113–115 and the cell transmission rate monitor 116.

In operation, the scheduler table 110 is set according to the maximum cell rate and the average cell rate preliminarily declared from the CLAD unit 13. The scheduler manager 111 gives the transmission right to the CLAD units 13 according to a CLAD unit identifier (hereinafter occasionally abbreviated as CLAD-ID) set in the scheduler table 110. The CLAD units 13 transmit the cells to the ATM bus 12 only when the transmission right is given from the scheduler 11.

The cell transmission rate monitor 116 counts the transmitted number of cells from each CLAD unit 13 individually at predetermined intervals, and controls the number of cells so as not to exceed the maximum cell rate declared by the CLAD units 13. If the transmission cell rate of the CLAD units 13 exceeds the declared maximum cell rate, the ATM bus scheduler 11 controls so that the transmission right is given to other CLAD units 13 even on the transmission opportunities of the corresponding CLAD units 13.

An embodiment of the ATM bus will now be described.

The ATM bus schedules the transmission right in both of the up direction (CLAD units 13→ATM switchboard 3) and the down direction (ATM switchboard 3→CLAD units 13), and controls the traffic of the entire unit.

First of all, the transfer in the down direction gives the transmission right of a fixed rate to each trunk circuit. The transfer in the up direction gives the transmission right according to the lowest cell rate assigned for each CLAD unit.

FIG. 21 shows an embodiment of the ATM bus in case that the number of the trunk circuit is one or two and the speed of the trunk circuit is 1.5 Mbps, as mentioned above.

Assuming that the speed of the trunk circuit be 1.5 Mbps, the cell transmission interval is 276 $\mu$s ($1=1\div(1536\div8\div53$ (single cell byte number)). The transmitting interval of the cell is assumed to be a single time slot (TS) on the ATM bus.

The transfer method in the down direction will now be described.

If the trunk circuit is a single circuit without backup circuit, a cycle in which the cells are transferred in the down and up directions one by one within a single time slot is set.

If there are two trunk circuits or more which can be increased with the same principle, the transfer cycle in the down direction is two. As a result, two cells can be received from the trunk circuit within a single time slot (see FIG. 21).

The cells received from the trunk circuits are transmitted to the ATM bus every single time slot. The cells transmitted to the ATM bus are broadcast to all CLAD units connected to the ATM bus.

Figure 23:
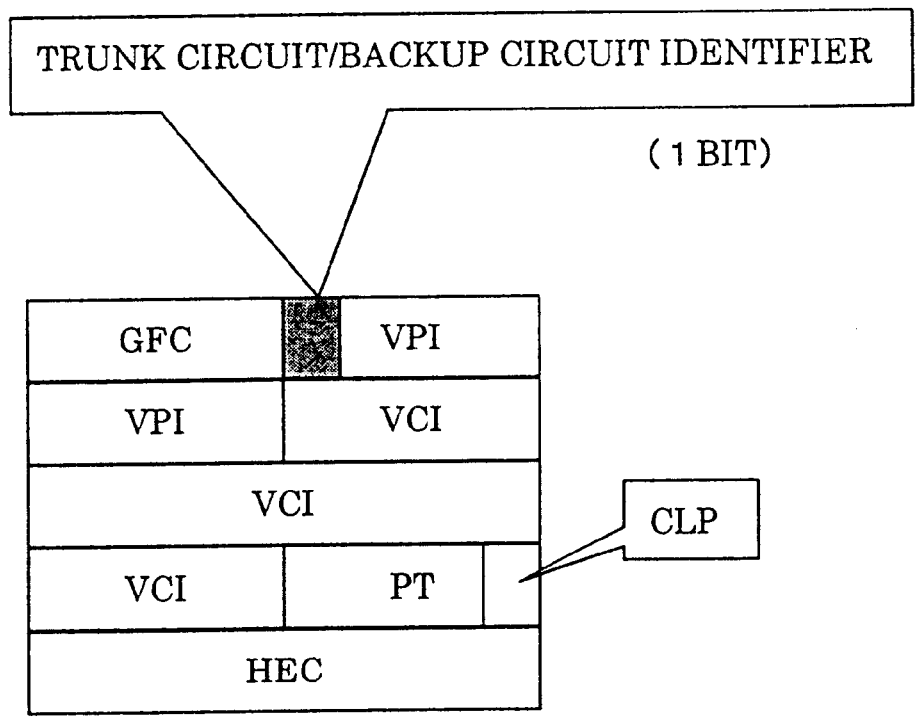
FIG. 23 is a format diagram of an ATM frame header used in an ATM cell multiplexer according to the present invention.

To the CLAD units, the connection ID, i.e. VPI/VCI shown in the ATM header in FIG. 23 of the cell which should be preliminarily received by itself is preset. Since the cells transmitted from the trunk circuits are broadcast on the ATM bus, all of the CLAD units receive the cells.

The CLAD units retrieve the connection ID of the received cells and determine whether or not they are addressed to themselves. The CLAD units receive the cells from the ATM bus if those cells are addressed to the CLAD units themselves and disregard them if not so.

Hereinafter will now be described a method as to how the CLAD units can recognize from which trunk circuit they have received the cells if two or more trunk circuits exist.

As shown in FIG. 21, the trunk circuit/backup circuit identifier is set in a significant one bit of VPI. This trunk circuit/backup circuit identifier is an identifier for recognizing from which trunk circuit the cell have been received. In the cells received from the backup circuit, the backup circuit controller sets up "1" in the trunk circuit/the backup circuit identifier of the cells. The cells received from the trunk circuit are passed with the unchanged identifier of "0". Referring to the significant one bit of VPI of the received cell, it becomes possible for the CLAD units to recognize from which trunk circuit the cells has been received.

A transfer method in the up direction will now be described. It is assumed that only one cell can be transmitted in a single time slot. Since a plurality of the CLAD units are connected on the ATM bus in parallel, if each of the CLAD units transmits the cells unconditionally, cell competitions will occur on the ATM bus.

The ATM bus scheduler arbitrates the ATM bus in the up direction to solve the above problem as follows.

The ATM bus scheduler gives the CLAD units the cell transmission right in the up direction in consideration of the traffic control. The CLAD units transmit the cells to the ATM bus only when the transmission right is given from the scheduler.

If two or more trunk circuits exist, the control method to select the trunk circuits will now be described.

The CLAD units set the trunk circuit/backup circuit identifier in the significant one bit of VPI, as mentioned above. The trunk circuit/backup circuit identifier is one for designating to which trunk circuit the cells should be transmitted. The CLAD unit sets "1" in the trunk circuit/backup circuit identifier when the cells are transmitted to the backup circuit while setting "0" when the cell is transmitted to the trunk circuit. The trunk circuit controller and the backup circuit controller can recognize whether the received cells are addressed to themselves or others by watching the significant one bit of VPI of the cells.

Control of service category with ATM bus scheduler will now be described.

In order to support the above-mentioned service categories (CBR, rt-VBR, nrt-VBR, UBR) prescribed by the ATM forum, the ATM bus scheduler makes the undermentioned control for each service category.

It is now assumed that the priority order of how to give the transmission right be CBR→rt-VBR→nrt-VBR→UBR and a time for which there is no transmission cell even with a permission given be added to a time for the next transmitter. It is to be noted that the maximum cell rate (0+1) means the one converted for the cell even in either case of CLP=0 (cell non-abandonment) or CLP=1 (cell abandonment) in the header shown in FIG. 23.

Figure 24:
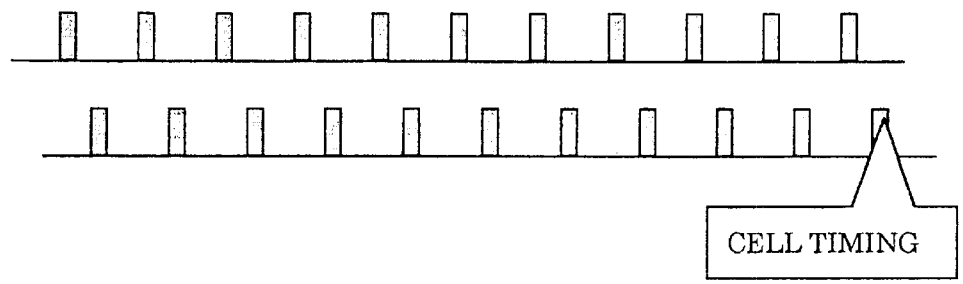
FIG. 24 is a time chart based on the CBR method used in an ATM cell multiplexer according to the present invention.

① CBR (see FIG. 24)

The transmission right is equally given to the CLAD units as the value of the maximum cell rate (0+1) indicates.

When being given to a CLAD unit, the transmission right is not assigned to other CLAD units even though there is no transmission data, so that empty cells are transmitted to the trunk circuit.

Figure 25:
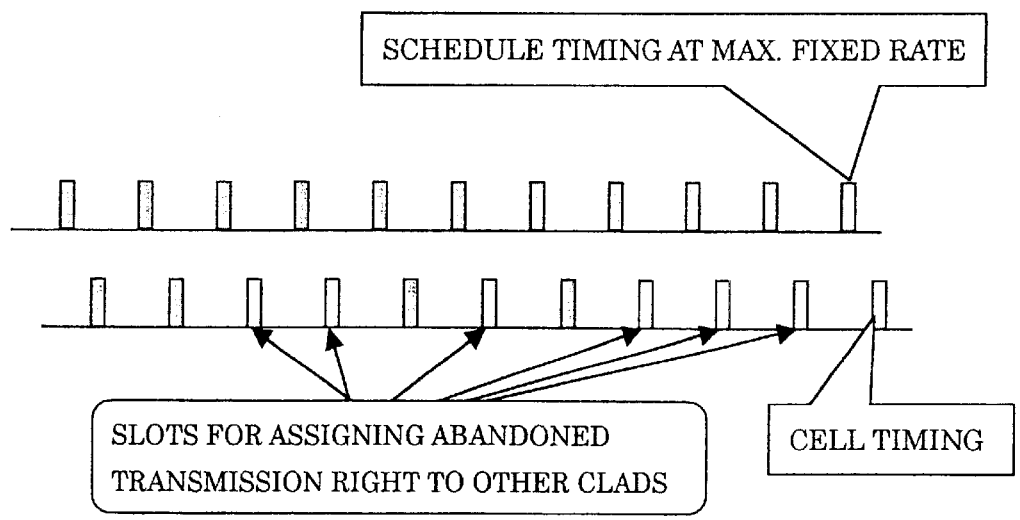
FIG. 25 is a time chart based on the rt-VBR method used in an ATM cell multiplexer according to the present invention.

② rt-VBR (see FIG. 25)

The transmission right is equally given as the value of maximum cell rate (0+1) indicates.

When being given to a CLAD unit having no transmission data, the transmission right is assigned to other CLAD units for nrt-VBR (nrt-VBR CLAD units).

Figure 26:
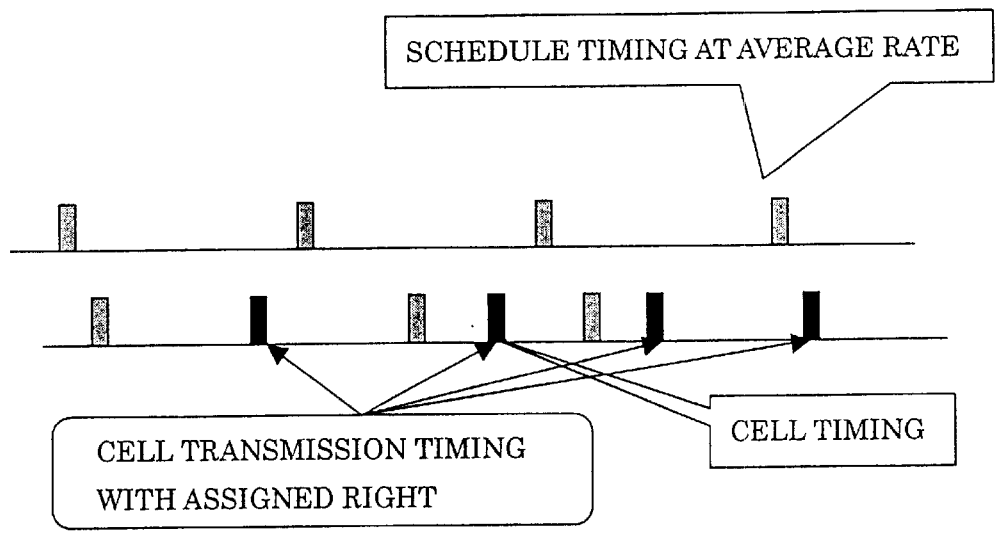
FIG. 26 is a time chart based on the nrt-VBR method used in an ATM cell multiplexer according to the present invention.

③ nrt-VBR (see FIG. 26)

The transmission right is equally given to the CLAD units at an average cell rate (0+1). However, if the average cell rate is not set up, the transmission right is distributed with the maximum cell rate (0+1)×α (α is arbitrary).

When being given to a CLAD unit having no transmission data, the transmission right is assigned to other CLAD units for nrt-VBR. The scheduler distributes the transmission right with round robin within the CLAD unit for nrt-VBR if the CLAD units for rt-VBR and nrt-VBR has abandoned the transmission right. However, the transmission right must not be distributed at more than the maximum cell rate (0+1).

This control is adopted to count the transmission cell number and not to generate the number of transmission right which exceeds the maximum cell rate (0+1). When the transmission right remains in nrt-VBR CLAD units, the transmission right is given to UBR CLAD units.

Figure 27:
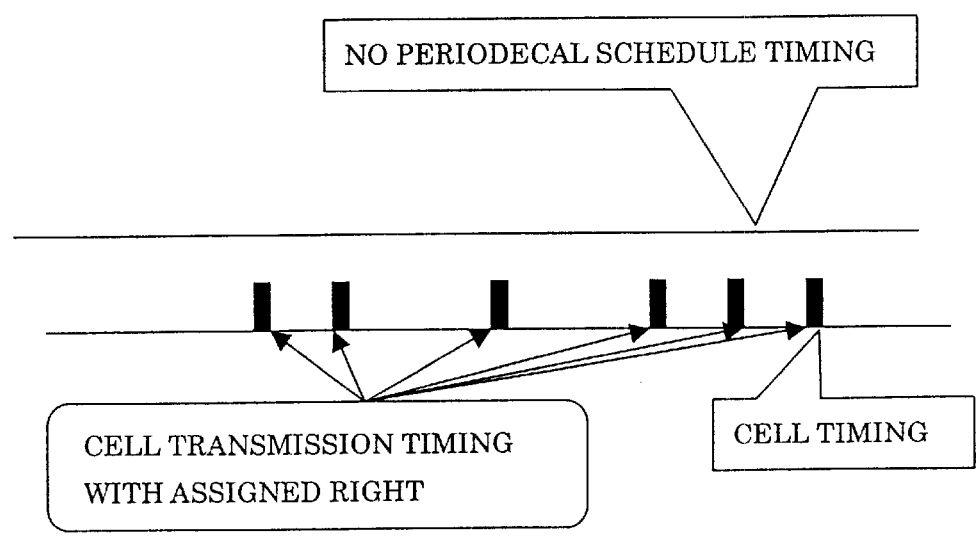
FIG. 27 is a time chart based on the UBR method used in an ATM cell multiplexer according to the present invention.

④ UBR (See FIG. 27)

UBR is not set up for transmission schedules. Only when all nrt-VBR connections have abandoned the transmission right, the transmission right is given to UBR CLAD units.

Control algorithm of ATM bus scheduler will now be described:

The principle of the ATM bus scheduler will be described at first.

The ATM bus scheduler generates CLAD-ID (CLAD unit-identifier) which permits the cell transmission per each time slot of the ATM bus, and notifies the CLAD units through the ATM bus.

Each of the CLAD units transmits the cells only when its CLAD-ID is notified. The ATM bus scheduler has an ATM bus scheduler memory 110 (see FIG. 22) for controlling transmission opportunities for each of the CLAD units. In this scheduler memory 110, there are three kinds of tables as shown in FIG. 28.

Figures 28A, 28B, 28C:
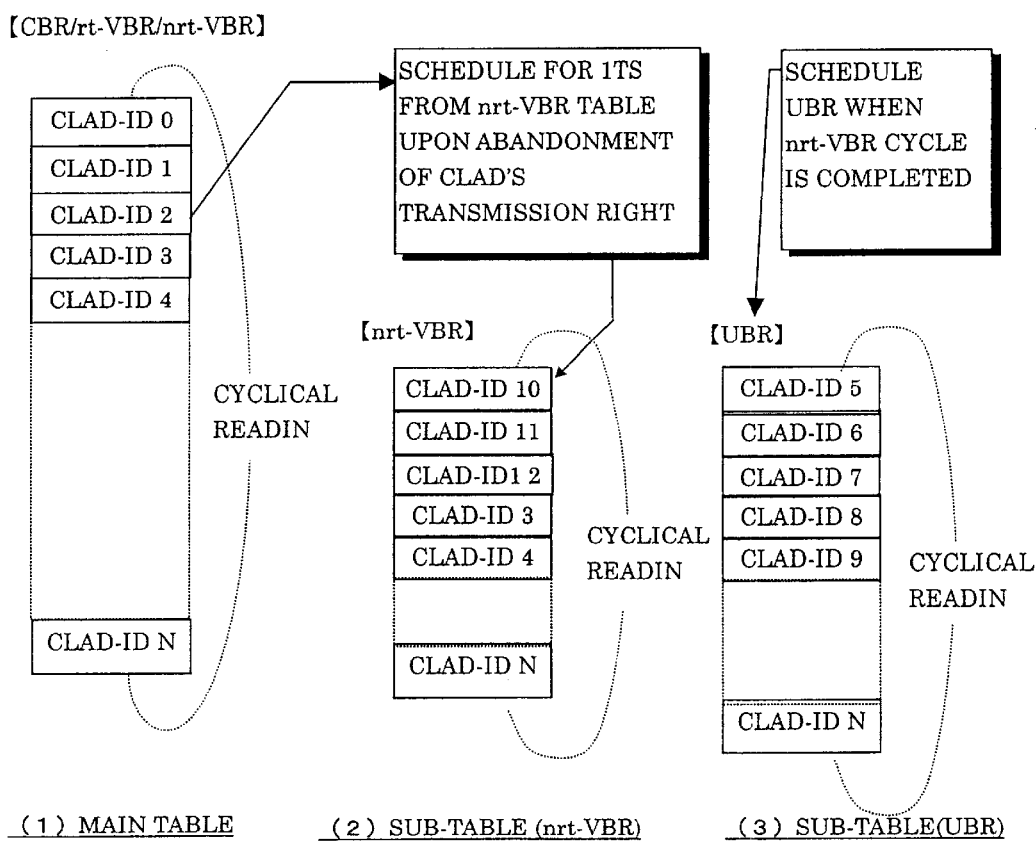
FIGS. 28A–28C are diagrams showing an example of a schedule memory table used in an ATM cell multiplexer according to the present invention.

In a main table shown in FIG. 28A, to which CLAD-ID the transmission opportunities are given for a single time slot of the ATM bus is set. In this main table, a schedule list of the CLAD units for CBR, rt-VBR, or nrt-VBR is set up in which cell transmission intervals for each CLAD-ID ("maximum cell rate", "average cell rate", or "maximum cell rate×α") are calculated when the CLAD units or the trunk circuit is registered or changed.

A sub table for nrt-VBR and a sub table for UBR respectively shown in FIGS. 28B and 28C are ones which the scheduler makes reference for the insertion of the cells generated by other CLAD units into empty time slots and the transmission thereof if the CLAD units for rt-VBR and nrt-VBR in the main table has abandoned the transmission right, i.e. there is no transmission cell.

Namely, the ATM bus scheduler gives the schedule to the CLAD units in accordance with the order of the above scheduler table on the basis of the intervals corresponding to the physical speed of the trunk circuit.

The ATM bus scheduler prepares the schedule for the nrt-VBR CLAD units referring to the nrt-VBR sub table shown in FIG. 28B if the rt-VBR CLAD units in the main table shown in FIG. 28A have abandoned the transmission right.

When one cycle of the transmission standby table for nrt-VBR is completed, that is all of the nrt-VBR CLAD units have abandoned the transmission right, the ATM bus scheduler prepares the schedule for UBR CLAD units referring to the UBR sub table shown in FIG. 28C.

The preparation algorithm of the above main table will now be described referring to FIG. 29.

(1) For the ATM cell multiplexing of voice data, time slots exclusive for voice are reserved as a memory area where no data can be set by CLAD units other than the voice CLAD units because voice is strictly prohibited from being delayed.

(2) Taking an opportunity for setting voice SVC call, a CLAD-ID is set for the voice exclusive area. Taking an opportunity for releasing the voice SVC call, the CLAD-ID is removed from the voice exclusive area for empty time slots.

(3) Taking an opportunity for call setting, the voice CLAD units of 16 Kbps set the CLAD-ID in the main table twice in one period.

(4) Taking an opportunity for call setting, the voice CLAD units of 8 Kbps set the CLAD-ID in the main table once in one period.

(5) The CLAD units which have a higher maximum cell rate among CBR, rt-VBR, and nrt-VBR set the CLAD-ID preferentially. The CBR and rt-VBR CLAD units determine the number with the value of the maximum call rate (0+1). The nrt-VBR CLAD units set the CLAD-ID in view of the average cell rate (0+1) in the main table, and set the CLAD-ID in the rt-VBR sub table at the ratio of {maximum cell rate (0+1)-average cell rate (0+1)}.

(6) The CLAD units for fast data of 64 Kbps etc. such as in a frame relay system set the CLAD-ID along the following procedure. At first the maximum cell rate (0+1) is calculated. It should be noted that the user frame length is 64 bytes.

$$\text{Maximum cell rate } (0+1) = \text{physical speeed}/8 \times OHA(n) \times (2 \div 70)$$
$$= 228.5714286 \text{ (cell/second)}$$

This maximum cell rate being divided by the maximum cell rate for one period, the following result is obtained:

$$228.5714286 \div 21.56659765 = 10.5984 = 11(TS)$$

Namely, the CLAD-ID is set in the main table eleven times per one period. The period of a time slot should be set up per 15 (168/11) time slots as much as possible. In the example of FIG. 13, the set TS positions are 6,21,36,51,66, 81,96,111,126,141, and 156.

(7) A low speed circuit (PCR=8.57) such as 2.4 Kbps is deemed to have a single time slot, and scheduled at the same maximum cell rate (21.5) as 8 Kbps.

(8) The corresponding CLAD units set the CLAD-ID in the remaining empty time slots.

(9) If the CLAD units setting for two or more time slots are overlapped at the same number, the CLAD-ID set afterward is shifted by one time slot.

(10) In empty time slots, empty indication is set. The ATM bus scheduler schedules the nrt-VBR CLAD units for empty time slots. The empty indication is settable for voice exclusively. If no voice SVC is set in the empty indication, the scheduler schedules the nrt-VBR CLAD units.

(11) In the trunk speed of 128 Kbps, the CLAD units set the CLAD-ID every 12 (=1536/128) time slots. In the example of FIG. 29, the set TS positions are 1,13,25,37,49, 61,73,85,97,109,121,133, 145 and 157 where the total number of the CLAD units is 14 or less.

Figure 30:
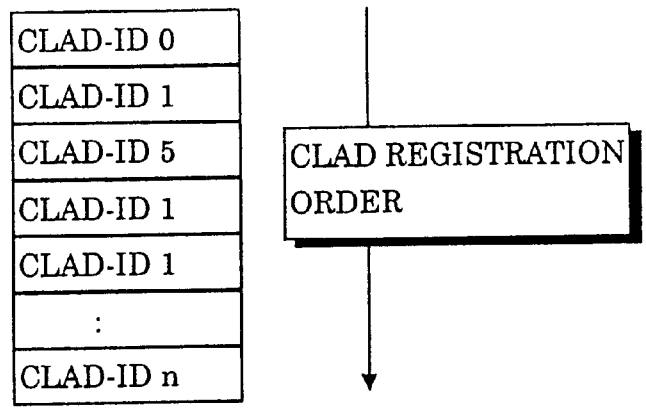
FIG. 30 is a diagram showing a preparation algorithm of a sub table (nrt-VBR) in a schedule memory table in an ATM cell multiplexer according to the present invention.

The preparation algorithm of the sub table (rt-VBR) is shown in FIG. 30. In this case, the corresponding CLAD units set the CLAD-ID in the table in the ascending order.

Since this sub table is set in order of the registration of the CLAD units, the assigned transmission rights of the nrt-VBR CLAD units have no priority. It is assumed that the number of the CLAD units in this sub table can be designated twice or more times so that the CLAD units can be weighted depending on the appearance frequency.

Figure 31:
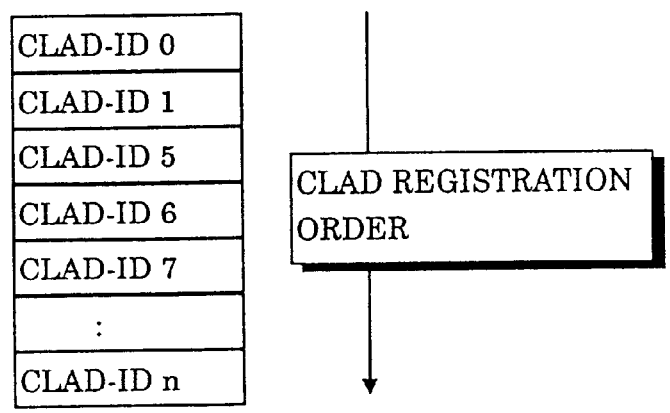
FIG. 31 is a diagram showing a preparation algorithm of a sub table (UBR) in a schedule memory table in an ATM cell multiplexer according to the present invention.

The preparation algorithm of the sub table (UBR) is shown in FIG. 31. In this case, the corresponding CLAD units set the CLAD-ID in the table in the ascending order of registration. Since this sub table is set in order of the registration of the CLAD units, the assigned transmission rights of the UBR CLAD units have no priority. In this sub table the number of the CLAD units should be set only once.

Counters for maximum cell rate (PCR), average cell rate(SCR) will now be described.

The ATM bus scheduler monitors the cell number with a maximum cell rate counter so that nrt-VBR CLAD units with the assigned transmission right may not exceed the maximum cell rate, and assigns the transmission right to other nrt-VBR CLAD units if the maximum cell rate is exceeded.

When the ATM bus scheduler assigns the transmission right to a CLAD unit, the CLAD unit transmits cells in the presence thereof but transmits no cell in the absence thereof. In the ATM bus scheduler, an ATM bus signal controller (112 in FIG. 22) can decide whether or not the CLAD unit has transmitted the cells. When the CLAD unit has transmitted the cells, a cell transmission counter is incremented. As a result, the cell number will be able to be calculated for each CLAD unit at a fixed time interval.

The ATM bus scheduler compares the maximum cell rate preliminarily set for each CLAD unit at a fixed period with the value of the cell transmission counter. When the transmission cell of the CLAD unit exceed the maximum cell rate, the ATM bus scheduler does not control the assignment of the transmission right to the corresponding CLAD unit.

Determination of ATM bus scheduler period will now be described.

The ATM bus scheduler sets beforehand the transmission order of the CLAD units in an ATM bus scheduler memory from which the cells are read out every time slot period to the scheduler bus for the notification. This memory is set up with a software upon the registration of the CLAD units or the circuits.

The size of the scheduler memory with reference to the number of time slot and circuit use rates is as follows:

① In case of a voice cell with the payload length of 40 bytes, the number of time slot is 144 in view of the circuit use rate of the trunk circuit being 100% and the voice accommodation efficiency being highest.

TABLE 1

| ITEM | VALUE | EQUATION |
|---|---|---|
| TS NUMBER (MEMORY CAPACITY) | 144TS | |
| 1 PERIOD TIME | 39.744 (ms) | 144 × 0.276 (ms) = 39.744 (ms) |
| PCR PER 1 PERIOD | 25.1610306 (cell/s) | 1 × 1000 ÷ 39.744 = 25.1610306 |
| THROUGHPUT UPON SETTING 1TS | 10,668.27697 (bps) | 53 × 8 ÷ 39.744 × 1000 = 10,668.27697 (bps) |
| REAL THROUGHPUT OF 8 kbps VOICE | 10,600 (bps) | 8000 × 53 ÷ 40 = 10,600 (bps) |
| ACCOMMODATION RATE OF 8 kbps VOICE | 99.36 (%) | 10,600 ÷ 10,668.27697 × 100 = 99.36 (%) |
| REAL THROUGHPUT | 21,200 (bps) | 16,000 × 53 ÷ 40 = |

TABLE 1-continued

| ITEM | VALUE | EQUATION |
|---|---|---|
| OF 16 kbps VOICE ACCOMMODATION RATE OF 16 kbps VOICE | 99.36 (%) | 21,200 (bps) 21,200 ÷ (10,668.27697 × 2) × 100 = 99.36 (%) |

②   In case of a voice cell with the payload length of 47 bytes where the number of time slot is 168 in view of the circuit use rate of the trunk circuit being 100% and the voice accommodation efficiency being highest.

TABLE 2

| ITEM | VALUE | EQUATION |
|---|---|---|
| TS NUMBER (MEMORY CAPACITY) | 168TS | |
| 1 PERIOD TIME | 46.368 (ms) | 168 × 0.276 (ms) = 46.368 (ms) |
| PCR PER 1 PERIOD | 21.56659765 (cell/s) | 1 × 1000 ÷ 46.368 = 21.56659765 |
| THROUGHPUT UPON SETTING 1TS | 9,144.237405 (bps) | 54 × 8 ÷ 46.368 × 1000 = 9,144.237405 (bps) |
| REAL THROUGHPUT OF 8 kbps VOICE | 9,021.277 (bps) | 8000 × 53 ÷ 47 = 9,021.277 (bps) |
| ACCOMMODATION RATE OF 8 kbps VOICE | 98.66 (%) | 9,021.277 ÷ 9,144.237 × 100 = 98.66 (%) |
| REAL THROUGHPUT OF 16 kbps VOICE | 18,042.55 (bps) | 16,000 × 53 ÷ 47 = 18,042.55 (bps) |
| ACCOMMODATION RATE OF 16 kbps VOICE | 98.66 (%) | 18,042.55 ÷ (9,144.237405 × 2) × 100 = 99.36 (%) |

Control of Backup Circuit Will Now be Described.

In an ATM cell multiplexer having the trunk circuit composed of a basic trunk circuit used for normal operation and a backup (preparatory) circuit for guaranteeing the communication upon the fault of the basic trunk circuit, a backup control method where the physical speeds of the basic trunk circuit and the backup circuit are different will be described in the following:

When the physical speed of the backup circuit is higher than that of the basic trunk circuit, all connections to communicate with the basic trunk circuit can make a detour to the backup circuit. However, when the physical speed of the backup circuit is lower than that of the basic trunk circuit, all connections to communicate with the basic trunk circuit can not make a detour to the backup circuit due to a band difference. Therefore, it is necessary to select the detour or non-detour for each CLAD unit.

The embodiment of this case will now be described taking an example where the physical speeds of the basic trunk circuit and the backup circuit are 1.5 Mbps and 64 Kbps, respectively.

In view of the physical speed of the basic trunk circuit being 1.5 Mbps, a single time slot is 0.267 μs. Assuming that one period be 168 time slots, when the cells are transmitted over all of the time slots, the following band is used.

168×53×8×(1÷0.46368)=1536231.884 (bps)

Namely, it is possible to provide the throughput of 1.5 Mbps.

Figure 29:
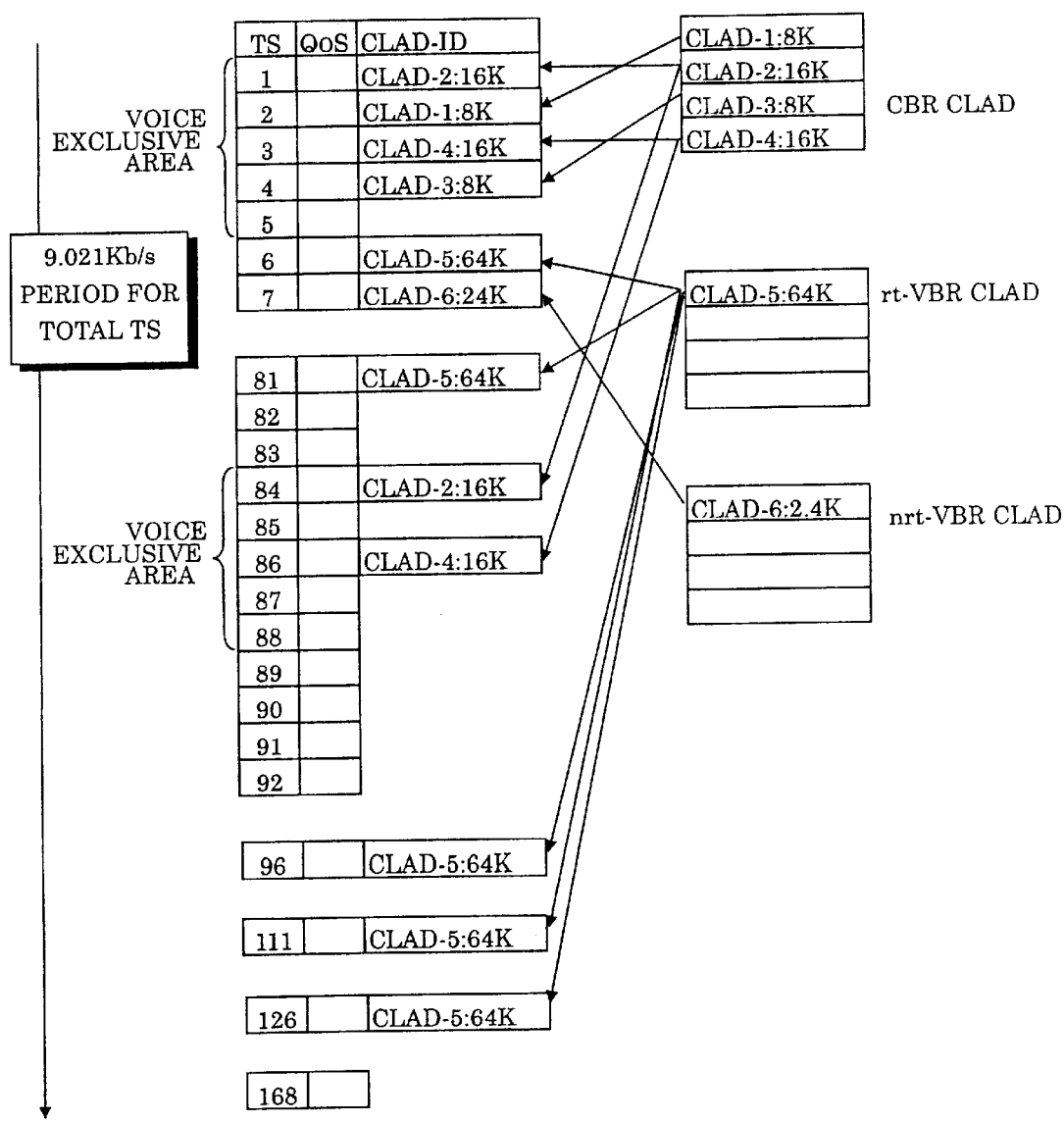
FIG. 29 is a diagram showing a preparation algorithm of a main table in a schedule memory table used in an ATM cell multiplexer according to the present invention.

In view of the physical speed of the backup circuit being 64 kpbs, for setting up the main table shown in FIG. 29, the CLAD units making a detour upon the connection of the backup circuit set the CLAD-ID every 24 time slots which are 1TS, 25TS, 49TS, 73TS, 97TS, 121TS, and 145TS, for example.

The CLAD units not making a detour upon the connection of the backup circuit are preset to other time slots than the above-noted time slots.

When the basic trunk circuit is faulted and the backup circuit is connected, the physical speed is shifted from 1.5 Mbps to 64 kbps. In this case, the ATM bus scheduler changes the schedule of the readin from the main table every single time slot to the schedule every 24 time slots by taking an opportunity of the physical speed having been changed whereby only the CLAD units set every 24 time slots are provided with the transmission right to select the CLAD units with a detour or those without a detour.

Likewise, in case of the physical speed of the backup circuit being 128 kbps, the CLAD units should be set every 12 time slots.

Expanded example of trunk circuit number will now be described.

Basically, the ATM cell multiplexer has two trunk circuits (basic trunk circuit plus backup circuit) at most. By using this assumption the above description has been made with reference to a method which can efficiently control the up and down directions at a low cost.

Namely, since FIG. 21 is illustrated assuming that there are two trunk circuits, the cells in the down direction can be received unconditionally up to two cells for every single time slot. In the up direction, only one cell can be transmitted for every single time slot under the control of the scheduler.

Figure 1:
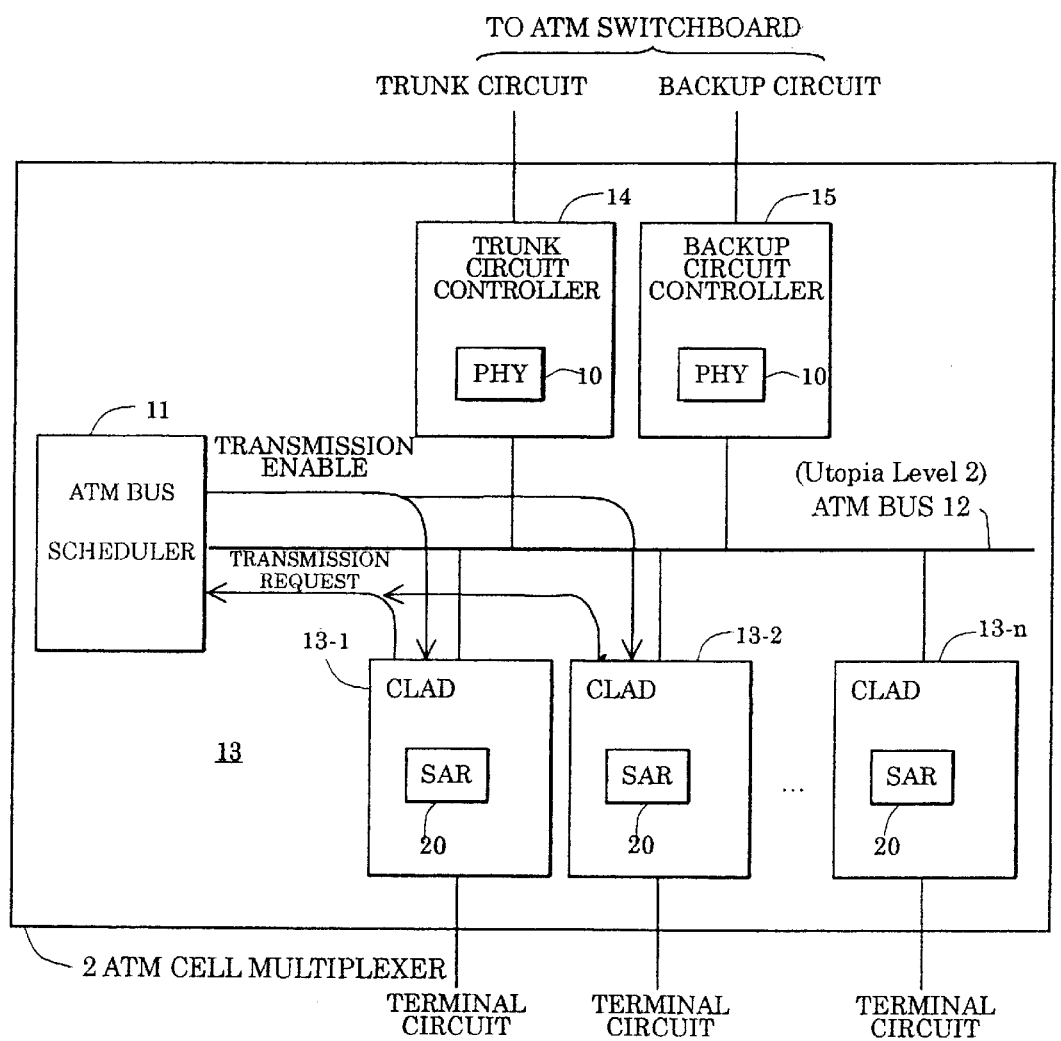
FIG. 1 is a block diagram showing a schematic arrangement of an ATM cell multiplexer according to the present invention.
Figure 2:
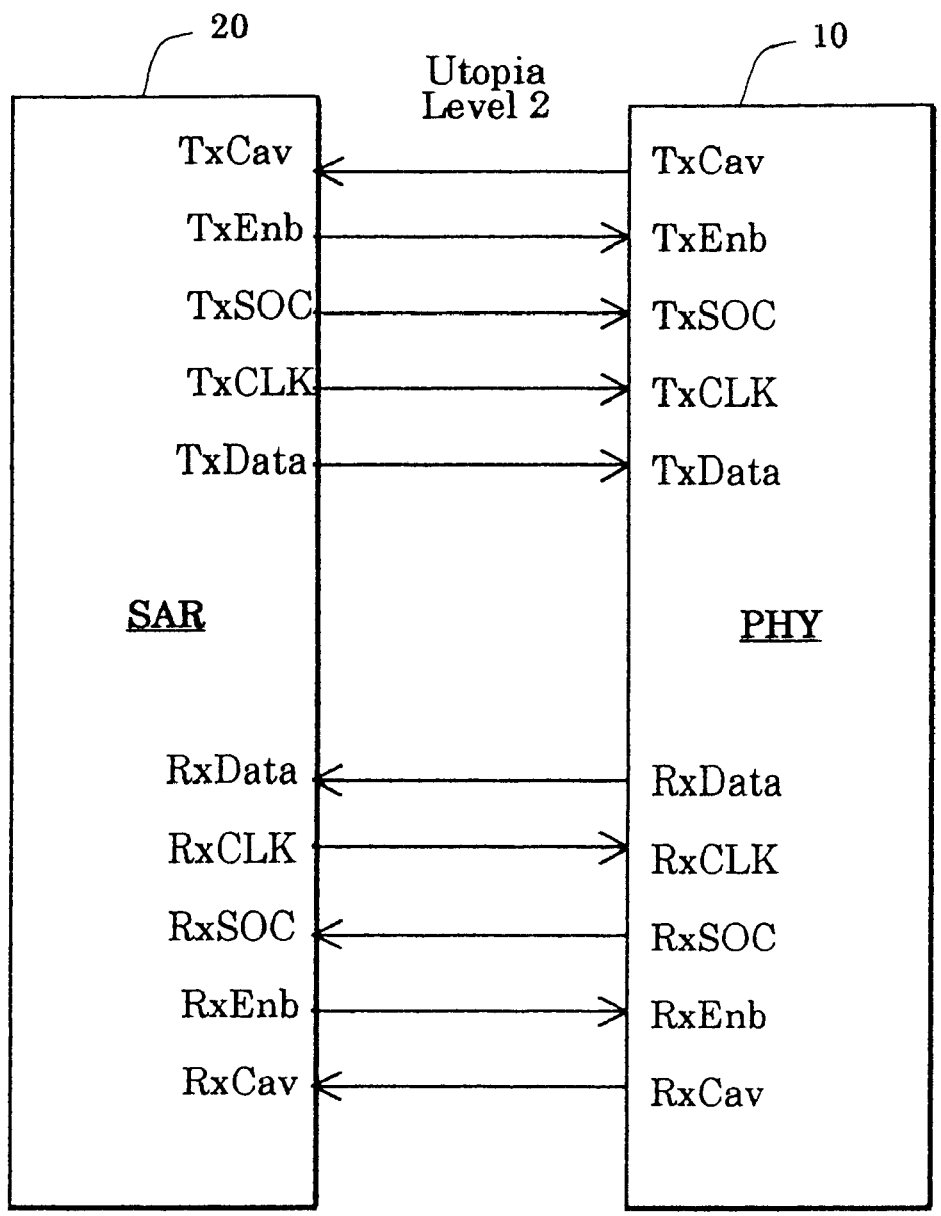
FIG. 2 is a block diagram showing a Utopia Level 2 prescribed by the ATM forum.
Figure 4A:
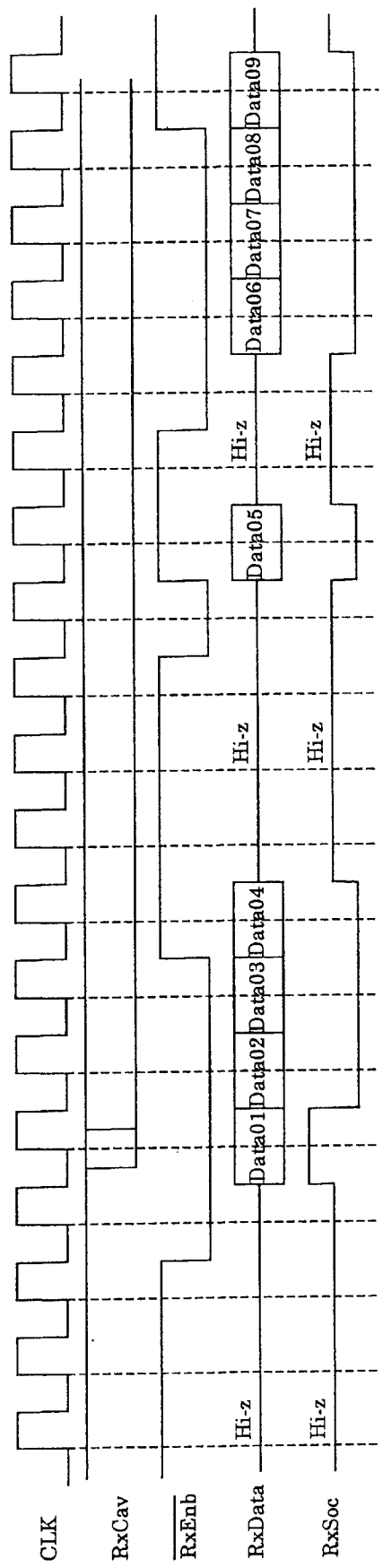
FIGS. 4A and 4B are time charts of a Utopia Level 2 (a trunk circuit controller→an ATM bus)
Figure 4B:
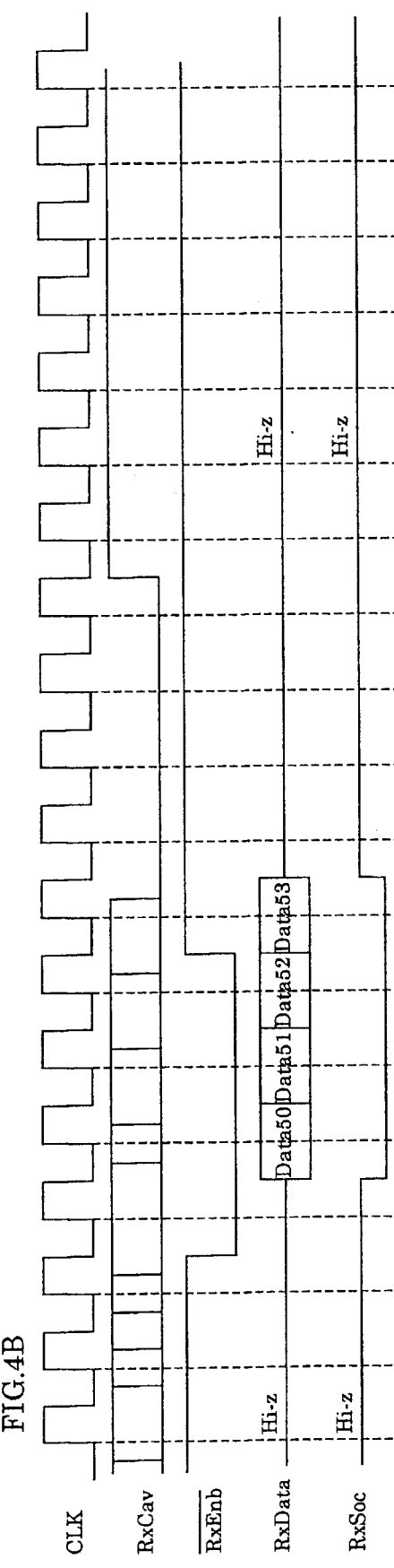
Figure 6:
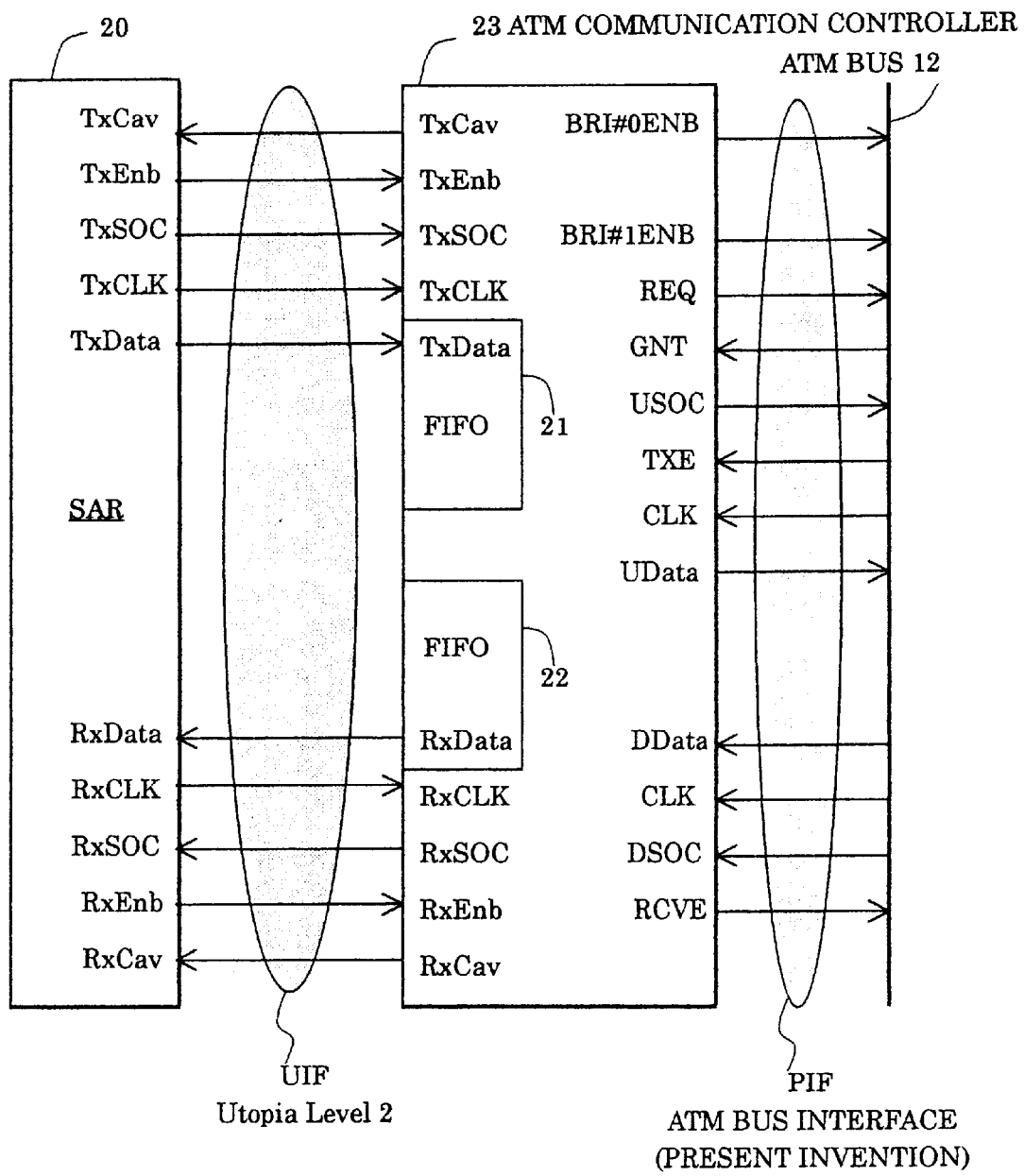
FIG. 6 is a block diagram showing a conversion arrangement between a Utopia Level 2 and an ATM bus interface by an ATM cell multiplexer according to the present invention.
Figure 7:
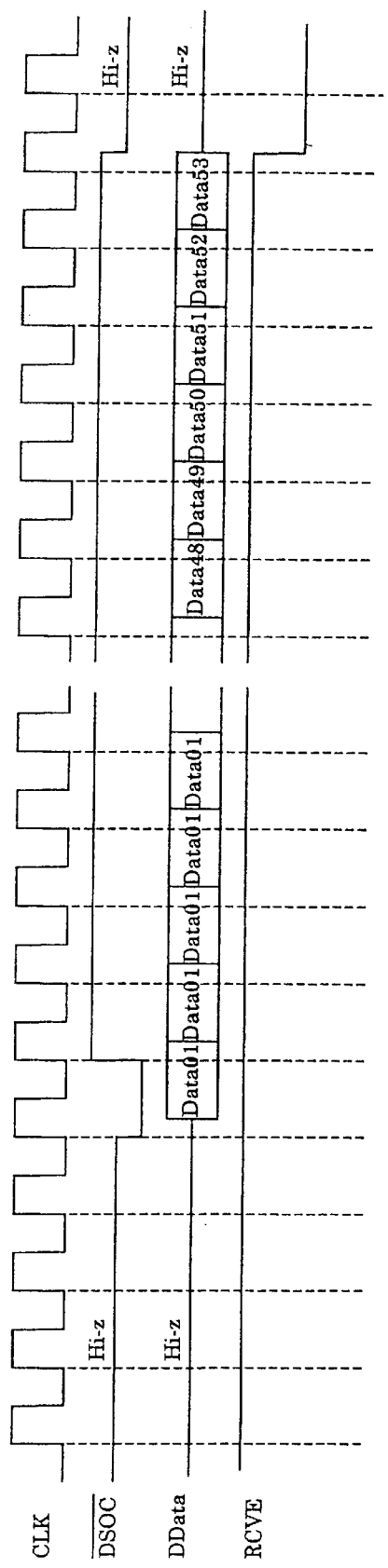
FIG. 7 is a time chart of an ATM bus (a trunk circuit controllers an ATM bus)
Figure 8:
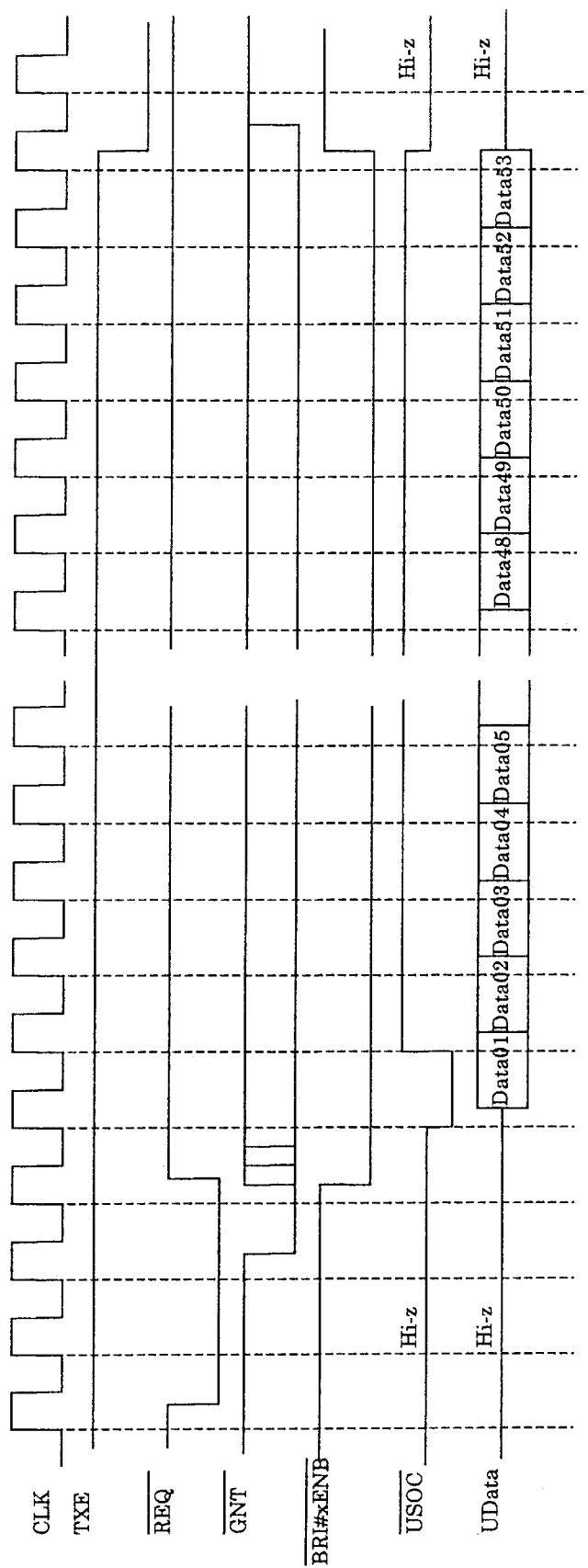
FIG. 8 is a time chart of an ATM bus (CLAD units→a trunk circuit controller)

However, if the cells in the down direction are changed to have the same scheduler method as the up direction, the number of the trunk circuit is not restricted theoretically, as will be described in the following:

Even in the down direction, a scheduler function with the same organization as the up direction is provided. Through a couple of the schedulers, the transmission right of one cell is provided in the up and down directions per a single time slot. The trunk circuit controller 14 (see FIGS. 1,5) is made to declare the same maximum cell rate as the CLAD units, thereby preparing the main table. Those two schedulers provide the transmission right once for every single time slot which is to be given to the CLAD units and the trunk circuit controllers.

By the above-noted control, the number of trunk circuits can be infinitely expanded.

Coordinated function with ATM cell multiplexer and ATM switchboard will now be described.

A coordinated function between the ATM cell multiplexer and the ATM switchboard will now be described in the following.

Because of the ATM switchboard having included therein an ATM switch (ATM-SW shown in FIG. 33), the connection ID (VPI/VCI) of the trunk circuit is different from that of the terminal equipments i.e. the CLAD units so that the ATM switch can convert the connection ID.

On the other hand, the ATM cell multiplexer is generally known as a unit not installing the ATM switch. Therefore, it is required that the connection ID of the trunk circuits is the same as that of the cells generated by the CLAD units.

To meet this requirement, the CLAD units are required to have the following three functions.

(1) In case of PVC (Permanent Virtual Circuit) connection, the connection ID provided by the trunk circuit should be settable for the CLAD units for every connection.

(2) In the case of SVC (Switched Virtual Circuit) connection, the connection ID determined with the trunk circuit upon call setting should be settable for the CLAD units per each call.

Figure 32:
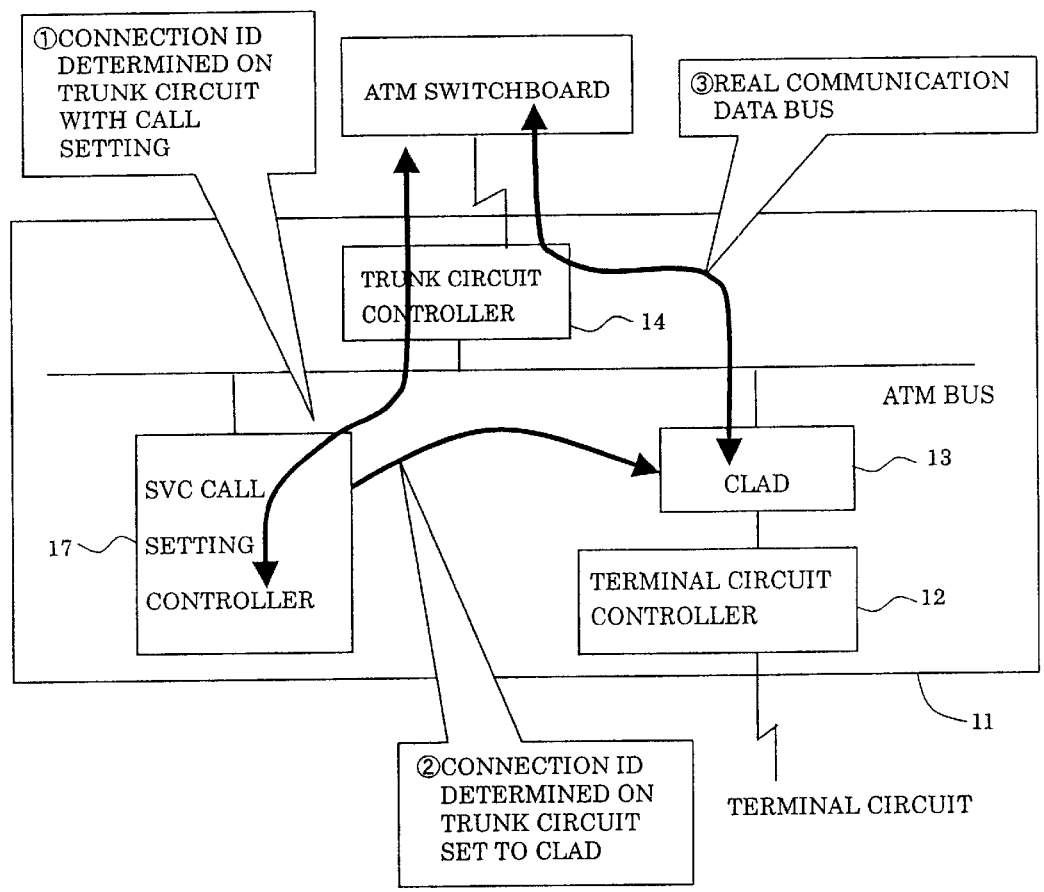
FIG. 32 is a block diagram illustrating an operation of an SVC connection ID of an ATM cell multiplexer according to the present invention.

An arrangement of this ATM cell multiplexer is shown in FIG. 32.

The ATM cell multiplexer 11 is provided with an SVC call setting controller 17 in addition to the above-noted CLAD unit 13, the trunk circuit 14, and the terminal equipment circuit controller 16.

The SVC call setting controller 17 determines the connection ID on the trunk circuit as shown by ① in accordance with the ATM call setting protocol, e.g. ATM forum UNI4.0 at the time (opportunity) of setting calls such as the time of data reception from the terminal equipments, the time of switching on the power source, and the time of receiving call setting messages.

The SVC call setting controller 17 sets the determined connection ID to the CLAD unit 13 as shown by ②. The CLAD unit 13 transmits and receives the cells with the set connection ID. As a result, the cells can be multiplexed/demultiplexed in the ATM cell multiplexer without the ATM switch as shown by ③.

(3) In case of soft-PVC provided by PNNI (Private Network-Network Interface) of the ATM forum, it is necessary that the connection ID of the addressed CLAD units having been converted by the ATM switch is set in the call setting message. Since the ATM cell multiplexer does not install the ATM switch, a virtual connection ID should be designated.

This virtual connection ID is used to decide which CLAD unit has the cells addressed thereto in the a plurality of CLAD units within the ATM cell multiplexer. For the connection ID of actual communication cells, the connection ID determined by the trunk circuit between the ATM cell multiplexer and the ATM switchboard is set to the CLAD unit of the ATM cell multiplexer.

Figure 33:
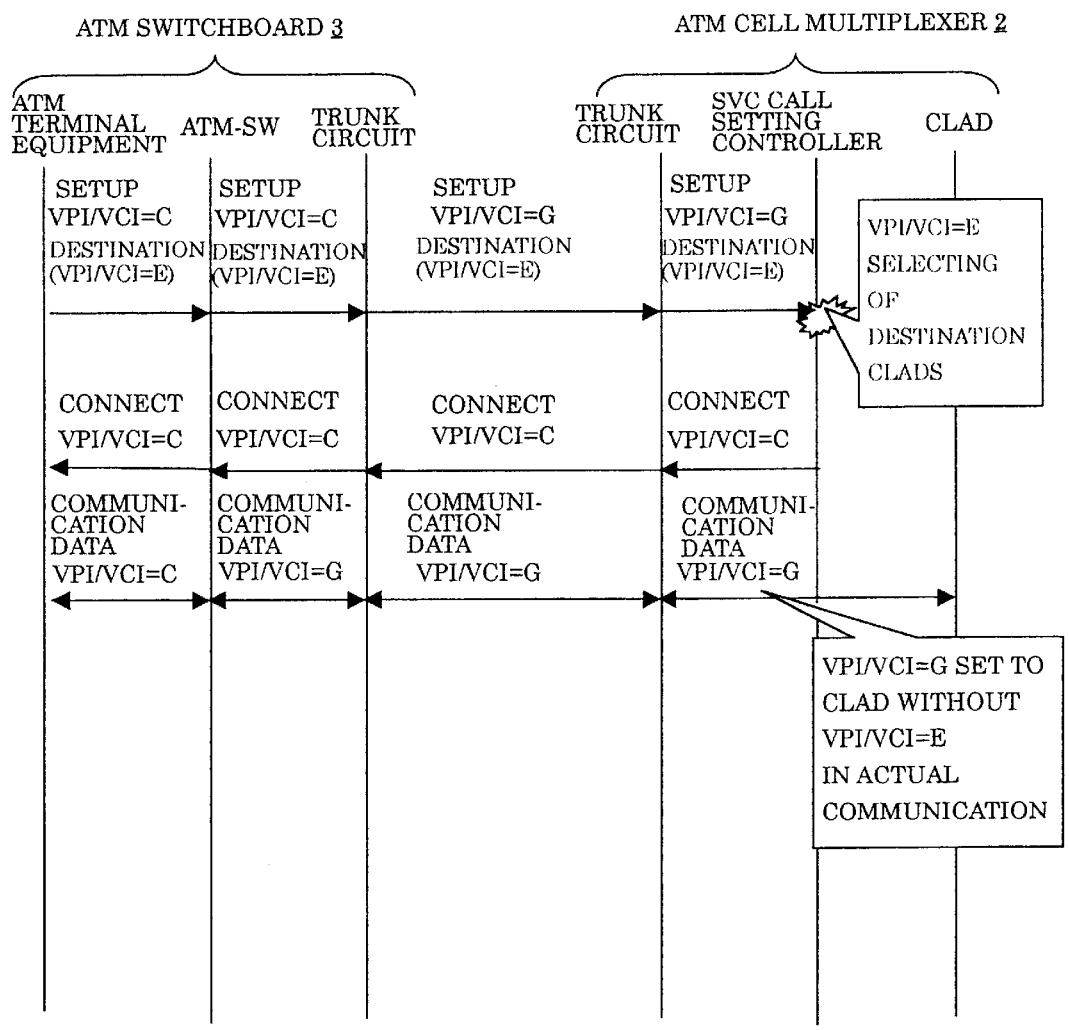
FIG. 33 is a sequence chart showing a SOFT-PVC communication method in an ATM cell multiplexer according to the present invention.

A setting sequence of the SVC connection ID is shown in FIG. 33.

The opponent VPI/VCI means an addressed connection ID used with the PNNI of the ATM forum. With SETUP message received from the ATM switchboard 3, the opponent having VPI/VCI=E selects the CLAD unit E in the SVC call setting controller 17. In actual communication, the connection ID of VPI/VCI=G of the ATM switchboard is used.

While the terminal circuits have been all described with the assumption of the CLAD units, not only the CLAD units but also a simple pseudo switch of a low price which realizes the connection of multi-points to multi-points can be applied by supporting the ATM cell interface directly For the embodiment, the CLAD units can be substituted by the ATM-UNI interface.

Hereinafter, a more specific embodiment of the ATM bus scheduler 11 shown in FIG. 22 will be described.

Figure 34:
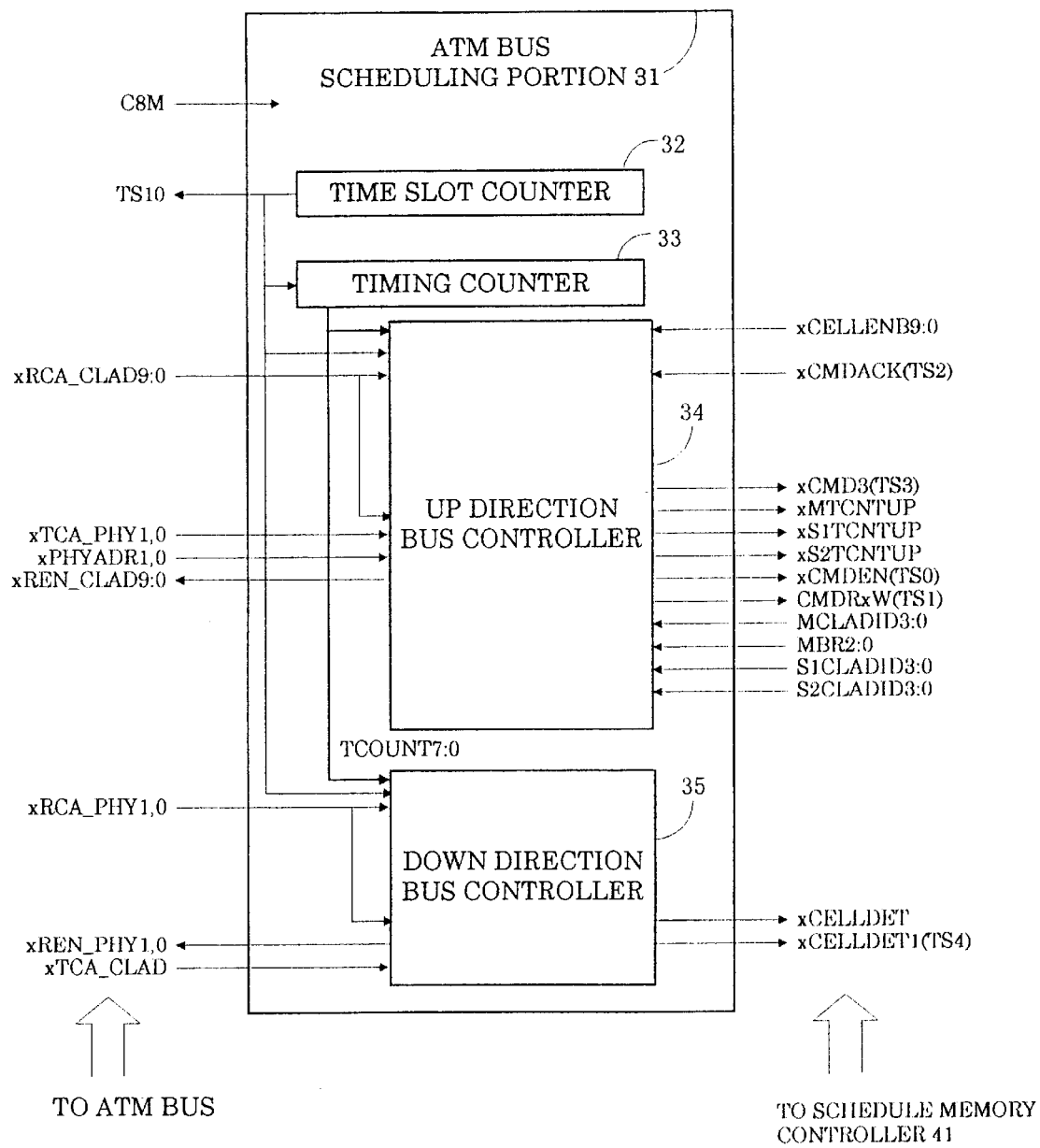
FIG. 34 is a block diagram showing an embodiment of an ATM bus scheduling portion which forms an ATM bus scheduler in an ATM cell multiplexer according to the present invention.
Figure 35:
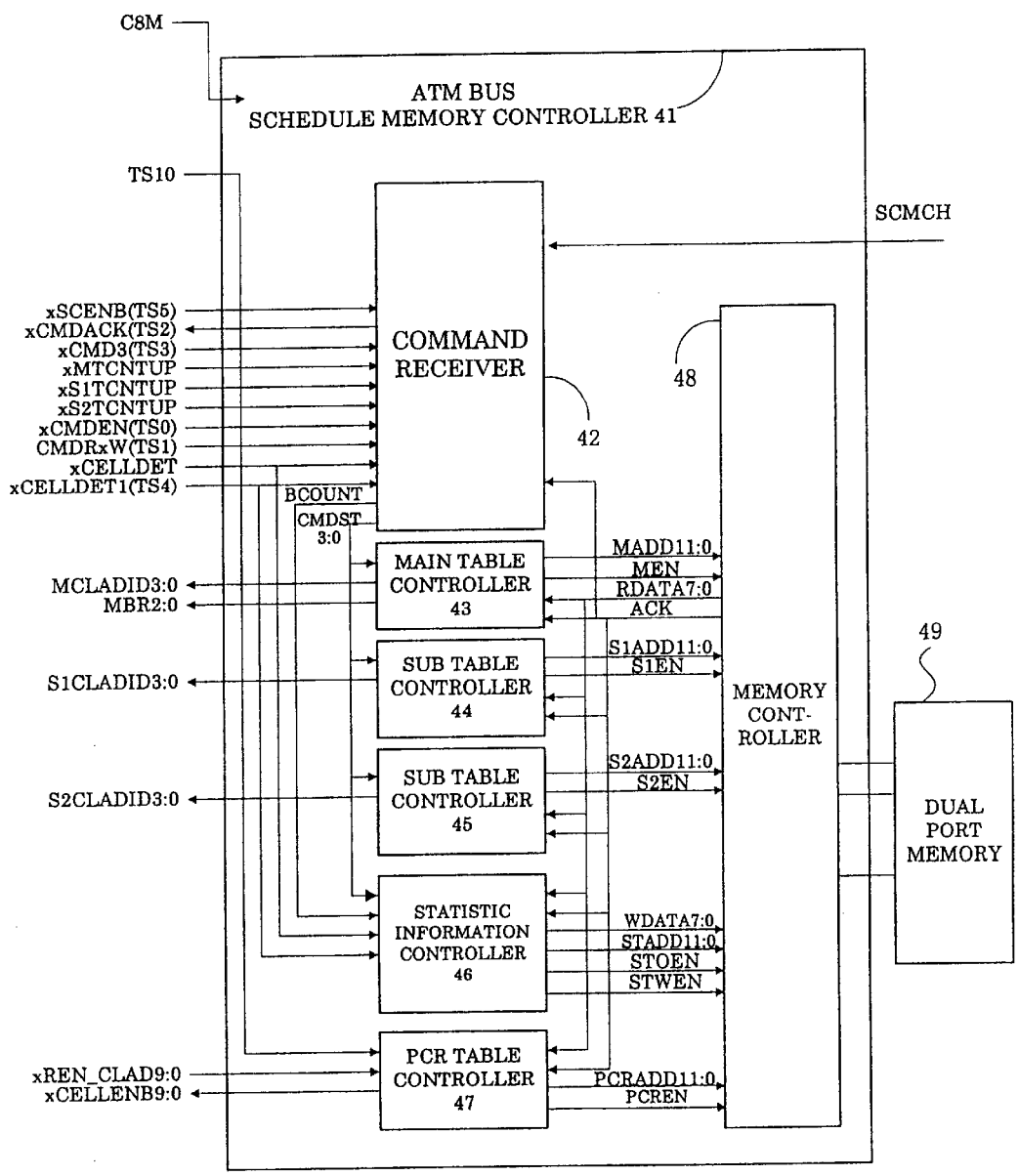
FIG. 35 is a block diagram showing an embodiment of an ATM bus schedule memory controller which forms an ATM bus scheduler in an ATM cell multiplexer according to the present invention.

First of all, the ATM bus scheduler 11 in FIG. 22 comprises an ATM bus scheduling portion 31 in FIG. 34 and an ATM bus schedule memory controller 41 (shown in FIG. 35). The left side of the scheduling portion 31 is connected to the ATM bus 12 and the right side is connected to the scheduling memory controller 41.

Also, the scheduling portion 31 has an input/output signal shown in FIG. 36 and comprises a time slot counter 32, a timing counter 33, an up direction bus controller 34, and a down direction bus controller 35. The scheduling memory controller 41 has an input/output signal shown in FIG. 37 and comprises a command receiver 42, a main table controller 43, sub table controllers 45, 46, a PCR table controller 47, and a memory controller 48.

In addition, the bus controller 34 comprises the ATM bus control signal unit 112 and the CLAD transmission right signal generator 117 in FIG. 22. The controllers 43–45 and 47 correspond to controllers 113–116 shown in FIG. 22.

Moreover, the memory controller 48 is connected to a dual port memory 49 corresponding to a DP-RAM212 shown in FIG. 10, and this memory 49 forms the schedule table STB (the main table T1 and the sub tables T2, T3) and a PCR setting table T3.

The operation of the ATM bus scheduler 11 will now be described in addition to the above-mentioned operations.

Figure 38:
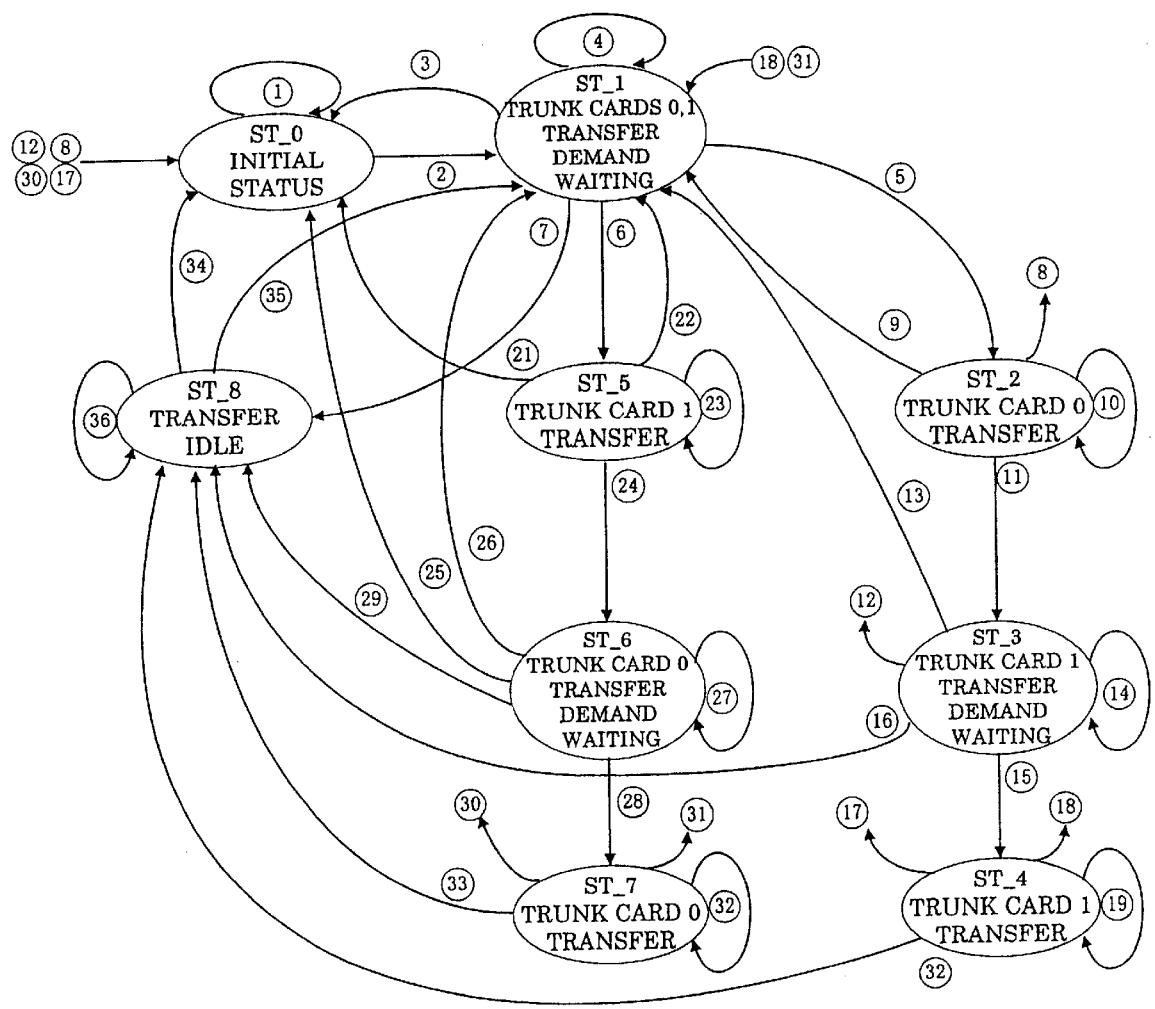
FIG. 38 is a sequence chart showing a down scheduler transition of an ATM bus scheduler in an ATM cell multiplexer according to the present invention.

First of all, the operation of the scheduler for the down direction transfer demand will be described referring to FIG. 38 which shows a transition condition of the scheduler by the down direction bus controller 35, and FIG. 39, which shows the transition condition of down scheduler chart. In the transition condition diagram in FIG. 38, numbers in circles, which will be represented in parentheses in the following description, correspond to the transition numbers of the transition condition chart in FIG. 39.

A signal xPKGRST shown in FIG. 39 (not shown in FIGS. 34, 35) is a reset signal, and a down scheduler status is set to be an initial status (ST_0). Likewise, an SCMEN signal shown only in FIG. 39 is an enable signal for the down scheduler. If this signal is disabled during a transfer idle status (ST_8), the down scheduler status is set to the initial status (transition (34)). The transmission request from the trunk card (the trunk circuit board 140, 150 in FIG. 9) is executed by signals xRCA_PHY0 and 1. A "TS 10" shown in FIG. 39 is a signal indicating the head of time slot and is generated in the time slot counter 32 of the down scheduler.

The down direction bus controller 35 in the scheduling portion 31 accepts the transmission request signals xRCA_PHY0 and 1 from the trunk card at every fixed time (every TS 10 signal). When a transmission request signal xRCA_PHY0 is received from the trunk card 0 (the trunk circuit board 140), the down direction bus controller 35 provides a trunk card 0 with a bus right signal xREN_PHY0 (transition (5)).

As soon as the bus right is provided, the trunk card 0 executes the transmission (status ST_2). When the transmission has been completed, the down direction bus controller 35 monitors the transmission request signal xRCA_PHY1 from the trunk card 1 (the trunk circuit board 150) (status ST_3). When the transmission request from the trunk card 1 is sent, the down direction bus controller 35 provides the trunk card 1 with the bus right signal xREN_PHY1 (transition (15)).

In the above-mentioned operation, if the transmission request from the trunk card 1 is first sent, the bus right is provided for the trunk card 1 (status ST 5), and then the operation of the transmission request for the trunk card 0 is monitored (status ST_6). In the case where the transmission requests are sent from both of the trunk cards 0 and 1, the bus right is first provided for the trunk card 0, (transition (5)), and then (transition (9)), the bus right is provided for the trunk card 1 (transition (6)).

Monitoring the transmission request from the trunk cards 0 and 1 (status ST_1) is executed for a fixed time from the head of the time slot TS 10. If there is no transmission request for that time, no transmission right is assigned in the time slot (transition (7)).

In this embodiment, for 264 μs from the head of the time slot the transmission request is monitored. This condition is provided with a "timer" in the transition condition chart in FIG. 39. A "wait count" shown in FIG. 39 indicates a time corresponding to a single cell length. The down scheduler waits until the trunk card transmits a single cell after the transmission rights are assigned at the statuses ST_2, 5, 4 and 7 by monitoring the value of the "wait count".

The down scheduler assigns the bus right signals xREN_PHY0 and 1 for the trunk cards 0 and 1, monitors a reception enable signal xTCA_CLAD from the CLAD units 13 (130) during the cell transfer, and detects that the CLAD units have not been able to receive the cell the trunk card has transmitted. The result of the detection is notified to the schedule memory controller 41 in FIG. 35 as cell abandonment signals xCELLDET and xCELLDET1.

The schedule memory controller 41 renews a statistics information table, which will be described later, with the signals xCELLDET and xCELLDET1 for down cell abandonment.

Now, the operation of the scheduler for the up direction transfer request will be described referring to FIG. 40, which shows a transition condition of the up scheduler as well as FIGS. 41–45, which show a transition condition of up scheduler charts.

Figure 40:
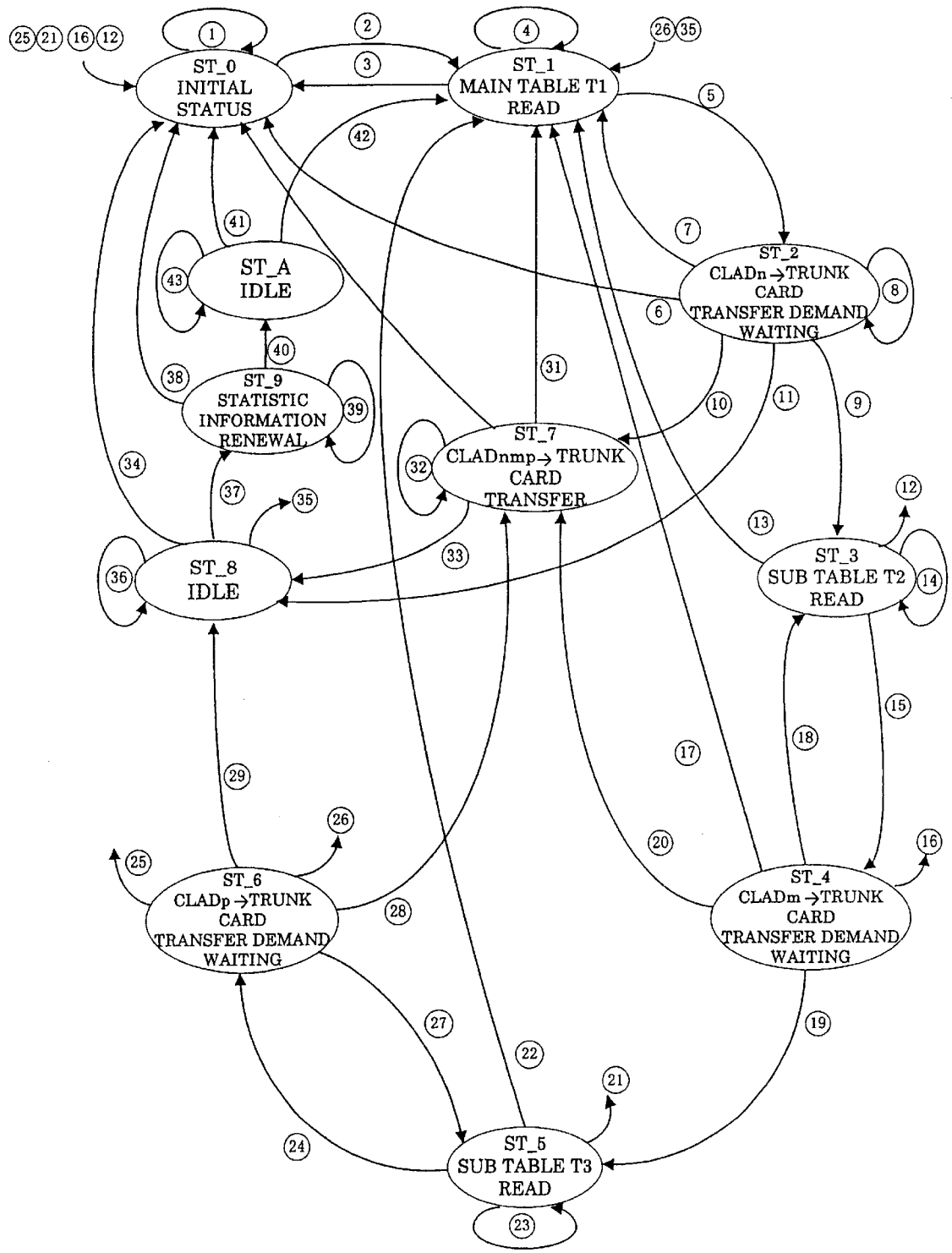
FIG. 40 is a sequence chart showing an up scheduler transition of an ATM bus scheduler in an ATM cell multiplexer according to the present invention.

A signal xPKGRST is a reset signal as in the case of the down direction, and the scheduler status is set to the initial status (ST_0 in FIG. 40). The signal SCMEN is an enable signal of the scheduler. When this signal is disabled during an idle status (ST_A), the scheduler status is also set to the initial status (transition (41) in FIG. 40). The transmission request from the CLAD units is executed by signals xRCA_CLAD0–9. The TS 10 is a signal indicating the head of time slot and is generated in the time slot counter 32 of the up scheduler.

(1) Read of Main Table T1:

The up direction bus controller 34 reads the value of the main table Ti inside the memory 49 at predetermined intervals (every TS 10 signal). When reading the main table T1, the scheduling portion 31 provides a control command for the ATM bus schedule memory controller 41. The ATM bus schedule memory controller 41 executes an actual read of the main table T1 (status ST_4 in FIG. 46).

This command is notified to the main table controller 43 as a combination of signals xCMD3, xMTCNTUP, xS1CNTUP, xS2CNTUP, xCMDEN, and CMDRxW through the command receiver 42 of the schedule memory controller 41 so that the process of reading the main table T1 inside the dual port memory 49 is executed.

Figure 46:
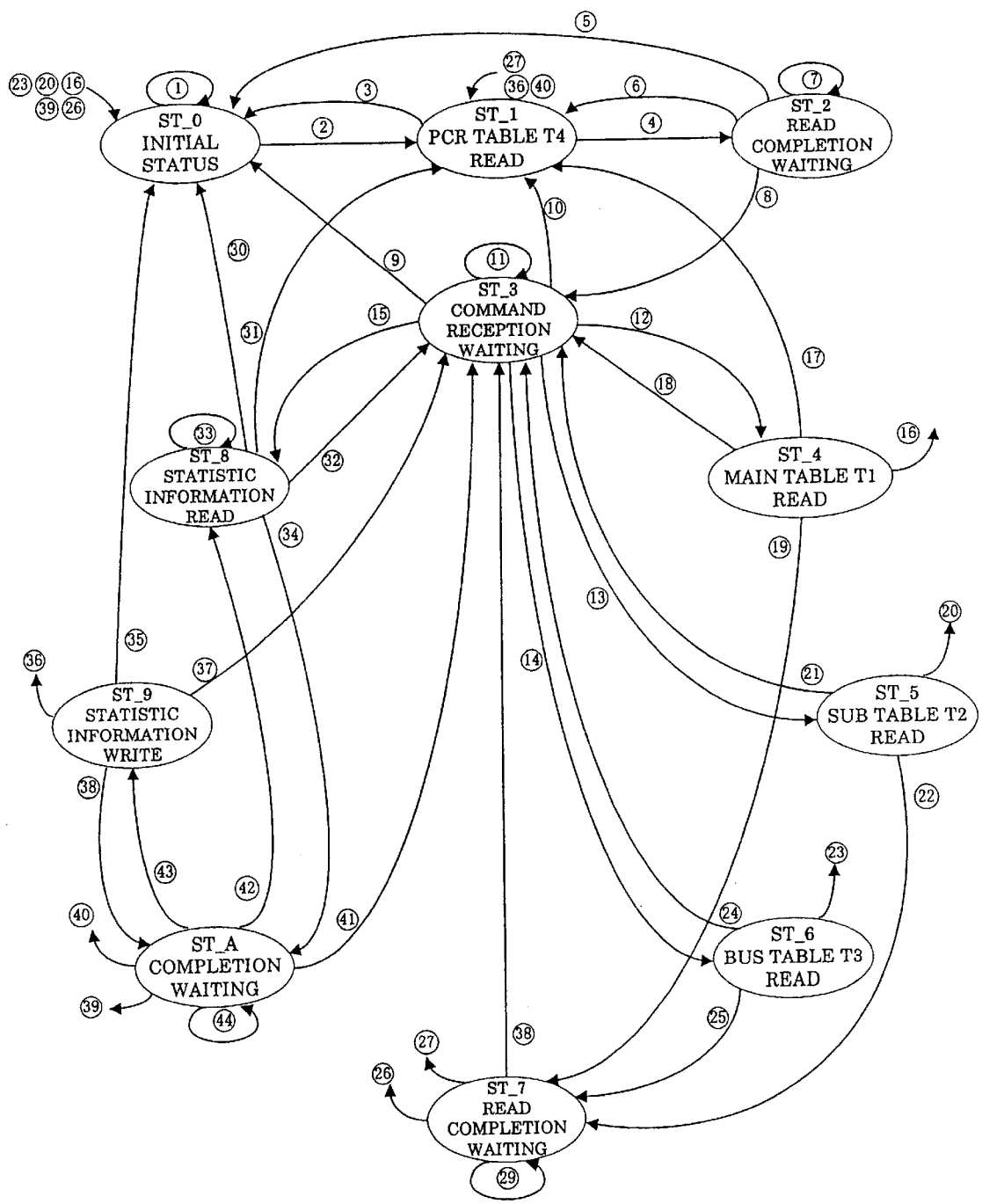
FIG. 46 is a sequence chart showing a transition diagram of a command receiver which forms an ATM bus scheduler in an ATM cell multiplexer according to the present invention.
Figure 52:
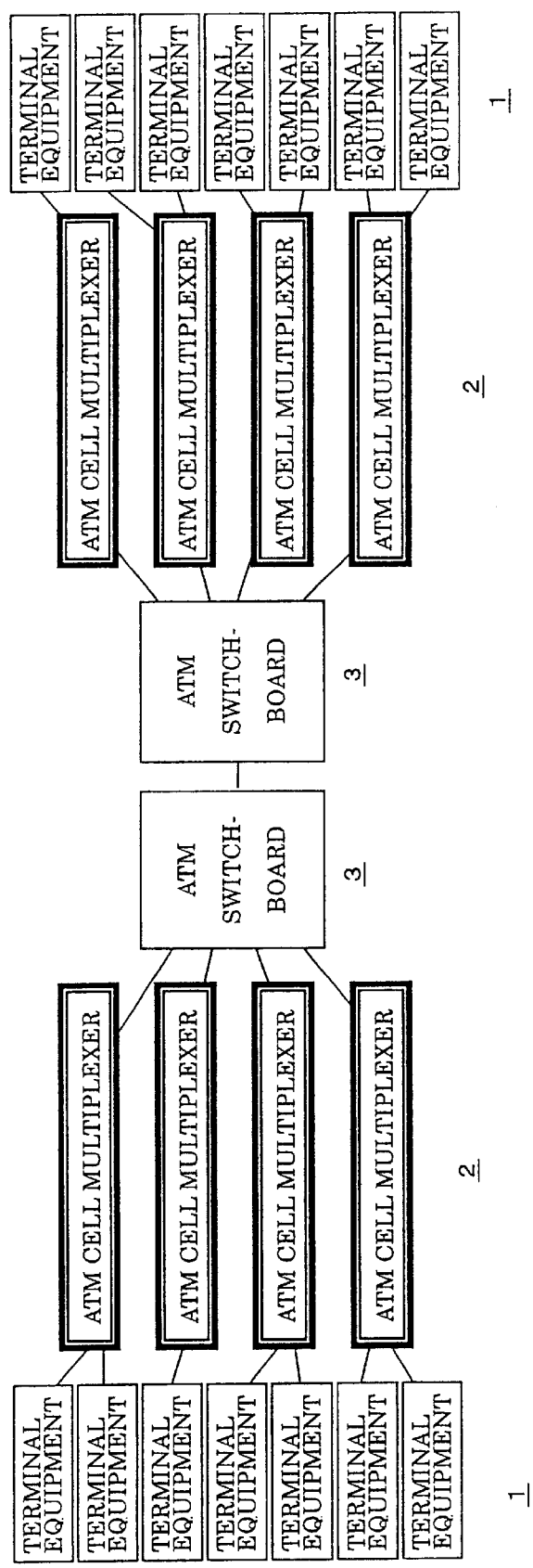
FIG. 52 is a block diagram showing an arrangement of a general ATM cell multiplexer.

A transition condition diagram at which the operation of the schedule memory controller 41 by the combination of the command signals xCMD3, xMTCNTUP, xS1CNTUP, xS2CNTUP, xCMDEN, and CMDRxW is performed by the command receiver 42 is shown in FIG. 46 and its transition condition chart is shown in FIGS. 47–50. FIG. 51 shows an example of the above-mentioned command signal.

The result of having read the main table T1 (status ST_1 in FIG. 40) is notified to the bus scheduling portion 31 (transitions (19), (38) in FIG. 46). In the main table T1, an ID value (MCLADID3-0) of the CLAD units 13 which carry out the CBR, rt-VBR, nrt-VBR communication, and a value (MBR2-0) indicating that the communication of the CLAD units is made by any one of the CBR, rt-VBR, and nrt-VBR are stored. If the read value of the main table T1 is notified to the bus scheduling portion 31 as a signal xCMDAC, the up bus scheduler monitors for a fixed time that the CLAD units corresponding to the ID value provide the transmission request (status ST_2 in FIG. 40).

(2) CBR communication by main table T1 (MBR2-0="001"):

When the communication of the CLAD units 13 is the CBR category (MBR2-0="001"), the transmission request from the CLAD units are accepted for 264 µs (status ST_2 in FIG. 40). The presence of the transmission request xRCA_CLADn from the CLAD units provides, the bus right signal xREN_CLADn (status ST_7in FIG. 40). As soon as the bus right is provided, the CLAD units execute the transmission.

After waiting a time for which a single cell is transferred (for 53 clocks)(status ST_8 in FIG. 40), the up scheduler renews the statistic information in the cell transfer (status ST_9 in FIG. 40). When there is no transmission request from the CLAD units for 246 µs, the bus right in the time slot is abandoned (transition(11)) to renew the statistic information (status ST_9 in FIG. 40).

(3) rt-VBR communication by main table T1 (MBR2-0="010") and (MBR2-0="011"):

When the communication of the CLAD units is the rt-VBR category (MBR2-0="010") or the nrt-VBR category (MBR2-0="011"), the transmission request from the CLAD units is accepted for 181 µs. When there is a transmission request signal xRCA_CLADn from the CLAD units, the bus right signal xREN_CLADn is provided like the above-noted (2). As soon as the bus right is provided, the CLAD units execute the transmission.

After waiting a time for which a single cell is transferred (for 53 clocks), the up scheduler renews the statistic information in the cell transfer. In the case of the rt-VBR and the nrt-VBR communications, there is a limit for the transmission right due to a PCR table T4 as mentioned above.

For the CLAD units which transmits the cells whose number is set for a fixed time, limitation signals xCELLENB0-9 for transmission based on the PCR from the PCR table controller 47 is provided (transition (10) in FIG. 46). As a result, when there is a limit for the ID value which is read from the main table T1, no bus right is provided. In the case where no bus right is provided due to the limit for transmission and there is no transmission request from the CLAD units for 181 µs, the bus right for the CLAD units corresponding to the CLAD-ID value which is read from the main table Ti is abandoned (transition (9) in FIG. 46), and a new CLAD-ID value is read from the sub table T2 within the dual port memory 49 (status ST_3 in FIG. 46).

(4) Read of Sub Table T2:

When the ID read from the main table T1 indicates the rt-VBR communication or the bus right is not assigned in the above (3) and in nrt-VBR communication, the bus controller 34 reads the value of the sub table T2 (status ST_3 in FIG. 46). When reading the sub table T2, the bus controller 34 provides the control command shown in FIG. 51 for the ATM bus schedule memory controller 41. The table T2 is actually read by the ATM bus schedule memory controller 41 (status ST_5 in FIG. 46).

The read result is notified to the bus scheduling portion 31. The ID value (S1CLADID3-0) of the CLAD units for the nrt-VBR communication is stored in the sub table T2. If the read value of the sub table T2 is notified to the bus scheduling portion 31 with a signal xCMDACK, the up bus scheduler monitors whether or not there is a transmission request from the CLAD units of the ID (status ST_4 in FIG. 40).

(5) nrt-VBR Communication by Sub Table T2:

If there is a transmission request signal xRCA_CLADn from a CLAD-IDR read from the sub table T2, the up scheduler provides a bus right signal xREN_CLADn (transition (20)). As soon as the bus right is assigned, the CLAD units execute the transmission (status ST_7). After waiting a single cell transfer (for 53 clocks)(status ST_8), the up scheduler renews the statistic information in the cell transfer (status ST_9).

In the case of the nrt-VBR communication with the bus table T2, there is a limit of the transmission right due to the PCR table T4 (status ST_1 in FIG. 46). For the CLAD units which transmit the cells whose number is set for a fixed time transmission limit signals xCELLENB0-9 based on the PCR is provided.

If there is a transmission limit for the ID value read from the sub table T2, no bus right is provided. When the bus right is not provided due to the transmission limit and there is no transmission request from the CLAD units, the bus right for the CLAD units corresponding to the CLAD-ID value which is read from the sub table T2 is abandoned, so that a new CLAD-ID value is read from the sub table T2 (status ST_5 in FIG. 46). Thus, the values of the sub table T2 are read one after another until the transmission request for the CLAD-ID read from the sub table T2 is generated.

When there is no transmission request for all of the CLAD-ID's of the sub table T2, the schedule memory controller 41 returns a signal "E" for the CLAD-ID (transition (13)). Therefore, the bus right for the CLAD units corresponding to the CLAD-ID read from the sub table T2 is abandoned, so that a new CLAD-ID value is read from the sub table T3 (status ST_5).

(6) Read of Sub Table T3:

When the bus right is not assigned for the ID read from the sub table T2 in the above-mentioned (5), the bus controller 34 reads the value of the bus table T3 (status ST_5 in FIG. 40). When reading the table T3, the bus scheduling portion 31 provides the control command in FIG. 51 for the ATM bus schedule memory controller 41. The table T3 is actually read by the ATM bus schedule memory controller 41 (status ST_6 in FIG. 46). The read result is notified to the bus scheduling portion.

The ID value (S2CLADID3-0) of the CLAD units which execute the UBR communication is stored in the sub table T3. If the read value of the sub table T3 is notified to the bus scheduling portion 31 as a signal xCMDACK, the up scheduler monitors whether or not there is a transmission request from the CLAD units of the ID (status ST_6 in FIG. 40).

(7) UBR Communication by Sub Table T3:

If there is a transmission request signal xRCA_CLADn from the CLAD-IDR read from the sub table T3, the up scheduler provides the bus right signal xREN_CLADn. As soon as the bus right is assigned, the CLAD units executes the transmission (transition (28) and status ST_7 in FIG. 40). After waiting a single cell transfer (for 53 clocks), the up scheduler renews the statistic information in the cell transfer (statuses ST_8 and ST_9 in FIG. 40).

When there is no transmission request from the CLAD units, the bus right for the CLAD units corresponding to the CLAD-ID value read from the sub table T3 is abandoned, so that a new CLAD-ID value is read from the sub table T3 (transition (27) and status ST_5).

In this way, the values of the sub table T3 are read one after another until the transmission request for the CLAD-ID read from the sub table T3 is generated. When there is no transmission request for all of the CLAD-ID's of the sub table T3, the schedule memory controller 41 returns the "E" for the CLAD-ID. As a result, the bus right in the time slot is abandoned (transition (29) and status ST_8 in FIG. 40), and the statistic information is renewed (status ST_9 in FIG. 40).

The above-mentioned statistic information is as follows:
(a) Time slot number;
(b) Transmitted cell number for every CLAD unit;
(c) Abandoned cell number at cell receiving time in the trunk card 0;
(d) Abandoned cell number at cell receiving time in the trunk card 1;
(e) Abandoned cell number at cell receiving time in the CLAD units.

The bus scheduler 11 renews the above-mentioned information of the statistic information table prepared in the dual port memory 49 for every time slot.

In the down direction communication, the abandoned cell number at the cell receiving time in the CLAD units at the cell transmission time from the trunk card is renewed. The number is notified to the schedule memory controller 41 as signals xCELLDET and xCELLDET1 from the bus controller 35, and the process of renewing a cell abandonment table in the CLAD units is executed.

In the up direction communication, the renewal processes of the time slot number, the transmitted cell number per each CLAD unit, the abandoned cell number at the cell receiving time in the trunk card 0, and the abandoned cell number at the cell receiving time in the trunk card 1 are executed. These are notified to the schedule memory controller 41 as a combination of the command signals xCMD3, XMTCNTUP, xS1CNTUP, xS2CNTUP, xCMDEN and CMDRxW, and the process of renewing each of the tables is executed (see FIGS. 47–51).

Hereinafter, the access to the dual port memory 49 will be described.

If the circuit or the terminal equipment is connected to the ATM cell multiplexer, the CLAD-ID, the communication type, the communication rate, and the like are registered. The main CPU 216 of the main board 110 registers the communication information of the terminal equipments in the dual port memory (DP-RAM) 49 (212). The DPRAM 49 of the scheduler 11 is composed of double memory tables. The information renewal from the main CPU 216 is always executed for a standby table.

When having completed the renewal of the table, the main CPU 216 sends a switchover command of the table to the scheduler 11. Although receiving the switchover command of the table, the scheduler 11 does not perform the switchover of the tables at once. The switchover of the tables is performed in synchronization with reading out the head of the main table T1.

The control based on the PCR table T4 is carried out for the nrt-VBR communication. The PCR comprises a monitoring time slot number common to all of the packages and the largest transmitted cell number of each CLAD unit. These values are set by the main CPU 216. The scheduler 11 increments a monitoring time slot counter for every single time slot in the PCR table controller 47.

Also, the transmission cell counter for each CLAD unit is incremented every time the CLAD unit transmits the cell. When the transmission cell counter reaches the largest value for each CLAD unit, a control signal xCELLENBn based on a peak cell rate for the CLAD units is disabled, so that the bus right is not assigned (status ST_1 and transition (3) in FIG. 46) This status is held until a monitoring time slot counter 32 becomes equal to the monitoring time slot number common to all of the packages. When both become equal to each other, the monitoring time slot counter and the transmission cell counter are set to be "0", and the monitoring operation based on the peak cell rate is newly performed. This control makes it possible that the communication is controlled according to the peak cell rate with the monitoring time slot number common to all of the packages as a denominator and the largest transmitted cell number for each CLAD unit as a numerator.

As having been described, the ATM cell multiplexer according to the present invention is arranged so that in the up direction from the terminal equipment to the ATM switchboard, cells from a cell terminal portion in CLAD units are held in a cell holding portion through a Utopia Level 2 under the control of a communication controller in the CLAD units, and an ATM bus scheduler makes the cell holding portion transmit the cells to an ATM bus by assigning a transmission right for every cell holding portion of the CLAD units in accordance with a preset schedule table based on at least one of predetermined service categories and a traffic control corresponding to a traffic quantity, while in the down direction from the ATM switchboard to the terminal equipment the cells are broadcast from the ATM bus to the cell holding portion of each CLAD unit for a cell transfer and the communication controller makes the cell holding portion transfer the cells to the cell terminal portion through the Utopia Level 2 to decide whether or not the cells are addressed to itself. Therefore, the following effects are achieved:

(1) By adopting multiplexing art of the Utopia Level 2 which is a standard prescribed by the ATM forum, traffic control (CBR, VBR, UBR) is made possible whereby the developing cost and manufacturing cost as well as the size of the ATM cell multiplexer can be reduced.

(2) Without any ATM switch mounted, PVC, SVC, and SOFT-PVC are made possible and the developing cost and manufacturing cost of the ATM cell multiplexer can be largely reduced.

(3) The number of the trunk circuits can be easily expanded, resulting in the increased expansion of the ATM cell multiplexer.

(4) According to the set intervals of the schedule table, selection between a detour and non-detour can be made for each CLAD unit if the physical speeds are mutually different between the basic and the backup trunk circuits.

What we claim is:

1. An ATM cell multiplexer comprising:
a plurality of CLAD units, connected in parallel on an ATM bus so that ATM cells are assembled and disassembled between terminal equipments and an ATM switchboard, each including a cell holding portion, a communication controller, and a cell terminal portion which are all mutually connected with a Utopia Level 2 interface, and
an ATM bus scheduler for an ATM bus control connected to the CLAD units through the ATM bus;
the cells from the cell terminal portion being held in the cell holding portion through the Utopia Level 2 interface under control of the communication controller for a cell transfer in the up direction from the terminal equipments to the ATM switchboard, and the ATM bus scheduler making the cell holding portion transmit the cells to the ATM bus by assigning a transmission right for every cell holding portion of the CLAD units in accordance with a preset schedule table based on at least one of predetermined service categories and a traffic control corresponding to a traffic quantity; and
the cells being broadcast from the ATM bus to the cell holding portion of each CLAD unit for a cell transfer in the down direction from the ATM switchboard to the terminal equipments, and the communication controller making the cell holding portion transfer the cells to the cell terminal portion through the Utopia Level 2 interface to decide whether or not the cells are addressed to itself.

2. An ATM cell multiplexer as claimed in claim 1 wherein the cell holding portion comprises an FIFO for writing a single down cell from the ATM bus and another FIFO for writing a single up cell to the ATM bus.

3. An ATM cell multiplexer as claimed in claim 1 wherein if there is a single trunk circuit connected to the ATM switchboard, the ATM bus scheduler allocates the cells equally in the up and down directions on the ATM bus whereby the transmission/reception of the cells is controlled.

4. An ATM cell multiplexer as claimed in claim 1 wherein if there are a plurality of trunk circuits connected to the ATM switchboard, the ATM bus scheduler controls so that a plurality of cells are received for a single time slot in the down direction and a single cell in the up direction.

5. An ATM cell multiplexer as claimed in claim 4 wherein if physical speeds of the trunk circuits are different from each other, the ATM bus scheduler sets thinned-out intervals of a memory table which determines the order for providing the transmission right of the ATM bus, thereby enabling each of the CLAD units to select a detour or non-detour.

6. An ATM cell multiplexer as claimed in claim 4 wherein the ATM bus scheduler allocates a reception right for each CLAD unit in accordance with the schedule table preset by at least one of the predetermined service categories and the traffic control corresponding to the traffic quantity, thereby enabling the number of the trunk circuits to be expanded.

7. An ATM cell multiplexer as claimed in claim 1, further comprising an SVC call setting controller in addition to the CLAD units, the SVC call setting controller controlling a call setting protocol to set a connection ID determined on the trunk circuits to the CLAD units for the connection with the ATM switchboard.

8. An ATM cell multiplexer as claimed in claim 2, further comprising an SVC call setting controller in addition to the CLAD units, the SVC call setting controller controlling a call setting protocol to set a connection ID determined on the trunk circuits to the CLAD units for the connection with the ATM switchboard.

9. An ATM cell multiplexer as claimed in claim 7 wherein the SVC call setting controller sets a virtual connection ID and has an SOFT-PVC function prescribed by a PNNI.

10. An ATM cell multiplexer as claimed in claim 8 wherein the SVC call setting controller sets a virtual connection ID and has an SOFT-PVC function prescribed by a PNNI.

11. An ATM cell multiplexer as claimed in claim 9 wherein the service categories comprise CBR, rt-VBR, nrt-VBR, and UBR.

12. An ATM cell multiplexer as claimed in claim 10 wherein the service categories comprise CBR, rt-VBR, nrt-VBR, and UBR.

13. An ATM cell multiplexer as claimed in claim 11 wherein the schedule table is composed of a main table including all service categories except UBR and a sub table including service categories with a lower priority for the transmission right, and the ATM bus scheduler assigns the transmission right on the basis of the sub table only when the CLAD units in the main table have abandoned the transmission rights.

14. An ATM cell multiplexer as claimed in claim 12 wherein the schedule table is composed of a main table including all service categories except UBR and a sub table including service categories with a lower priority for the transmission right, and the ATM bus scheduler assigns the transmission right on the basis of the sub table only when the CLAD units in the main table have abandoned the transmission rights.

15. An ATM cell multiplexer as claimed in claim 13 wherein the main table is prepared so that the transmission rights for the CLAD units are equally allocated to every time slot in a frame in the order of CBR, rt-VBR and nrt-VBR and in the registration order of the CLAD units.

16. An ATM cell multiplexer as claimed in claim 14 wherein the main table is prepared so that the transmission rights for the CLAD units are equally allocated to every time slot in a frame in the order of CBR, rt-VBR and nrt-VBR and in the registration order of the CLAD units.

* * * * *